US010115165B2

(12) United States Patent
Cunningham

(10) Patent No.: US 10,115,165 B2
(45) Date of Patent: Oct. 30, 2018

(54) MANAGEMENT OF TAX INFORMATION BASED ON TOPOGRAPHICAL INFORMATION

(71) Applicant: UNIVERSITY OF ALASKA, Fairbanks, AK (US)

(72) Inventor: Keith W. Cunningham, Fairbanks, AK (US)

(73) Assignee: University of Alaska Fairbanks, Fairbanks, AK (US)

(*) Notice: Subject to any disclaimer, the term of this patent is extended or adjusted under 35 U.S.C. 154(b) by 17 days.

(21) Appl. No.: 14/422,379

(22) PCT Filed: Aug. 22, 2013

(86) PCT No.: PCT/US2013/056217
§ 371 (c)(1),
(2) Date: Feb. 19, 2015

(87) PCT Pub. No.: WO2014/031870
PCT Pub. Date: Feb. 27, 2014

(65) Prior Publication Data
US 2015/0235325 A1 Aug. 20, 2015

Related U.S. Application Data

(60) Provisional application No. 61/692,213, filed on Aug. 22, 2012.

(51) Int. Cl.
*G01C 21/32* (2006.01)
*G06Q 40/00* (2012.01)
(Continued)

(52) U.S. Cl.
CPC ........... *G06Q 40/12* (2013.12); *G06Q 10/067* (2013.01); *G06Q 50/16* (2013.01); *G06Q 50/26* (2013.01)

(58) Field of Classification Search
CPC ..................... G06K 9/00704; H04W 4/005
See application file for complete search history.

(56) References Cited

U.S. PATENT DOCUMENTS 5,652,717 A * 7/1997 Miller .................... G06T 17/05
703/6
5,808,916 A * 9/1998 Orr ......................... G06T 17/05
703/6
(Continued)

FOREIGN PATENT DOCUMENTS

WO WO-2011/116375 A1 9/2011
WO WO-2012/037157 A2 3/2012
(Continued)

OTHER PUBLICATIONS

Baltsavias, E. et al., Resolution Convergence: A Comparison of Aerial Photos, LIDAR and IKONOS for Monitoring Cities', Remotely Sensed Cities, Taylor & Francis, London, 2003 (pp. 61-66).
(Continued)

*Primary Examiner* — Talia F Crawley
(74) *Attorney, Agent, or Firm* — Ballard Spahr LLP

(57) ABSTRACT

Methods and systems for assessing changes to a region are disclosed. An example method can comprise receiving elevation data indicative of a region. A method can comprise generating a spatial model of the region based on the elevation data. A method can also comprise identifying based on the spatial model a first representation of a portion the region. The first representation of the portion of the region can be indicative of the portion of the region at a first time. A method can further comprise determining a difference between the first representation of the portion of the region and a second representation of the portion of the region. The second representation of the portion of the region can be indicative of the portion of the region at a second time.

20 Claims, 44 Drawing Sheets

(51) Int. Cl.
*G06Q 50/16* (2012.01)
*G06Q 50/26* (2012.01)
*G06Q 10/06* (2012.01)

(56) References Cited

U.S. PATENT DOCUMENTS

| | | | |
|---|---|---|---|
| 6,963,662 B1 | 11/2005 | LeClerc et al. | |
| 7,092,957 B2 * | 8/2006 | Klein | G06F 17/30893 |
| | | | 701/472 |
| 7,454,047 B2 | 11/2008 | Ragsdale | |
| 9,501,209 B2 * | 11/2016 | Klein | G06F 17/30893 |
| 9,589,259 B2 * | 3/2017 | McNeel | G06Q 20/207 |
| 2002/0010572 A1 * | 1/2002 | Orton | G06Q 10/06 |
| | | | 703/22 |
| 2003/0140064 A1 * | 7/2003 | Klein | G06F 17/30893 |
| 2005/0203681 A1 * | 9/2005 | Minor, Jr. | H04W 4/005 |
| | | | 701/23 |
| 2006/0136126 A1 * | 6/2006 | Coombes | G09B 29/10 |
| | | | 701/532 |
| 2006/0197781 A1 * | 9/2006 | Arutunian | G01C 21/32 |
| | | | 345/629 |
| 2006/0228019 A1 * | 10/2006 | Rahmes | G06K 9/00637 |
| | | | 382/154 |
| 2006/0265350 A1 * | 11/2006 | Klein | G06F 17/30893 |
| 2007/0124328 A1 * | 5/2007 | Klein | G06F 17/30893 |
| 2008/0298638 A1 * | 12/2008 | Miyazaki | G06K 9/00637 |
| | | | 382/106 |
| 2009/0177557 A1 * | 7/2009 | Klein | G06F 17/30893 |
| | | | 705/26.1 |
| 2010/0085175 A1 | 4/2010 | Fridthjof | |
| 2010/0182316 A1 * | 7/2010 | Akbari | G06T 17/05 |
| | | | 345/427 |
| 2010/0208982 A1 | 8/2010 | Shimamura et al. | |
| 2011/0267355 A1 | 11/2011 | Coombes et al. | |
| 2011/0268316 A1 | 11/2011 | Bronder et al. | |
| 2011/0295575 A1 | 12/2011 | Levine et al. | |
| 2013/0013471 A1 * | 1/2013 | Fishman | G06Q 40/00 |
| | | | 705/31 |
| 2013/0046471 A1 | 2/2013 | Rahmes et al. | |
| 2015/0356539 A1 * | 12/2015 | McNeel | G06Q 20/207 |
| | | | 705/19 |

FOREIGN PATENT DOCUMENTS

WO WO-2013/110072 A1 7/2013
WO WO-2014/031870 A2 2/2014

OTHER PUBLICATIONS

Song, Y. et al., Property Tax and Urban Sprawl: Theory and Implications for US Cities, May 12, 2006 (pp. 2-8).
International Search Report dated Mar. 7, 2014 by the International Searching Authority for International Application No. PCT/US2013/056217, which was published as WO/2014/031870 on Feb. 27, 2014 (Inventor—Cunningham, K. W.; Applicant—Univ. of Alaska; (9 pages).
Preliminary Report on Patentability dated Feb. 24, 2015 by the International Searching Authority for International Application No. PCT/US2013/056217, which was published as WO/2014/031870 on Feb. 27, 2014 (Inventor—Cunningham, K. W.; Applicant—Univ. of Alaska; (7 pages).
International Search Report and Written Opinion dated Jun. 10, 2013 by the International Searching Authority for International Application No. PCT/US2013/022556, which was filed on Jan. 22, 2013 and published as WO 2013/110072 on Jul. 25, 2013 (Applicant—Univ. of Alaska) (8 pages).
International Preliminary Report on Patentability dated Jul. 22, 2014 by the International Searching Authority for International Application No. PCT/US2013/022556, which was filed on Jan. 22, 2013 and published as WO 2013/110072 on Jul. 25, 2013 (Applicant—Univ. of Alaska) (7 pages).

* cited by examiner

Fit Statistics

370 — ▶ Manipulate Struc 027900

372 — ▶ Struc ID 27900

Mask Name:
374 — ▶G:\Lidar\Wyandotte\Pixelgrow\Wyandotte-:
Parcels Name:
376 — ▶G:\Lidar\Wyandotte\shapes\Parcel.shp
Structures Name:
378 — ▶G:\Lidar\Wyandotte\sketches\sketch.shp
380 — ▶Parcels: 1
382 — ▶Parcels Fronts Found: 1

384 — ▶Structures: 65535
386 — ▶Structures Front Found: 0
388 — ▶Structures Fitted: 0
390 — ▶Structures Not Fitted: 0

392 — ▶Parcel w/ 1 Struc: 0
394 — ▶Parcel w/ Mult Strucs:
396 — ▶Parcel w/ Mask + No Struc:

398 — ▶Edge Match:

400 — ▶# Edges Match:
402 — ▶Edge Length Match:

404 — ▶Size Match:
406 — ▶Orientation Match:

407 — ▶ View Scoring

FIG. 30

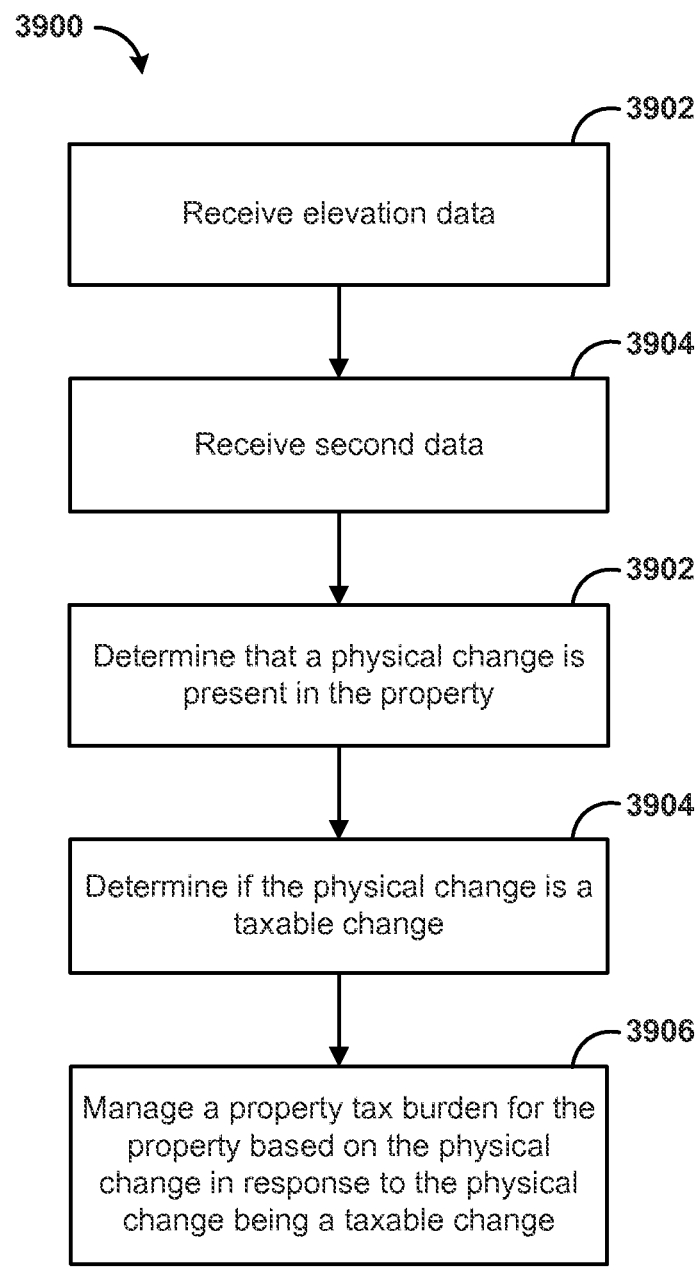

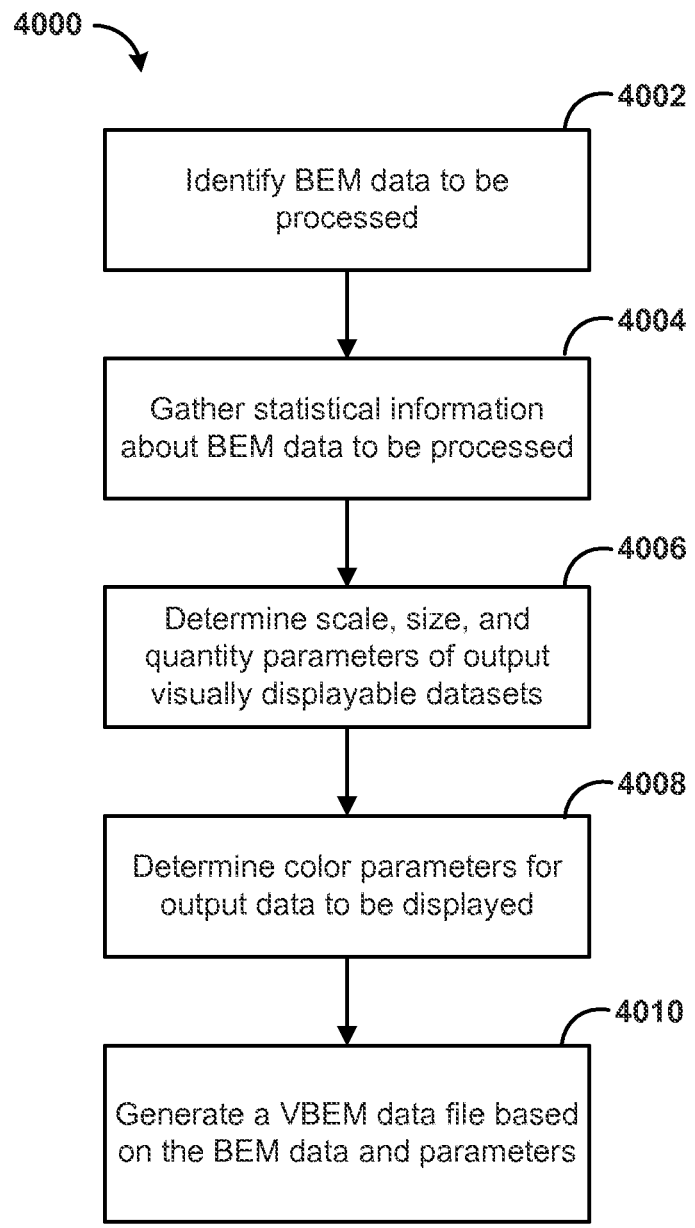

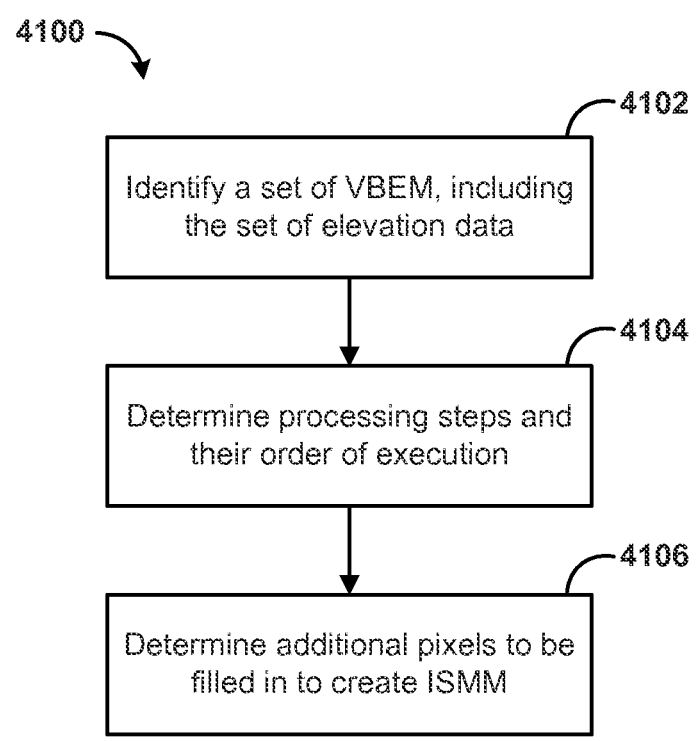

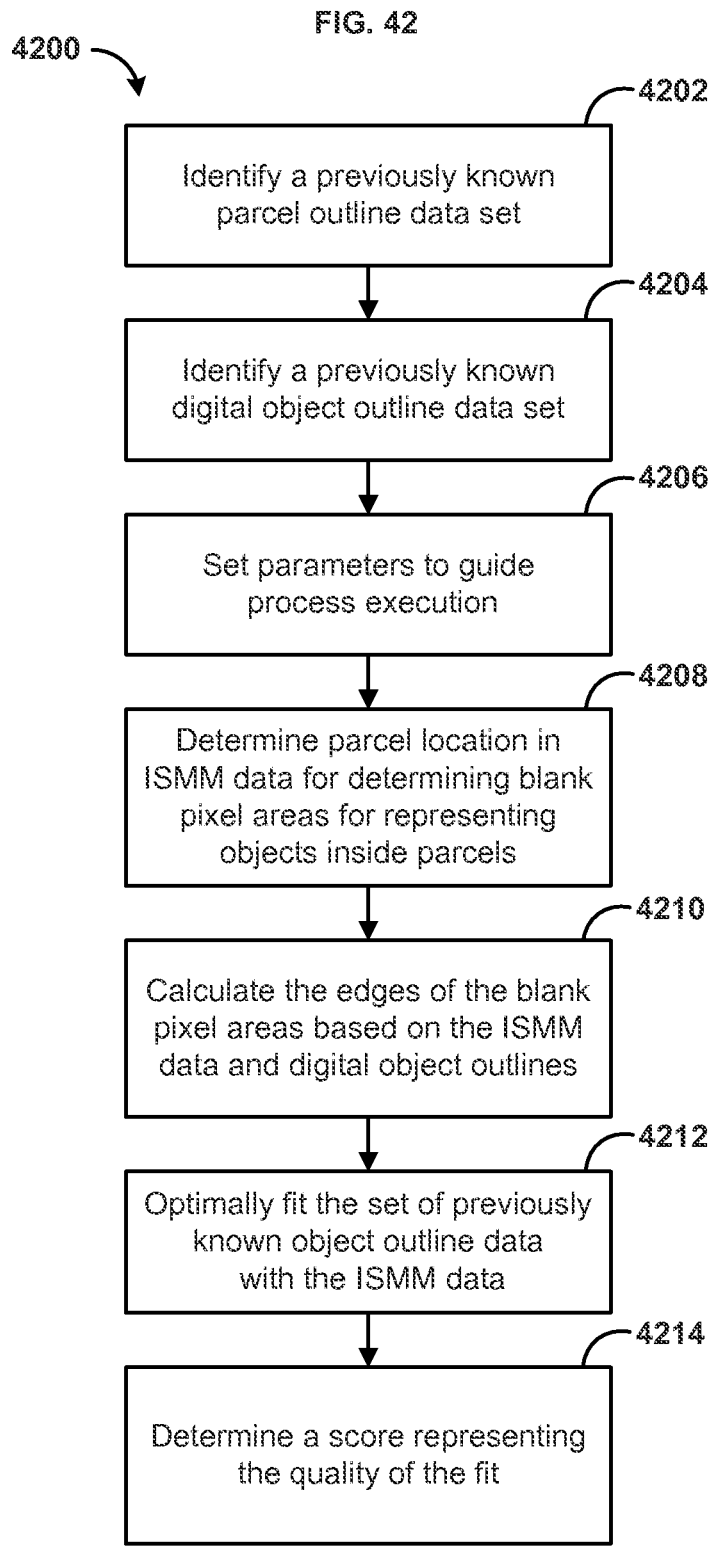

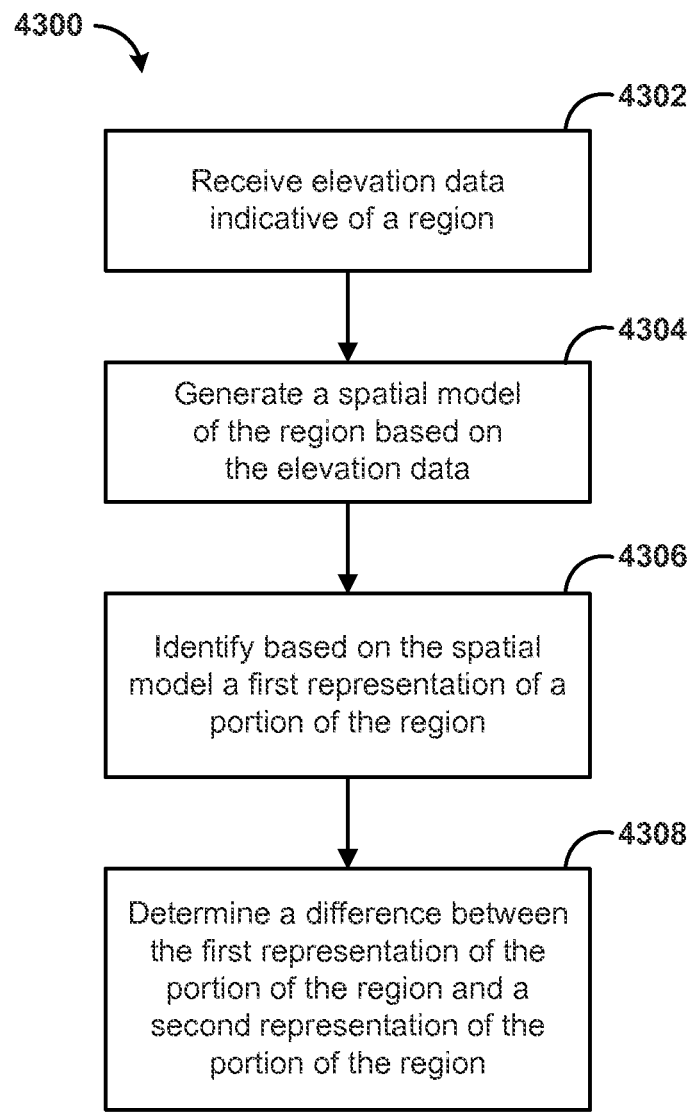

MANAGEMENT OF TAX INFORMATION BASED ON TOPOGRAPHICAL INFORMATION

CROSS REFERENCE TO RELATED PATENT APPLICATION

This application claims priority to U.S. Provisional Application No. 61/692,213 filed Aug. 22, 2012, herein incorporated by reference in its entirety.

SUMMARY

It is to be understood that both the following general description and the following detailed description are exemplary and explanatory only and are not restrictive, as claimed. Provided are methods and systems for assessing changes to a region. An example method can comprise receiving elevation data indicative of a region. A spatial model of the region based on the elevation data can be generated. A first representation of a portion of the region can be identified. The first representation of the portion of the region can be indicative of the portion of the region at a first time. A difference between the first representation of the portion of the region and a second representation of the portion of the region can be determined. The second representation of the portion of the region can be indicative of the portion of the region at a second time.

In another aspect, an example method can comprise receiving first elevation data. The first elevation data can be indicative of a region at a first time. Second data can be received. The second data can be indicative of at least a portion of the region at a second time. A physical change in the region can be determined based on the first elevation data and the second data. It can be determined if the physical change is a taxable change. A tax burden for the region based on the physical change can be managed in response to the physical change being a taxable change.

In another aspect, an example system can comprise a memory having encoded thereon computer-executable instructions and data. The system can comprise a processor functionally coupled to the memory and configured, by the computer-executable instructions, to perform at least the following actions: receiving elevation data indicative of a region, generating a spatial model of the region based on the elevation data, identifying a first representation of a portion of the region, and determining a difference between the first representation of the portion of the region and a second representation of the portion of the region. The first representation of the portion of the region can be indicative of the portion of the region at a first time. The second representation of the portion of the region can be indicative of the portion of the region at a second time.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings which are incorporated in and constitute a part of this specification, illustrate and describe example embodiments and together with the description, serve to explain the principles of the methods and systems:

Figure 11:
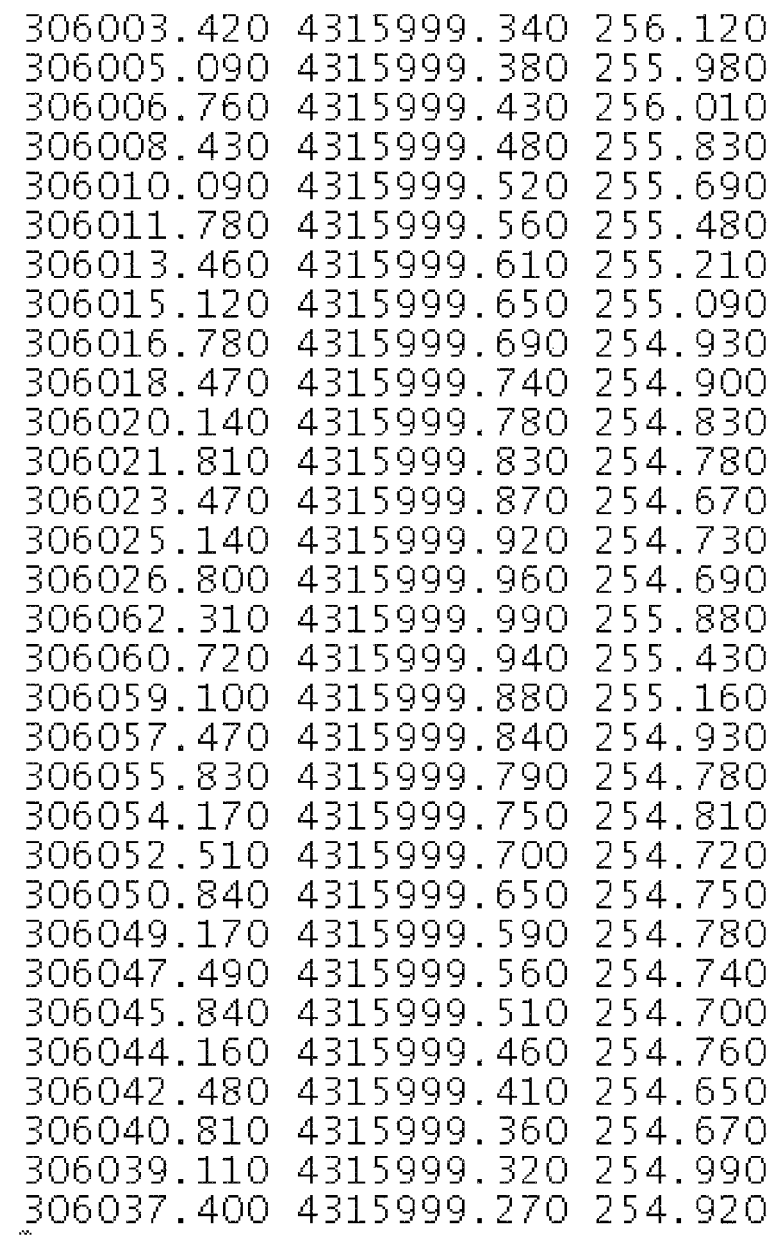

FIG. 11 is a small portion of a data file containing BEM data used as input data in accordance with one or more aspects of the disclosure;

FIG. 17 is a computer screen corresponding to the progress display information that is displayed as the present disclosure progresses through the process to compare ISMM data to digital object outlines;

FIG. 30 is an example dialog box above an enhanced map where a former elevation representation is fitted to a current elevation representation according to one or more aspects of the disclosure;

FIG. 39 is a flowchart illustrating an example method of property tax assessment according to one or more aspects of the disclosure;

FIG. 40 is a flowchart illustrating an example method for processing digital elevation data including Bare Earth Model (BEM) data to create visually displayable BEM data (VBEM);

FIG. 41 is a flowchart illustrating a method of processing a set of visually displayable BEM data (VBEM) to create an Interpolated Surface Model Mask (ISMM);

FIG. 42 is a flowchart of an example method for identifying a set of ISMM data with blank spaces representing object locations; and FIG. 43 is a flowchart illustrating an example method for assessing changes to a region.

DETAILED DESCRIPTION

Figure 1:
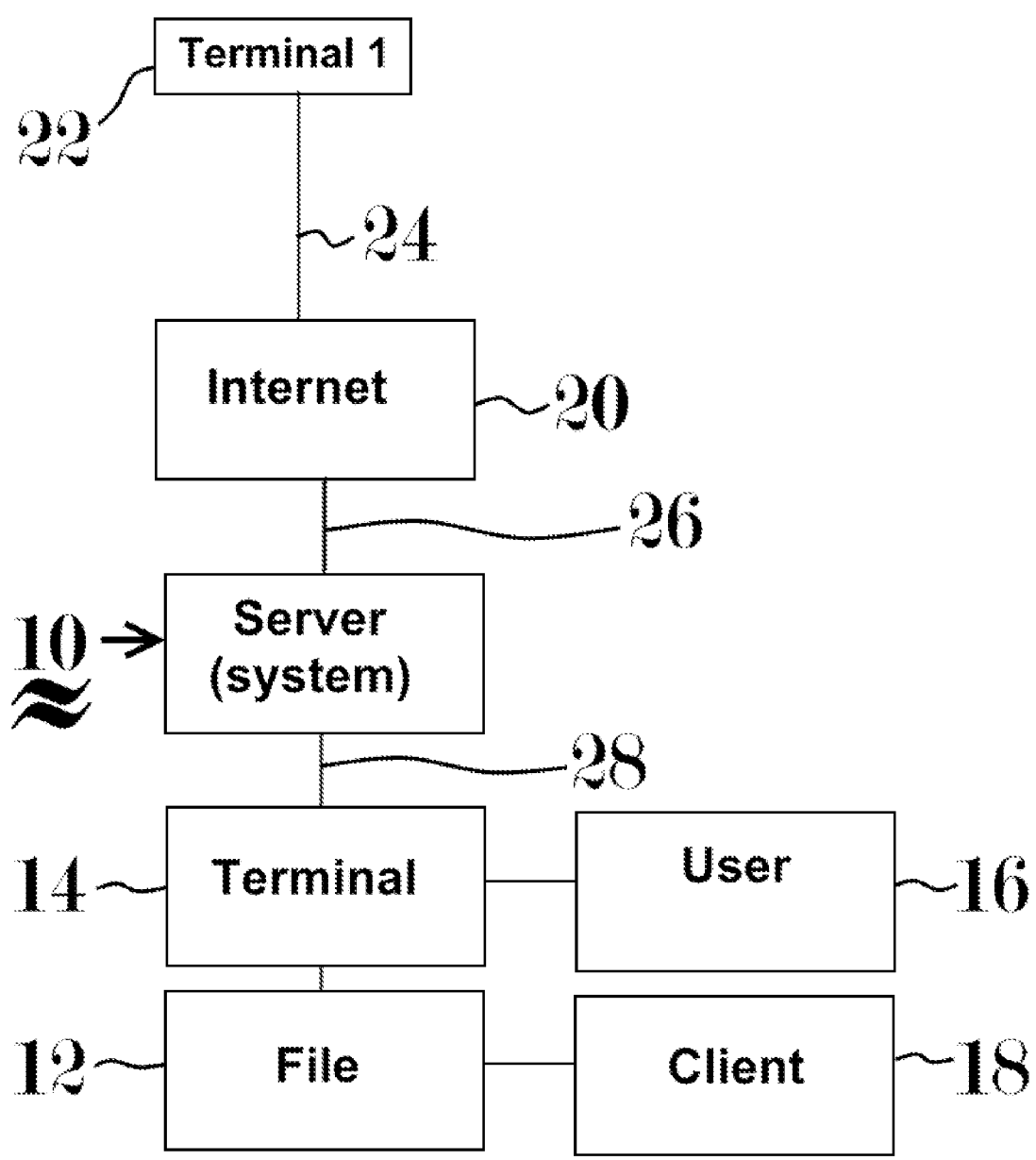
FIG. 1 is an example block diagram showing an example system that enables one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for managing property tax information (e.g., property tax records) based at least on topographical information. It is also to be understood that the terminology employed herein is for the purpose of describing particular, non-exclusive embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "layer," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, a layer, a node, an interface, a function, a component, a platform, and the like. It is noted that in certain embodiments, or in connection with certain aspects or features such embodiments, the terms "system," "layer," "unit," "component," "interface," "platform" "node," "function" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Disclosed are components that can be utilized to perform the disclosed methods, devices, and/or systems. These and other components are disclosed herein, and it is understood that when combinations, subsets, interactions, groups, etc. of these components are disclosed that while specific reference of each various individual and collective combinations and permutation(s) of these may not be explicitly disclosed, each is specifically contemplated and described herein, for all methods, devices, and/or systems. This applies to all aspects of the subject disclosure including steps, or actions, in the disclosed method(s). Thus, if there are a variety of additional steps, or actions, that can be performed, then it is understood that each of such additional steps, or actions, can be performed with any specific embodiment or combination of embodiments of the disclosed methods.

As it will be readily appreciated, in one aspect, the methods, devices, and/or systems of the disclosure can take the form of an entirely hardware embodiment, an entirely software embodiment, or an embodiment combining software and hardware aspects. In an additional or alternative aspect, the methods, devices, and/or systems can take the form of a computer program product on a computer-readable storage medium having computer-readable program instructions (e.g., computer software) embodied in the storage medium. More particularly, the disclosed methods, devices, and/or systems can take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart and/or call-flow illustrations of methods, systems, apparatuses and computer program products. It will be understood that each block of the block diagrams and flowchart illustrations, and combinations of blocks in the block diagrams and flowchart illustrations, respectively, can be implemented by computer program instructions. Such computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions also can be loaded onto a computer or other programmable data processing apparatus to cause a series of operational steps, or acts, to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that can perform the specified functions or steps, or combinations of special purpose hardware and computer instructions.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

Government entities assess taxes based on the size and use of property. These government records are difficult to update because of unrecorded changes to a property including new development, structural additions, demolitions, and others. Taxes based on property value, impervious surfaces, property use, and the like, are all based on the dimensional characteristics of the property and its improvements. Often, the improvements are not recorded in the government records or what is recorded in the records and the actual improvements are very different.

This is a pervasive problem for all state and local governments whose tax base is derived from property values based on structural improvements. There are statutory regulations establishing regular field inspections by assessors and appraisers to re-measure and re-value properties. In the past, the validation of this data has been a manual, time consuming process that requires a personal inspection of each property and a re-measurement of the structure to determine if there has been a change between the current records and the actual dimensions of the property improvements.

Topographical data can describe the surface of the earth in great detail. Features mapped and modeled with elevation data include not just the ground, but the features on the ground such as houses, buildings, and other fixed, immovable objects. The disclosure recognizes and addresses, in one aspect, the complexity of ensuring integrity of real property tax (also referred to as property tax) records. In one aspect, the present methods and systems leverage topographical data, such as elevation data, for management of tax property records. In another aspect, to manage the tax property records, the present methods and systems can detect change of object dimensions, such as change between existing digital structure outlines and enhanced digital elevation data. In another aspect, the management can comprise generation of updated tax records. In yet another aspect, the management can comprise assessment of property tax adjustments based on physical change(s) to real property as established by elevation data. For example, the managing can comprise managing a tax burden for a property based on the physical change. In addition or in the alternative, managing the property tax burden can comprise notifying an owner of the property of the taxable change. In the disclosure, management of property tax based on elevation data can comprise combination of techniques to map, measure, and validate property tax records using elevation data.

In one aspect, real property is defined as land and improvements on the land that are fixed or immobile. Fixed improvements can comprise houses, buildings, garages, roads, mines, ponds, machinery, and the like. The land can be measured by a legal property survey. The fixed assets can also be inspected and measured to create additional descriptions of the real property.

In one aspect, with the use of detailed aerial photography showing the properties, changes between the records and the properties shown in the photography can be detected. However, the comparison is a completely manual, time consuming task that requires every property record to be compared to what is shown in the photography for that same property. There are also a variety of technical issues when working with aerial photography, including its resolution, inherent measurement errors due to topography and camera error. A significant problem when working with aerial photography is the issue of "occlusion" which is a feature being blocked from view, thus not measureable, and this blockage being caused by an intervening feature in the photo, such as a trees and shadows.

Airborne platforms can be used to collect large amounts of digital elevation data covering large areas. Digital elevation data can comprise a set of X, Y and Z coordinates representing points in a coordinate system. These digital elevation data can comprise data derived from LiDAR (Light Detection and Ranging), IfSAR (Interferometric Synthetic Aperture Radar), and SfM (Structure from Motion) digital elevation data, and can be collected at rates in the tens of thousands of points per second, covering hundreds of thousands of square feet of area per second. This collection technique makes it possible to economically gather very accurate elevation data for large areas in a small amount of time. The digital elevation data that is gathered can comprise the elevation of points on the ground, sides and roofs of structures, points in and around vegetation, among many other things.

In the disclosure, using the digital elevation data, multiple subsets of the data can be extracted. For example, digital elevation data can comprise data consisting of structures, several classifications of vegetation, and Bare Earth, without structures and vegetation. This data can be extracted in a highly-automated fashion. It should be appreciated that the digital elevation data has numerous problems, including missing data causing voids.

The system and methods use elevation data that describe the surface of the earth in great detail to automate the process of assessing changes in property. Features mapped and modeled with elevation data include not just the ground, but the features on the ground such as houses, buildings, and other fixed, immovable objects. Detailed elevation data of houses and buildings can be compared to existing property tax measurements to determine the accuracy and completeness of the structural dimensions used to calculate property taxes. These data can be created from technologies, such as light detection and ranging (LiDAR), radio detection and ranging (RADAR), and structure-from-motion (SfM) photomodeling.

In one aspect, the disclosure provides a system and method of processing digital elevation data that that represents ground points, called a bare earth model (BEM), in such a manner that a geo-referenced visual representation of the bare earth model (VBEM) can be created that encodes the elevation values (Z coordinate). The encoded elevation data can be decoded within applications that understand the encoding method.

In another aspect, one or more embodiments of the disclosure provide a system and method of computing missing data (also referred to as voids) in the visual bare earth model (VBEM) representation with another algorithm designed to locate object edges and corners. The object edges and corners are then preserved in the visual bare earth representation in such a manner that objects are represented as data voids, thereby creating an Interpolated Surface Model Mask (ISMM). The ISMM has all elevations encoded, including the data missing from the visual bare earth representation, but object locations are left as a silhouette or "mask."

In yet another aspect, one or more embodiments of the disclosure provide a system and method of comparing the Interpolated Surface Model Mask (ISMM) to existing digital object outline drawings to determine differences between the two data sets. Then the change can be quantified and qualified in the object dimensions. This comparison process can be automated and generates a score indicating the "wellness" of fit between the ISMM and the object outline drawing. This score can be saved in a database for later use.

The ability to collect large amounts of classified information very quickly provides an opportunity to solve the problem of structural change detection. Change detection is a highly sought after capability in the geographic information systems and remote sensing fields, among others. The present methods and systems allow for the determination of the difference in the representation of something in one set of data from the representation of that same thing in another set of data. Typically these sets of data were gathered at different times implying that, if the representations of the same object in the two sets of data is different, then changes in the object have occurred during the period of time between when the first data set was acquired and the time the second data set was acquired. This is particularly important for property appraisers and assessors because they typically are not notified when improvements, additions, and the like are done to property that would affect the taxable value of the property.

In one aspect, the disclosure permits, in an automated process or semi-automated process, to use the classified digital elevation data to easily compare the outlines of the structures in the digital elevation data. The disclosure described is a method that in a fraction of the time, compared to previous methods, and in a completely automated fashion, can utilize digital elevation data to perform the same work previously done manually, while resulting in more uniform and complete results.

In the disclosure, detailed elevation data of houses, buildings, or other real property can be compared to property tax information to manage property tax records. In one aspect, the management includes determination of accuracy and completeness of the structural dimensions used to calculate property taxes.

Real property taxes can be calculated from the land survey and measurements of the fixed assets. Land surveys and measurements of improvements can be used to determine the economic value of the real property. Because the fixed improvement can change, they are periodically re-measured. In the U.S., state laws can require the re-measurement of improvements, such as houses, every four years. Additional improvements made to the property, such as an addition to a house or building, are located during these re-measurements. The re-measurement process typically involves direct, field measurements of the fixed assets or a visual inspection of the property from photographs and other imagery. These techniques are expensive and time consuming.

It should be appreciated that advanced forms of topographical data (e.g., elevation data) are available. These data can be created from three currently available technologies, including light detection and ranging (LiDAR), interferometric synthetic aperture radar (IfSAR), and structure-from-motion (SfM) photomodeling. All of these technologies can create very detailed sets of elevation data in the form of a digital elevation model (DEM), a digital surface model (DSM), as a digital terrain model (DTM), and the like. All of these forms of elevation data share the aspect that for every x and y map coordinate, there is a corresponding elevation value, or a z coordinate. Thus, the elevation data is in the form of an x y z coordinate database.

In one aspect, the database can convey, individually or collectively, the coordinates as database records or the database can be in the form of an image, similar to a shaded-relief picture. It another aspect, contained in the database are elevations for the ground as well as elevations for the features on the ground such as a building. A building may have x y z coordinates describing its shape on the ground as well as its height and roof slope. Appurtenances on the building can also appear in the elevation data and these appurtenances can comprise awnings, air conditioners, decks, stairs, and the like.

As described herein, the elevation data can be classified to distinguish ground from structures. This classification process can be implemented as an automated or semi-automated method in order to make such classification efficient and accurate. In certain implementations, using the classified elevation data, it is possible to compare the dimensions of the structures to the measurements in the tax rolls. This comparison process is automated and can generate a score indicating the "agreement" between the elevation data and the structure's dimensions in the tax rolls. This score is saved in a database for later use and follow-up by a trained property appraiser.

Referring now to the drawings in general, and FIG. 1 in particular, an example system 10 is illustrated for creating an electronic tool or file 12 for utilizing the described process according to one or more aspects of the disclosure. System 10 may be used directly or accessed through terminal 14 by user 16 to create file 12. Ultimately file 12 can be used by a client 18 who is interested in original or updated topographical data with respect to a particular area or region. As an alternative, user 16 could access server 10 to create file 12 via internet 20, another terminal 22 by electronic connection 24 and 26 as well as using the connection 28 to access system 10 through terminal 14 as previously described.

System 10 will now be described in more detail. In particular, system 10 is illustrated as a block diagram. System 10 is accessible via a connecting link 28 as previously described to internet 20.

Figure 2:
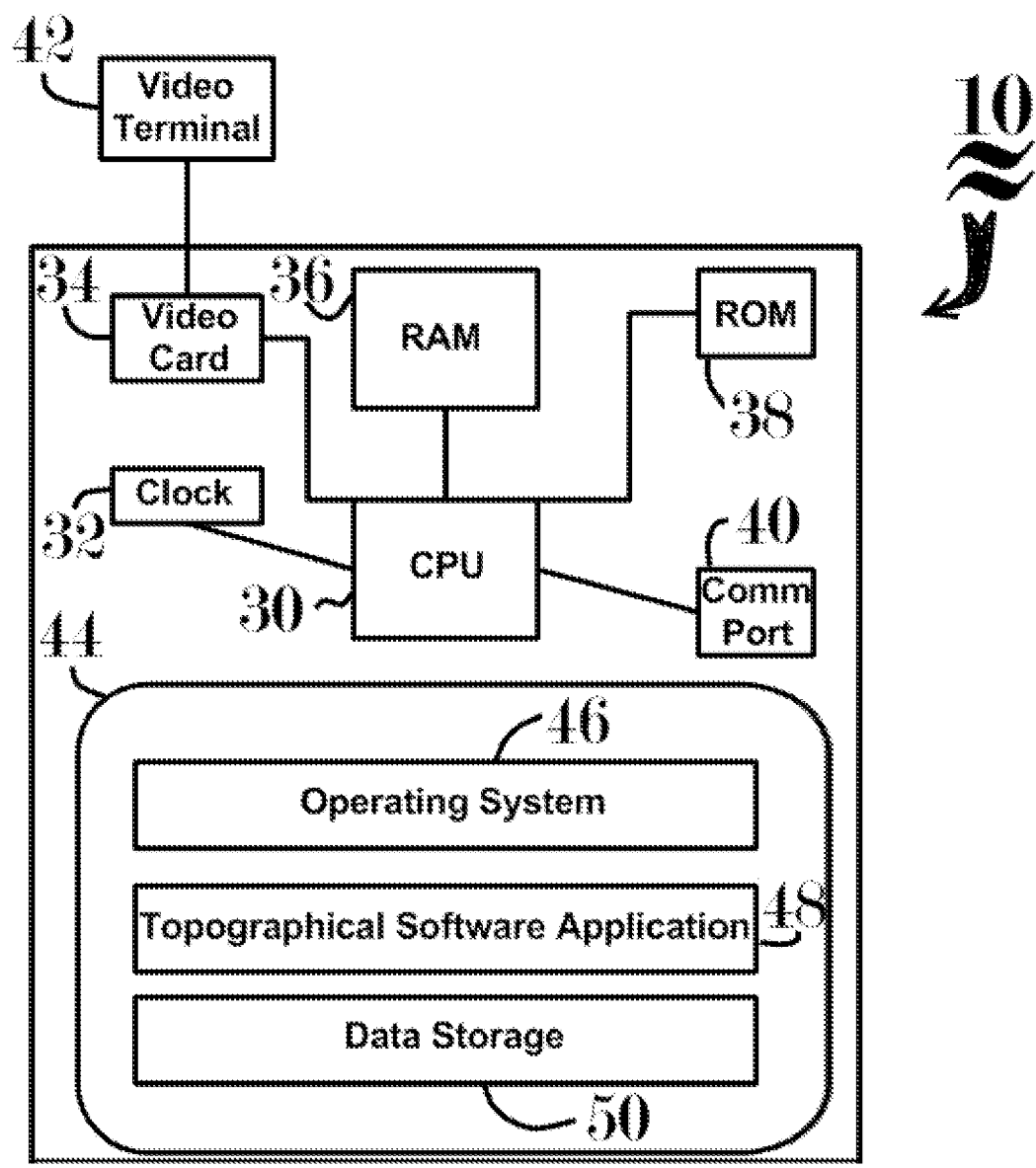
FIG. 2 is a block diagram an example Server System used to execute one or more aspect of the disclosure.

Referring to FIG. 2, system 10 (which may itself be a server or be hosted on a server's facilities) is shown in more detail. System 10 can comprise a CPU 30, a clock 32, a video card 34, a RAM element 36, a ROM element 38, a communications port 40, a video terminal 42, and the like. System 10 also can comprise a software storage area for non-volatile storage. Included in software storage 44 is a software operating system 46, the Processing Application software described herein, referred to as topographical software application 48, and data storage 50.

In one aspect, the disclosure provides a method and system to analyze and convert Bare Earth Model (BEM) data (input data) and to create a visual representation of the BEM (VBEM) that is much easier and faster to display visually and is much more visually attractive without losing the overall statistical and spatial accuracy and meaning of the original BEM input data. The example system can create the VBEM in a GeoTiff format which is a widely accepted data format for displaying raster information in the field. The GeoTiff format was used for simplicity purposes in the example system and should not be considered a limiting factor of the system as capability to support many other formats could be used. The user of the method and system has the option of selecting and specifying the parameters for varying methods of assigning colors to elevations and creating output files containing data of varying quantities, scales and geographical locations.

Figure 3:
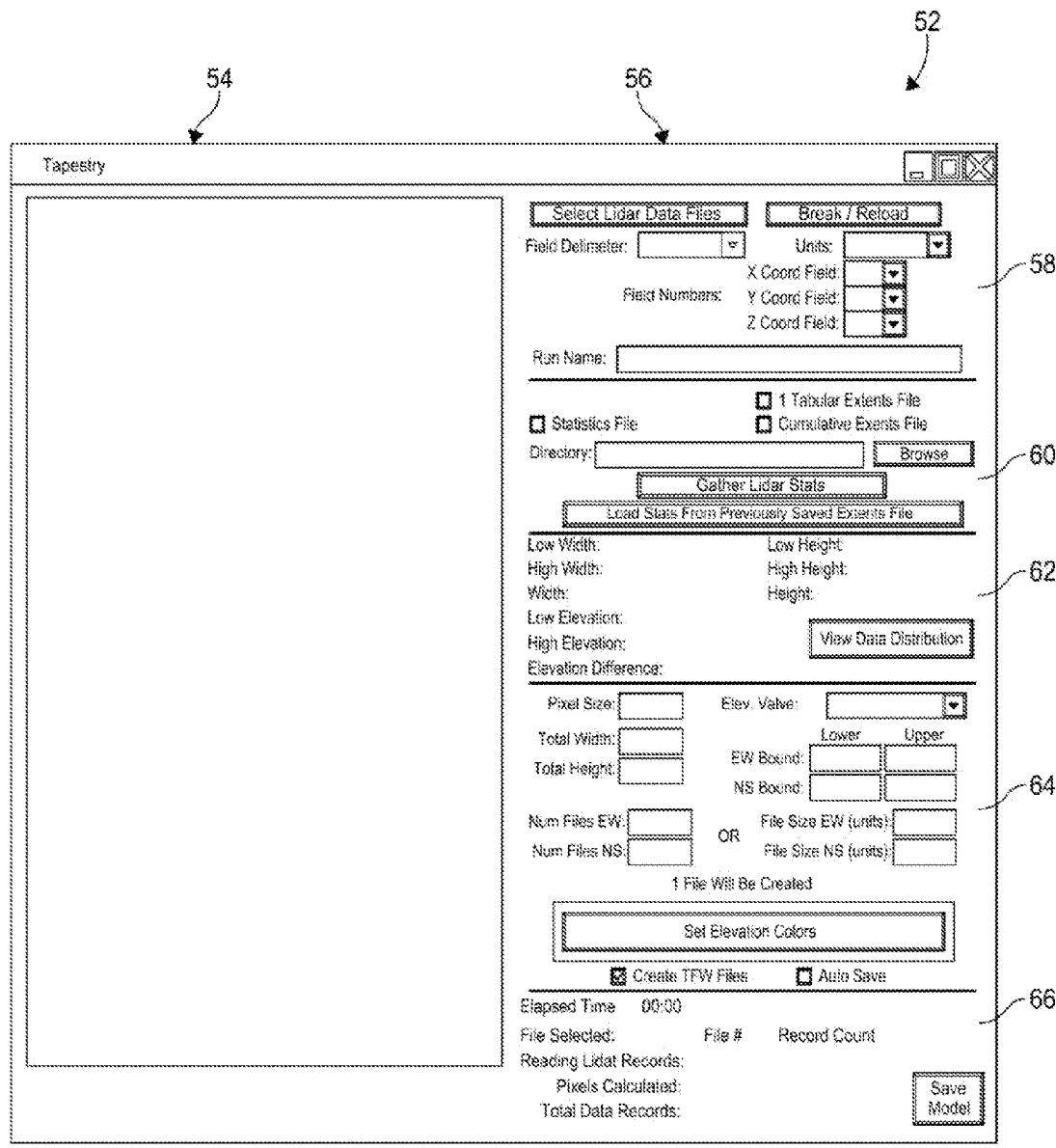
FIG. 3 is a computer screen display corresponding to creating the Visual Bare Earth Model data (VBEM) from the Bare Earth Model (BEM) data.

Creating VBEM data FIG. 19 from BEM FIG. 11 data will now be discussed with reference to the flow diagram of FIG. 18 as well as well as a series of computer screens illustrated in FIGS. 3-10 and BEM input data illustrated in FIG. 11. In the Flow diagram steps 500-510 will be discussed where steps 502 and 508 can be batch automated processes and may be executed more than once based on a looping process. Referring to FIG. 3, a computer screen can provide a main screen display 52, designed to process Bare Earth Data in accordance with one or more aspects of the disclosure. A Display Box 54 of main screen display 52, (visually merely a dark box at the illustrated stage of processing) is where output data can be displayed as the Processing Software Application described herein, e.g., topographical software application 48, is executed in conjunction with data storage 50. Many parameters can be specified using Control Panel 56 to customize how the BEM input data is interpreted and converted into VEBM output data and shown in Display Box.

FIG. 3 also shows Control Panel 56 on the right side of the main screen display 52. Control panel 56 is divided into a first section 58, a second section 60, a third section 62, a fourth section 64 and a fifth section 66.

Figure 4:
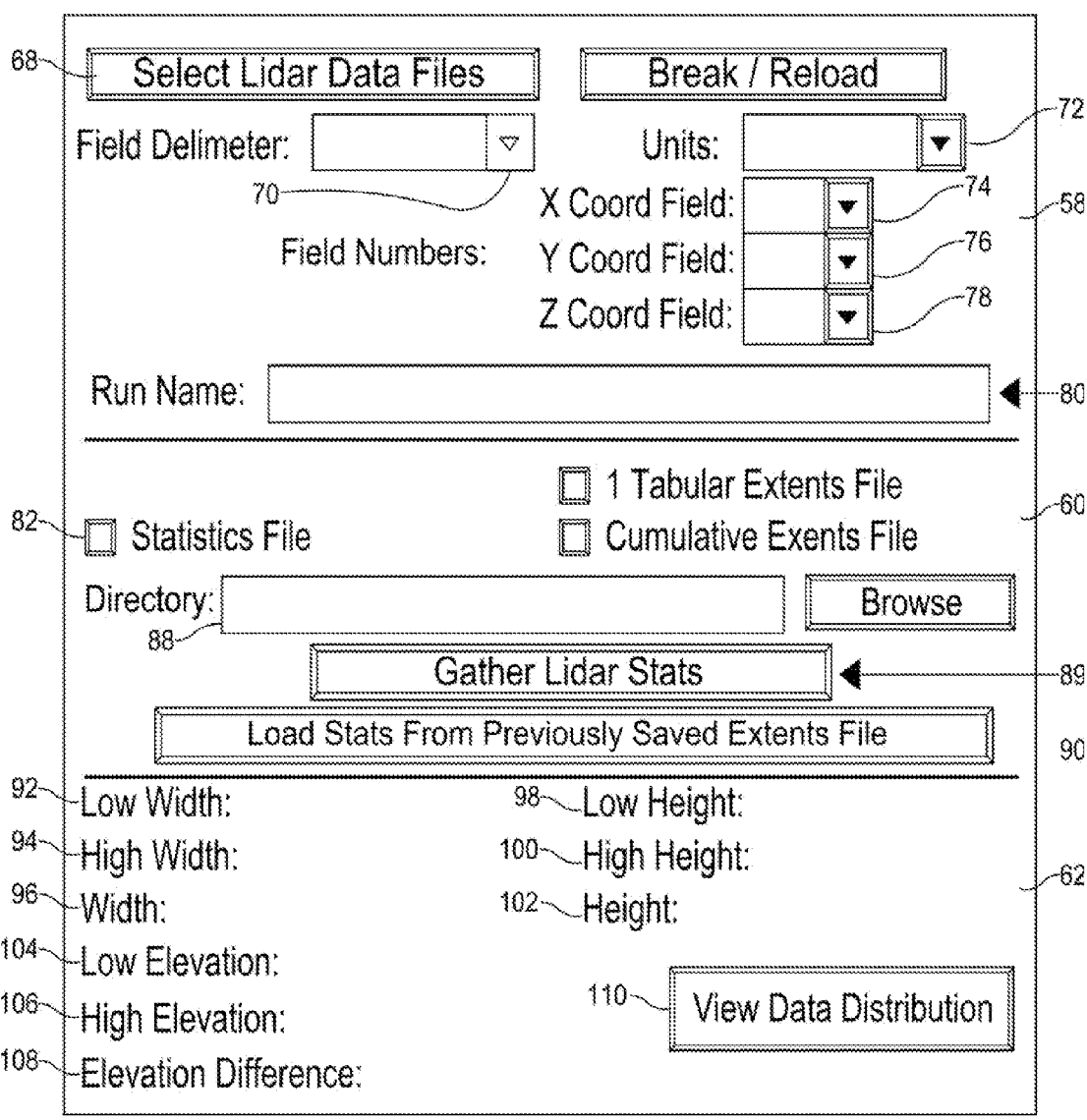
FIG. 4 is an enlarged view of the top portion of the control panel of the computer screen shown in FIG. 3 corresponding to Selecting the BEM Input Data Files, gathering the statistical information from the BEM input data, and displaying the statistical information for the BEM input data.
Figure 18:
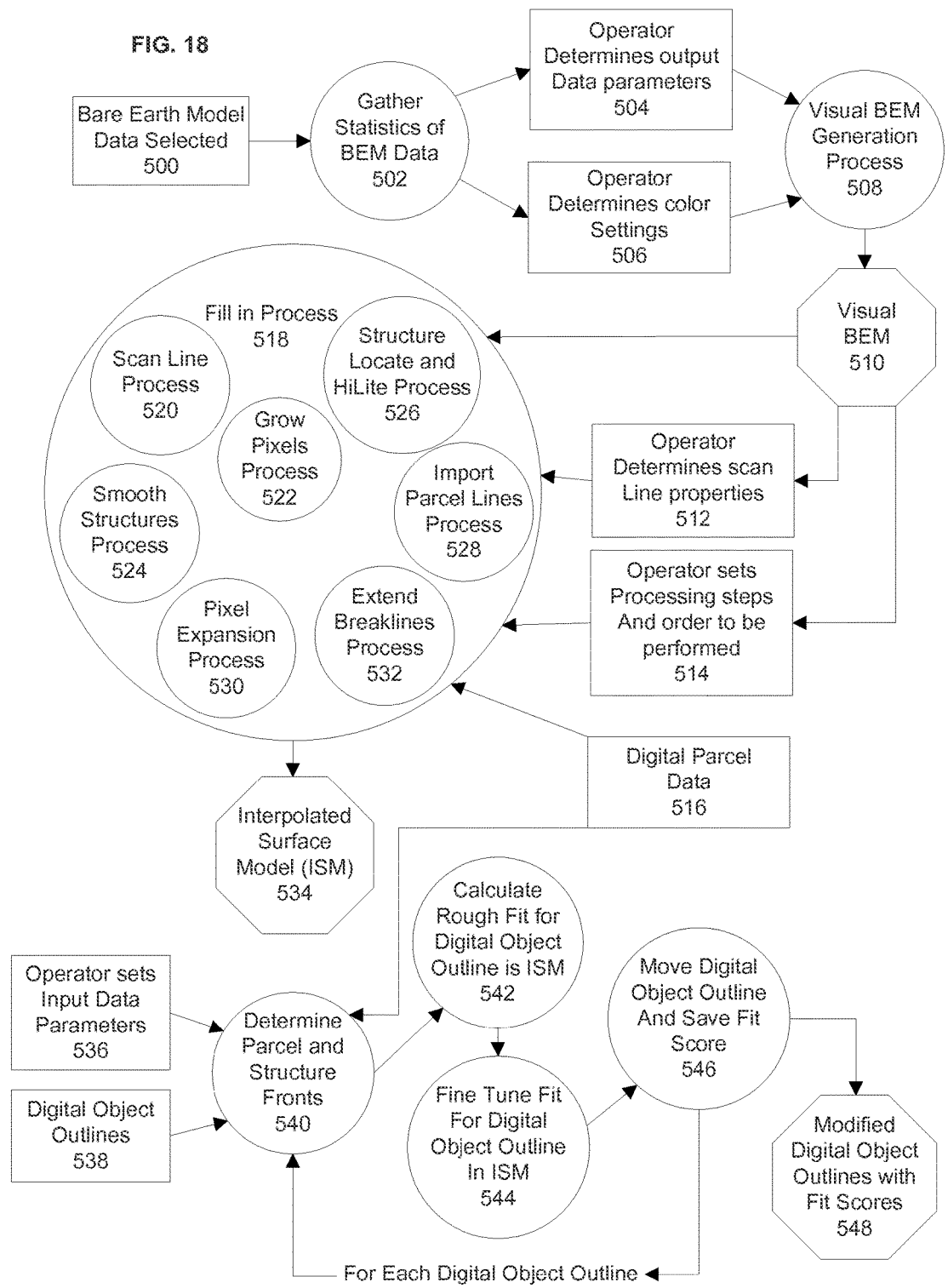
FIG. 18 is a flow diagram for creating VBEM data from BEM data, creating ISMM data from VBEM data, and comparing ISMM data to digital object outlines.

Referring to FIG. 4 and step 500 of the FIG. 18, at first section 58, a user can, by pressing a "Select LiDAR Data Files" button 68, select one or more BEM input data files, in one of several formats including LAS and XYZ formats, both widely used and accepted by those knowledgeable in the field. Then the user can specify several parameters describing the selected input file including the field delimiter character 70, the units button 72 for selecting data dimensions (Feet, Meters, etc.), and the field positions for the X Coordinate button 74, Y Coordinate button 76, and Z Coordinate button 78. A Run name 80 can also be selected to provide the system 10 with a name for files that are saved during processing.

Second section 60 allows the user to analyze statistically the data in the all the input data files selected in first section 58. As a result of analyzing statistically, the input data, three different files can be created including a statistics file using button 82 for the data analyzed, a tabular extents file 84 and a cumulative extents file 86. The directory where these files can be retained can be entered in directory text box 88. The user can then select to Gather LiDAR Statistics 89 for the input data files selected in first section 58 starting step 502 of FIG. 18. If more than one BEM input data file was selected, step 502 can execute on each file in the sequence the files were selected until all BEM input data files have been processed by step 502. Alternatively to Gathering LiDAR Statistics 89, loading statistical information from a previously saved extents file can be performed. If the user elects to use statistics data from a previous run of the system, they select a "Load From Previously Saved Extents File" button 90, and the system allows the user to select a file a previously created statistics file. If using this method the user does not need to select the input files in Section 1, inputs can be defined in the previously created statistics files and step 502 of FIG. 18 reads the previously saved extents file rather than the individual BEM input data files.

The third section 62 displays the statistics gathered from either the data files or the Extents file that was selected in Section 2 and read in step 502. This section can display the Low Width 92 and High Width 94 coordinates (X Coordinates), along with the difference between the high and low Width coordinates in the Width field 96. The third section 62 can also display the Low Height 98 and High Height 100 coordinates (Y Coordinates), along with the difference between the high and low Height coordinates in the Height field 102. The same can be done for the elevation, showing the low 104 and high 106 elevation and the difference between the high and low elevations in the Elevation Difference field 108. Also the user can select to display the Statistical information visually in a graph by selecting the "View Data Distribution" button 110.

Figure 6:
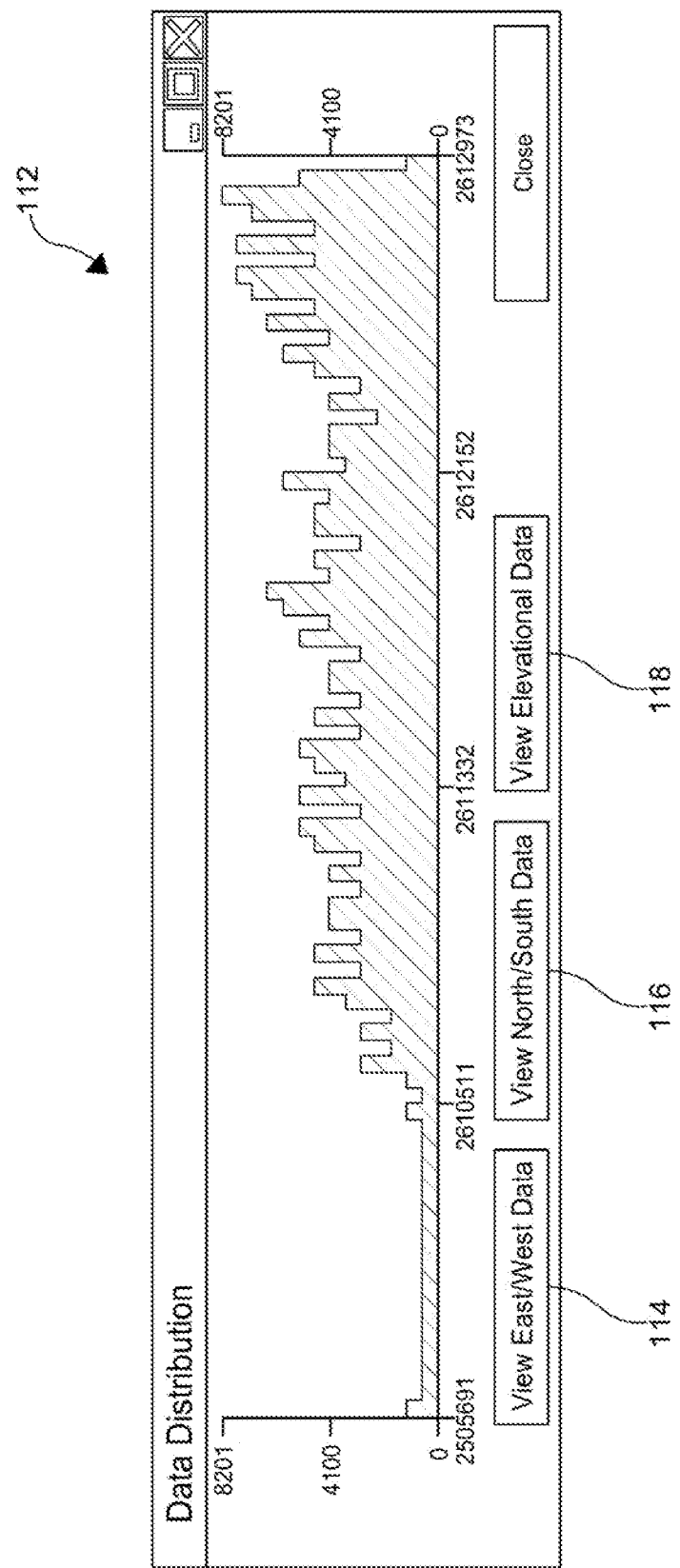
FIG. 6 is a computer screen corresponding to the displaying the Data Distribution.

Referring to FIG. 6, a Data Distribution screen 112 can be displayed upon pressing button 110 (see FIG. 4). FIG. 6 displays in graph form, the distribution of the East/West (X coordinates) data 114. The vertical scale represents the quantity of points and the horizontal scale represents the X Coordinates. The user can also display the data distributions for the North/South (Y Coordinates) 116 and the elevations 118 by selecting appropriate buttons at the bottom of the Data Distribution screen 112.

Figure 5:
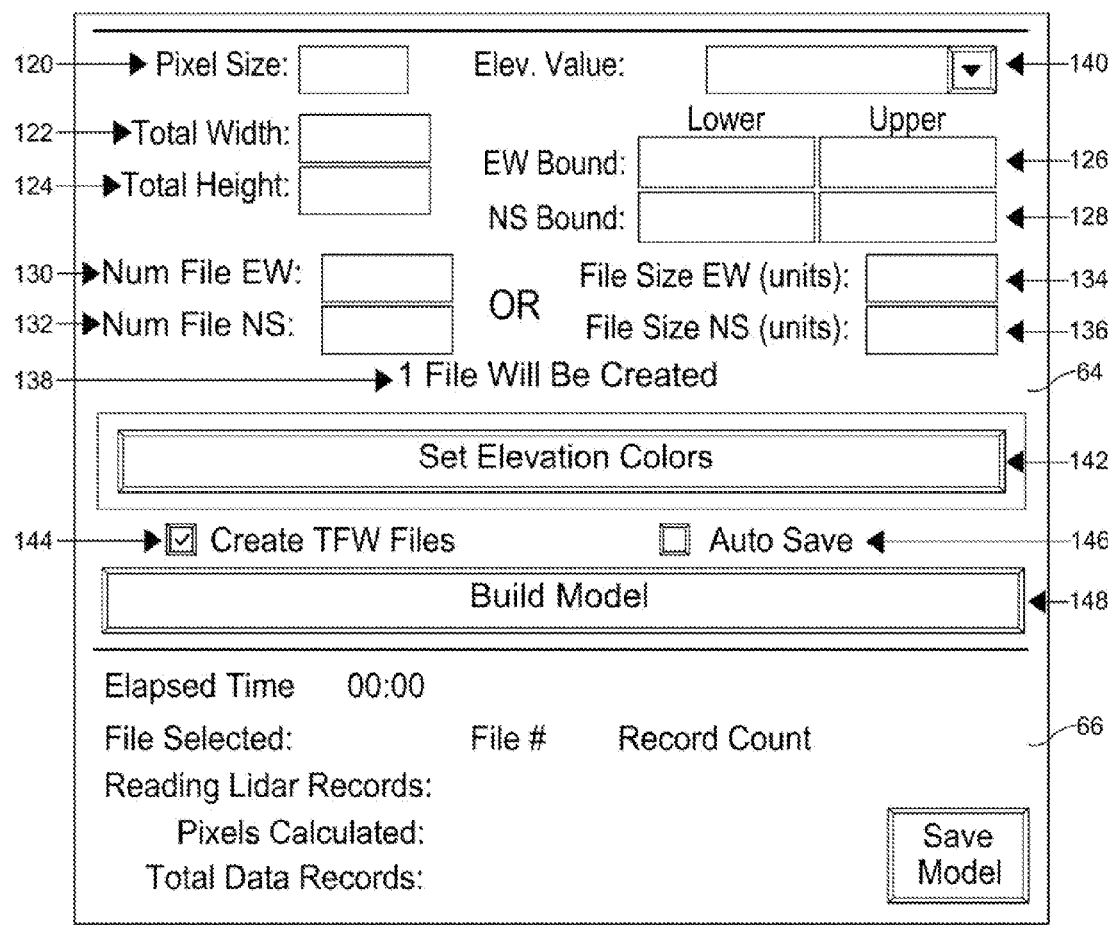
FIG. 5 is an enlarged view of the bottom portion of the control panel of the computer screen shown in FIG. 3 corresponding to setting the parameters for the output VBEM data files, opening the color selection computer screen (FIG. 7), executing the present disclosure and displaying progress information as the present disclosure progresses through the process.

FIG. 5 displays the fourth section 64 of the Control Panel showing the parameters the user has available to use to configure output data. FIG. 5 also displays fifth section 66 of the Control Panel that displays statistics and progress information while the Topographic Software Application is executing.

Referring to step 504 of FIG. 18 and fourth section 64 of FIG. 5, the user can determine the scale of the output data (Pixel Size) 120, the area the output data can encompass 122 and 124, and the number of files to use to store the output data.

The user can enter a Pixel Size 120 that can be used with the full extents of the input data to calculate the number of pixels that can be in the output data in both Total Width 122 and Total Height 124. The total width and height of the area encompassed by the input data files divided by the pixel size is displayed in 126, both of which are automatically calculated on the basis of the input data.

Total Width and Total Height—the user can enter the number of pixels at 120 and Total Width 122 and Total Height 124 can be calculated automatically for the out data. Alternatively, Total Width 122 and Total Height 124 values can be entered. Then utilizing the full extents of the input data, the resulting pixel size 120 can be calculated and displayed in the Pixel Size 120.

The EW Bound 126 and the NS Bound 128 entry fields allow the user to define a subset of the input data to be converted into output data. The values that are entered for Lower and Upper East/West Bounds 126 and Lower and Upper North/South Bounds 128 can cause Total Width 122 and Total Height 124 to be recalculated utilizing the Pixel Size 120 specified. The East/West Bounds 126 and North/South Bounds 128 are entered as coordinates that fit the coordinate system of the input data.

The Num Files EW 130 and the Num Files NS 132 allow the user to define the number of separate output files to create in the East/West and North/South directions. When values are entered into Num Files EW 130 and Num Files NS 132 fields, the Pixel Size 120 is used to calculate the Total Width 122 and Total Height 124. The Total Width 122 and Total Height 124 values represent the number of pixels in each direction in each of the output files.

Using the File Size EW 134 and File Size NW 136 fields, the user can specify the number of geographic units to be used to create each of the output files. The geographic units are the same units as the coordinate system for the input data. When values are entered in the File Size EW 134 and File Size NS 136 fields, and using the Pixel Size 120, the Total Width 122 and Total Height 124 are calculated. These represent the number of pixels in each direction for each of the output files.

Based on the values of the parameters entered by the user the system can calculate the number of output files that can be generated and displayed in the Number of Files 138.

The Elevation Value (Z coordinate) selection 140 is provided to allow the choice of how the elevation to be represented by each pixel can be calculated. The choices for calculating the elevation Value for a pixel assigned a value in the output data are First Point found, Last Point found, Average of all points represented by a single pixel, the point with the lowest Z coordinate, or the point with the highest Z coordinate. This is a limit in the example system, but should not be accepted as the limit in the method as anyone knowledgeable in mathematics or this field knows there are many more ways of determining a single value from a set of values.

The user can define the colors to be utilized for different elevations by pressing the Select Elevation Colors 142 also step 506 of FIG. 18. This can open another form discussed below.

The user can select an option to have a TFW file created 144 for each output file created. A TFW file is a file utilized by Geographic based systems to display each of the output files in a geographically correct location. The format for the TFW file is an accepted format for geographically referencing TIFF (the output files) files by those knowledgeable in the field.

The user can select to Auto Save 146 which can cause each of the output files to have a file name created by the system and that name utilized to save the file. The Run Name 80 can be the base of the newly created file name. If more than one output can be created by the system, then Auto Save 146 default to the files being automatically saved.

Pressing the Build Model button 148 can cause the system to begin processing the input data step 508 of FIG. 18 and creating the output data. The output data for each output file is displayed in the Display Box 54 (see FIG. 3) on the left side of the main screen. Step 508 may be executed one or more times based on a looping process. The number of times executed is determined by the number of input files defined by the user above in 64 and step 504 of FIG. 18.

Referring to step 506 of FIG. 18 and FIGS. 7-10 in their entirety is the form displayed when the User selects the Set Elevation Colors button 142 (see FIG. 5). This form provides the user with one of three methods of selecting elevation colors 150, selecting color ramps to be utilized 158 and loading a custom color ramp 158. The settings selected can also be saved and loaded from files containing saved color information 160.

Figure 8:
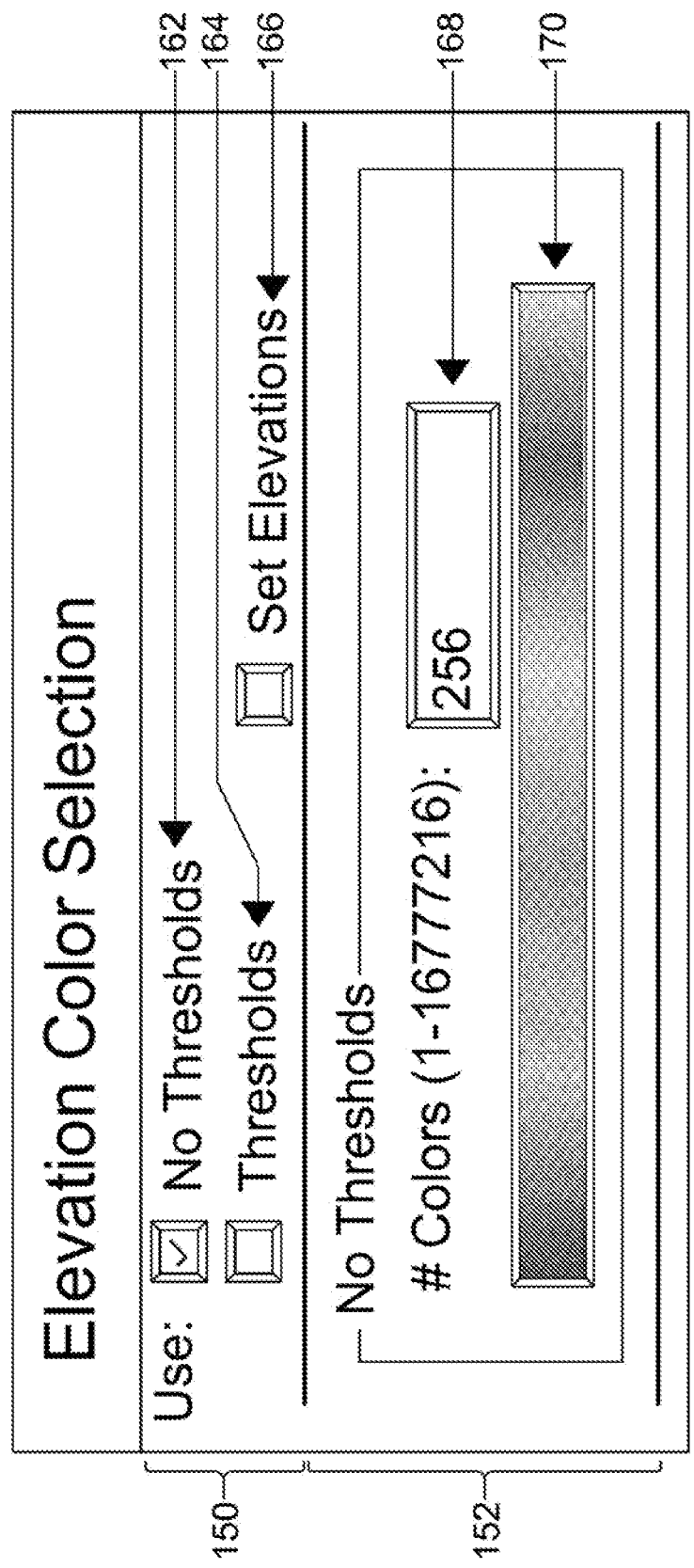
FIG. 8 is an enlarged view of the top left portion of the computer screen shown in FIG. 7 corresponding to setting the color selection method and setting the parameters for the No Threshold method of color selection.

In referring to FIG. 8, there are three methods available to define colors for elevations of points in the VBEM output data. They are using a single color ramp with No Thresholds 162, using up to four different color ramps and thresholds for different parts of the range of elevations 164, and using a single color ramp with variable elevation and color threshold settings 166.

In 152 of FIG. 8 is displayed the parameters that are available for the No Threshold method 162 of setting elevation colors. The user selects a color ramp from the color ramp list on the left of the form 158 of FIG. 7 that is displayed in 170 and the number of individual colors to be used for elevations 168. The color ramp is selected from 158 on FIG. 7. The colors to be used for elevations are evenly spaced along the color ramp selected. The left side of the color ramp can represent the lowest elevation and the right side can represent the highest elevation.

Figure 9:
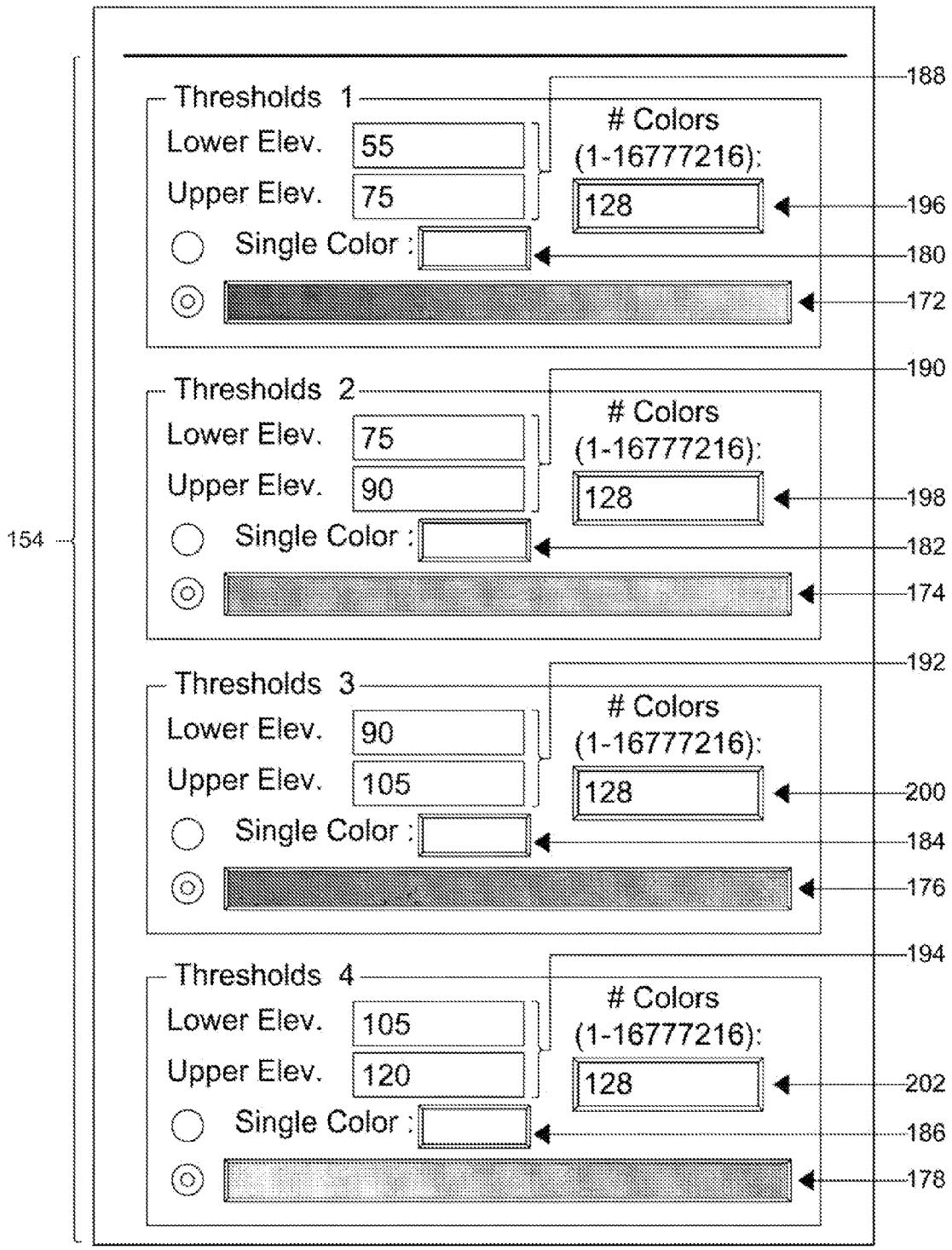
FIG. 9 is an enlarged view of the bottom left portion of the computer screen shown in FIG. 7 corresponding to setting the color selection using the Threshold method.

Referring to FIG. 9 (see 154 of FIG. 7) using the Threshold method (164 of FIG. 8) up to 4 color ramps 172, 174, 176, and 178 or single colors 180, 182, 184, and 186 can be assigned using elevation thresholds 188, 190, 192, and 194 for the range of elevations. The limit of four color ramps is a limit in the example system, but should not be accepted as a limit in the actual method. Color ramps are selected for 172, 174, 176, and 178 from 158 on FIG. 7. For each color ramp 172, 174, 176, and 178 or single color 180, 182, 184, 186 to be used, the user assigns the low and high elevation threshold for which this color ramp or single color can be applied. The number of colors 196, 198, 200, and 202 to be used can also be set. This identifies how many locations along the color ramp can be used to determine colors for elevations. When using a single color the number of colors does not have any meaning because only a single color can be used.

Figure 7:
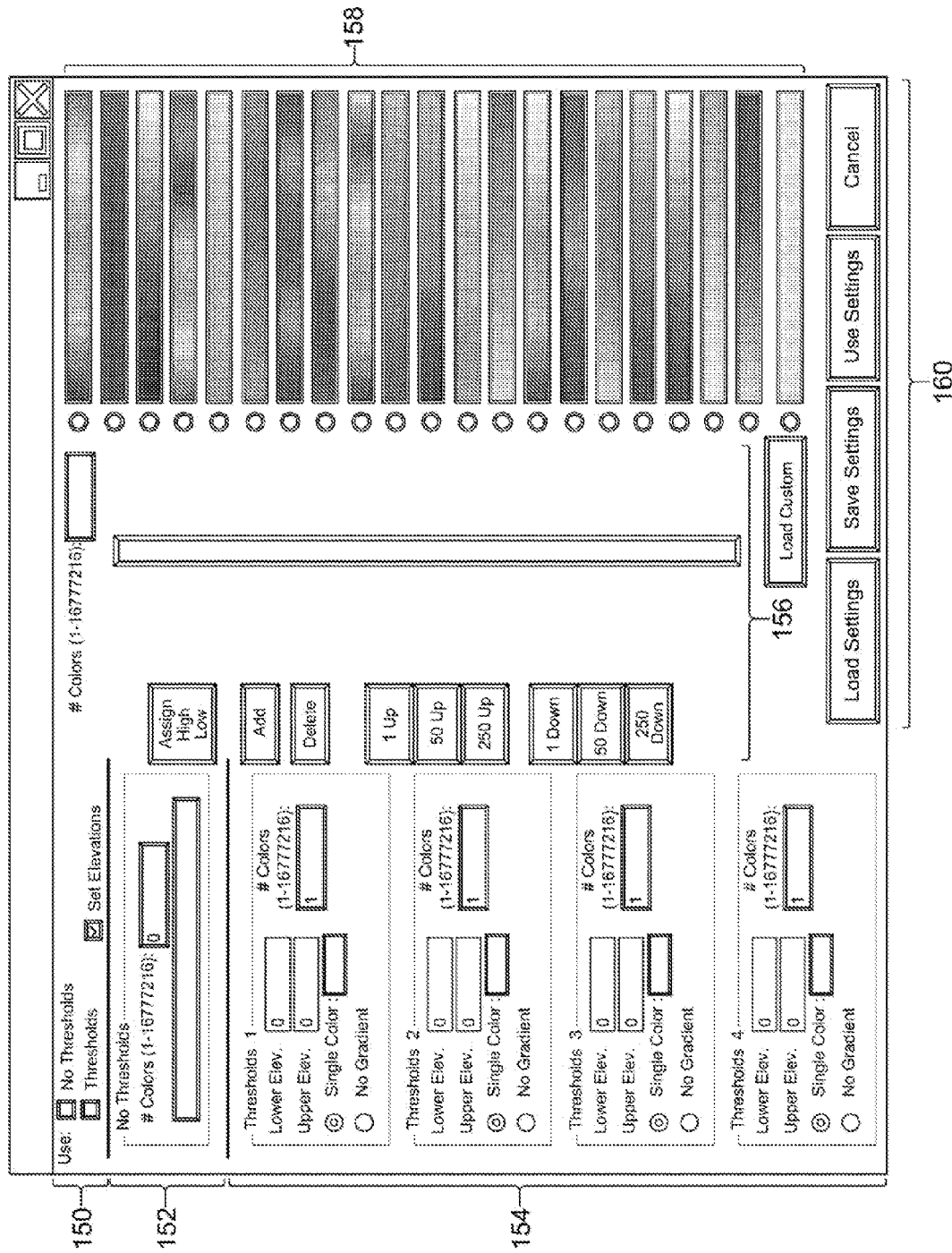
FIG. 7 is a computer screen corresponding to setting the color parameters for generating the VBEM Data from the BEM Data.
Figure 10:
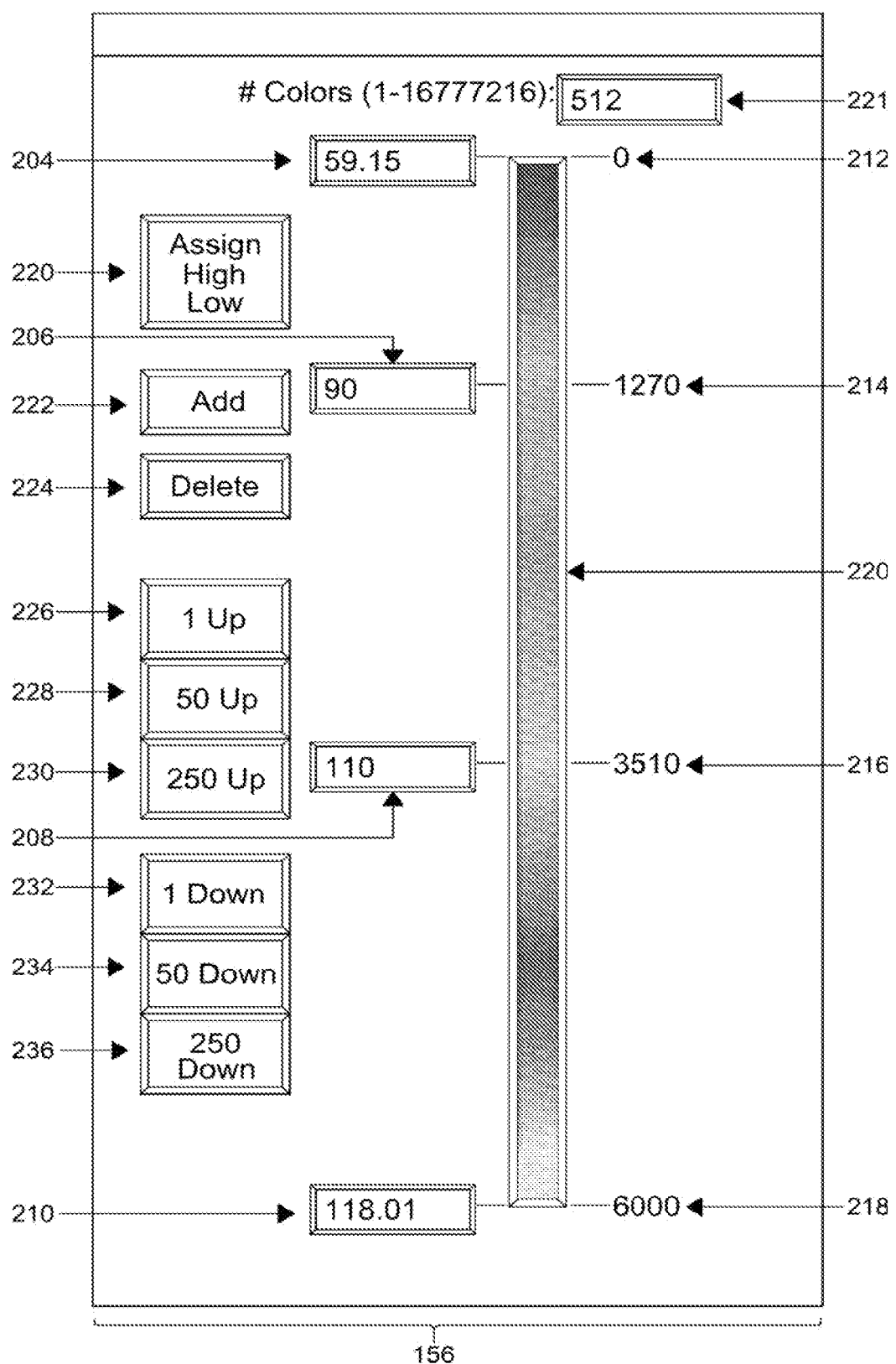
FIG. 10 is an enlarged view of the middle of the computer screen shown in FIG. 7 corresponding to the Set Elevations method of color selection.

Referring to FIG. 10 corresponding to 156 in FIG. 7, the Set Elevations method 52 can be used to assign colors to elevations 204, 206, 208, and 210 and assign elevation breakpoints to a point on the color ramp 220, thus allowing for variable spacing of colors along different portions of the color ramp. The number of colors 221 to allow when determining colors for pixels specifies the number of different colors that can be used to color pixels. These colors are spread evenly across the color ramp. A pixel may only be defined to have a single color but there may be up to this many colors used to color the pixels. For providing easier reference for placement on the color ramp 220, the color ramp was divided into a scale of 6000 sections, numbered 0 to 6000, and the number representing the position on the scale is displayed to the right of the color ramp 212, 214, 216, 218. For instance, in the diagram, the total range of elevations is 59.15, 204, to 118.01, 210. However, the breakpoint for the elevation of 90 can be placed closer to the 59.15 elevation than it would be if they were evenly spaced along the color ramp. The breakpoint for the 110 elevation has been placed further from the 118.01 elevation than it would normally be placed if they were evenly spaced along the color ramp. This means that the elevations between 59.15 and 90 can be represented with fewer colors on the color ramp. Also, for the elevations between 110 and 118.01, those elevations can be represented with more colors. This allows for the definition of a skewed color ramp with elevation breakpoints defined at specific spots on the color ramp.

Continuing reference to FIG. 10, breakpoints for the lowest and highest elevation breakpoints (the ends of the color ramp) can be set by pressing the Assign High Low button 220. Elevation breakpoints are created by pressing the Add button 222. Existing elevation breakpoints can be deleted by selecting a breakpoint, then pressing the Delete button 224. Breakpoints can be moved up and down the scale by selecting a breakpoint and pressing the 1 Up 226, 50 Up 228, 250 Up 230, 1 Down 232, 50 Down 234, and 250 Down 236 buttons. The numbers on these buttons represent the number of scale values on the right side of each breakpoint 212, 214, 216, and 218 that the breakpoint can be moved. Up to 6000 individual elevation breakpoints (4 breakpoints are shown in FIG. 10) can be set. The fact that the scale was divided into 6000 sections and 6000 breakpoints can be defined is for reasons related to how the color ramp is displayed in this example application and should not be considered a limiting factor to the system.

Referring to the second inventive concept, steps 512-534 in the flow diagram FIG. 18 where steps 518-532 may be executed more than once based on a looping mechanism. Also referencing renderings of graphical user interfaces (GUIs) in FIGS. 12-15, and VBEM data FIG. 19, the disclosure provides a variable method and system to generate an Interpolated Surface Model Mask (ISMM), as illustrated in FIG. 20, from the Visual Bare Earth Model (VBEM), as illustrated in FIG. 19 that can contain much more complete, enhanced, and/or visually identifiable object outlines and more complete elevation information not contained in the VBEM. For this example system, the objects that can have outlines enhanced can be man-made structures within the area covered by the VBEM data.

VBEM data (output data from the first inventive concept) in a GeoTiff format is used as input data. In this input data, structure outlines may be incomplete, occluded, or combined with other structure outlines or other areas where VBEM information was not available. There are also typically areas under vegetation and other objects for which there is no information available in the VBEM. Thus, not all the pixels of the VBEM data in the GeoTiff file may have elevation values set representing the pixels where no elevation information was available for reasons described above. The output from the method and example system can be an Interpolated Surface Model Mask (ISMM) which is a GeoTiff file containing data that represents more complete, enhanced, and visually identifiable building outlines and more complete elevation information than was contained in the original VBEM data. Also in the resulting ISMM, occlusions are removed and new data points are interpolated that fill in voids where no data was available in the original VBEM used as input data.

Figure 19:
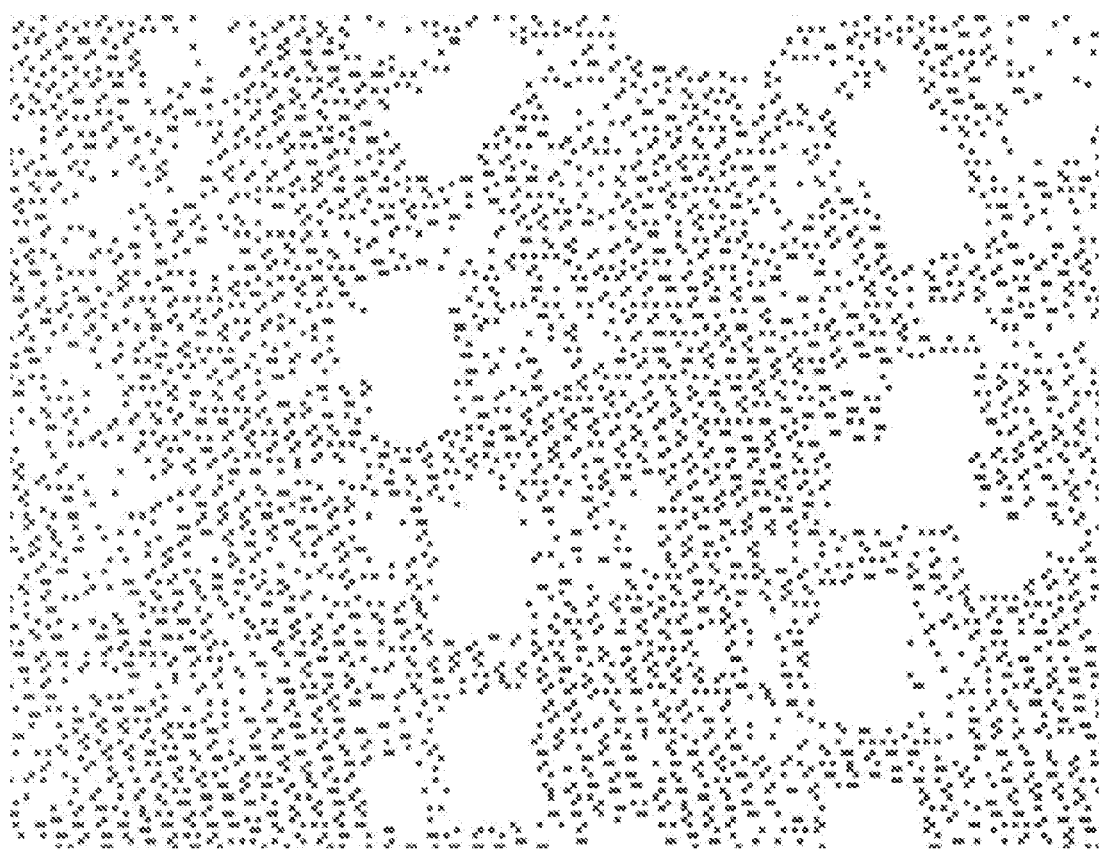
FIG. 19 is a picture off the VBEM output data that was generated from the input BEM data according to one or more aspects of the disclosure.
Figure 20:
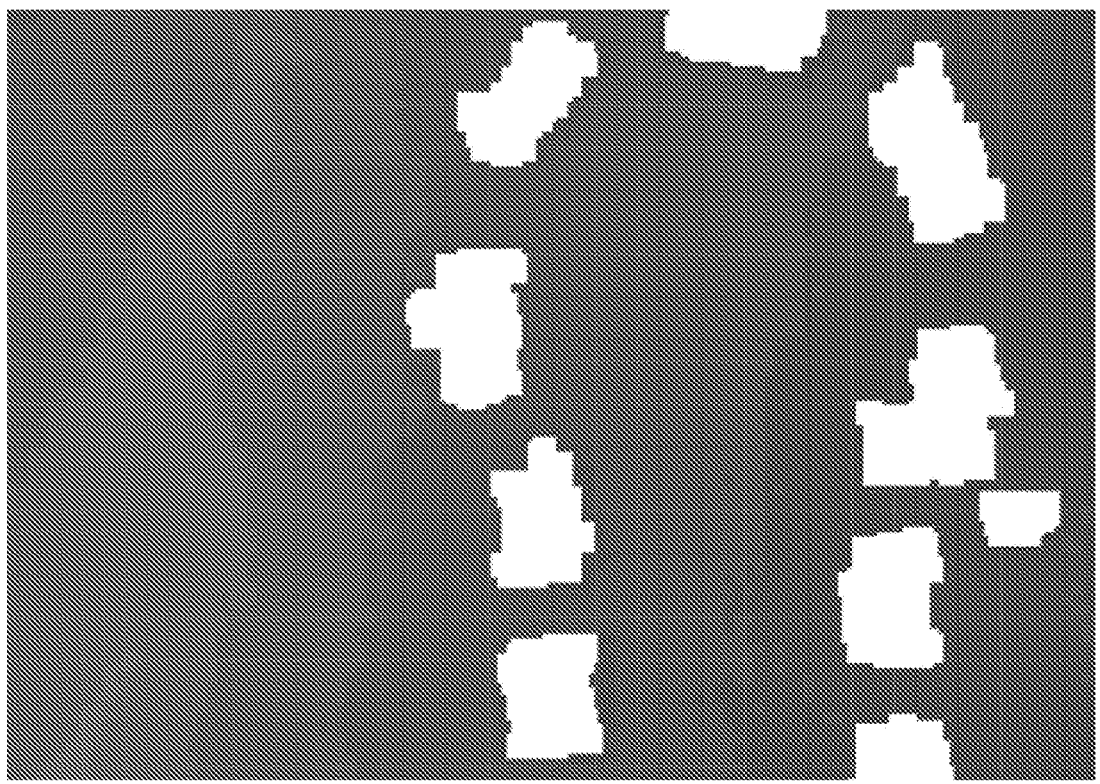
FIG. 20 is a picture of ISMM data that was created from the same VBEM data shown in FIG. 19 according to the disclosure.

In the input VBEM, FIG. 19 and data step 510 of FIG. 18 the elevation value is represented by the values of the red, green and blue (e.g., shown as various shades of gray) components of the color of each pixel. Pixels that do not have an elevation value set have no color (e.g., red, green and blue all set to 0). This is also true if there are any resulting pixels in the output ISMM data that do not have an elevation value set. If more than one VBEM input file is selected, step 518 in general, and made up of steps 520-532 can be executed more than once using a looping mechanism. However, depending on the parameters in 242 discussed below and set by the user, some steps 520-532 may be executed multiple times for each input file and some steps may not be executed at all.

Figure 12:
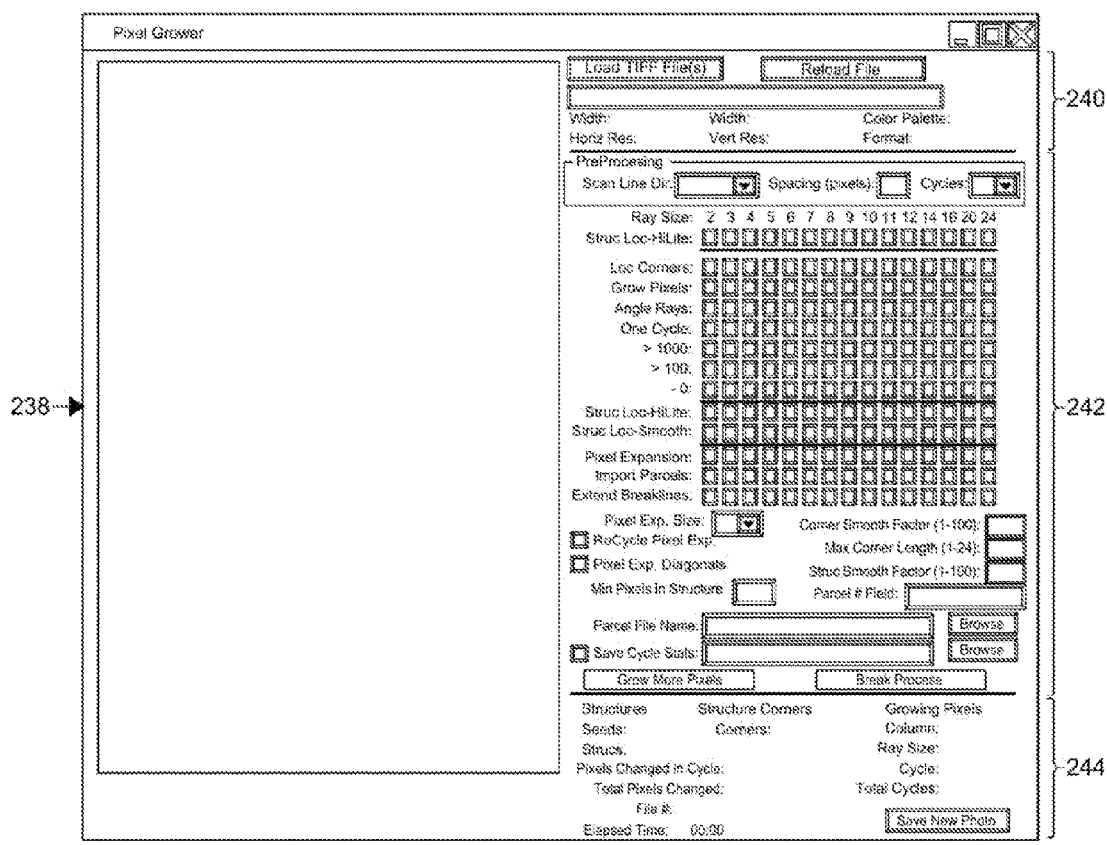
FIG. 12 is a computer screen showing the data display area and control panel corresponding to creating the Interpolated Surface Model Mask (ISMM) from the VBEM.

In referring to FIG. 12, the example system shown is meant to represent all possible systems that could be constructed to perform all or part of the method and processes described herein. The user of the method and example system has the option of selecting and specifying parameters, processing steps, and the order of those processing steps in order to convert the VBEM input data into the above ISMM output data.

Continuing with FIG. 12, the right hand side of the example system 238 (black box) is where the initial VBEM input data FIG. 19 is displayed and the user can view the progress of the processing as the ISMM FIG. 20 is created. The left side 240, 242, and 244 is the control panel and allows the user to enter the available parameters that are used to direct the processing during its execution.

In some implementations, the elevation values of the pixels are not used in the determination of whether pixels without elevation values should be given elevation values. For example, the existence or lack thereof of any elevation value can be used, instead of the actual elevation value itself. The actual elevation values can be used to calculate a new elevation value for pixels that do not have an elevation value (e.g., pixels having a void value) but are determined, by an embodiment of the disclosure, to have an elevation value.

Figure 13:
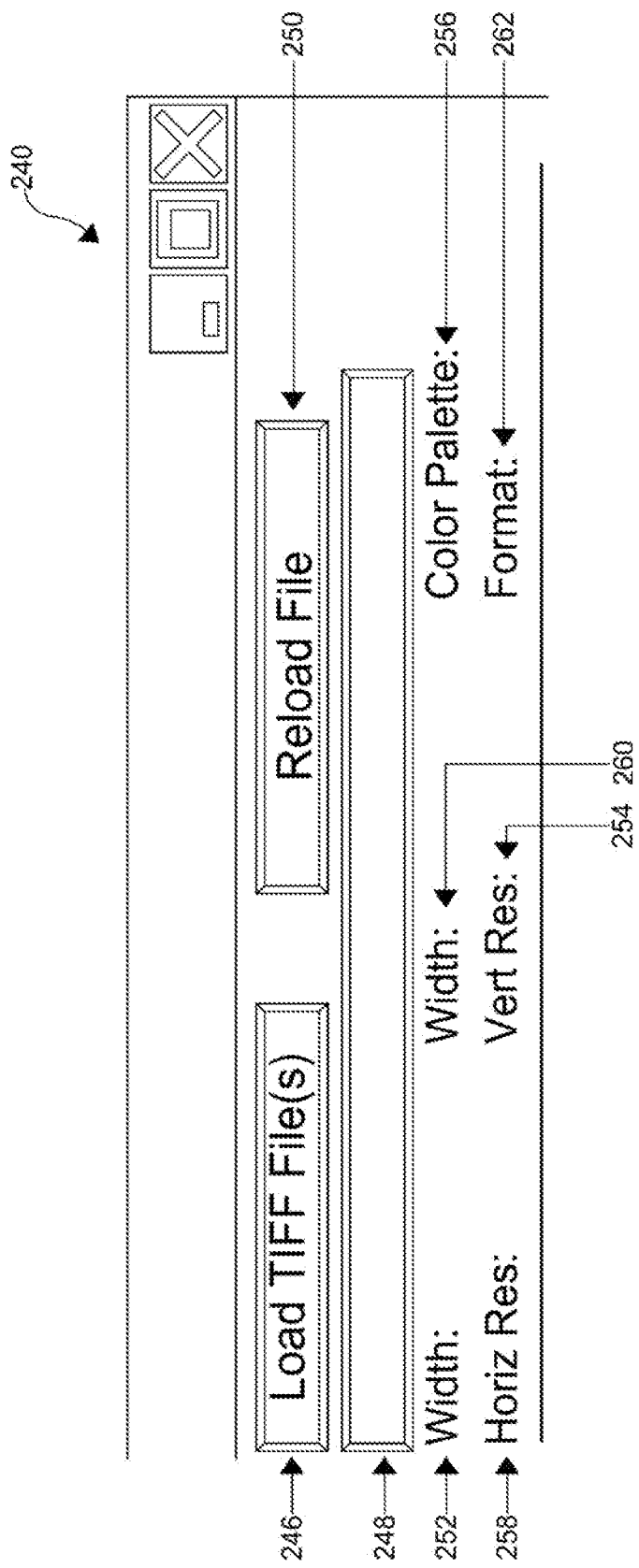
FIG. 13 is an enlarged view of the top portion of the control panel portion of the computer screen shown in FIG. 12 corresponding to the control panel used for selecting the VBEM input data.

FIG. 13 (which is a detail of element 240 in FIG. 12) represents the upper portion of the control panel of the example system. It provides the user a means to enter the names of the file or files (input VBEM files 510) that are to be processed. Pressing the Load TIFF File(s) button 246 can render (e.g., display) to the user a file selection form that can be used to select one or more VBEM files for processing. The list of files selected is displayed in the text area 248 below the button. The reload button 250 can reload single files (only operates when one file is selected for processing). This is commonly used when experimenting and the same input VBEM file is processed multiple times to see the results of different parameter settings. In the Width 252, Height 254, Color Palette 256, Horizontal Resolution 258, Vertical Resolution 260, and Format 262 fields, the respective properties of the input file selected are displayed. If multiple input VBEM files are displayed, these fields can be blank.

Figure 14:
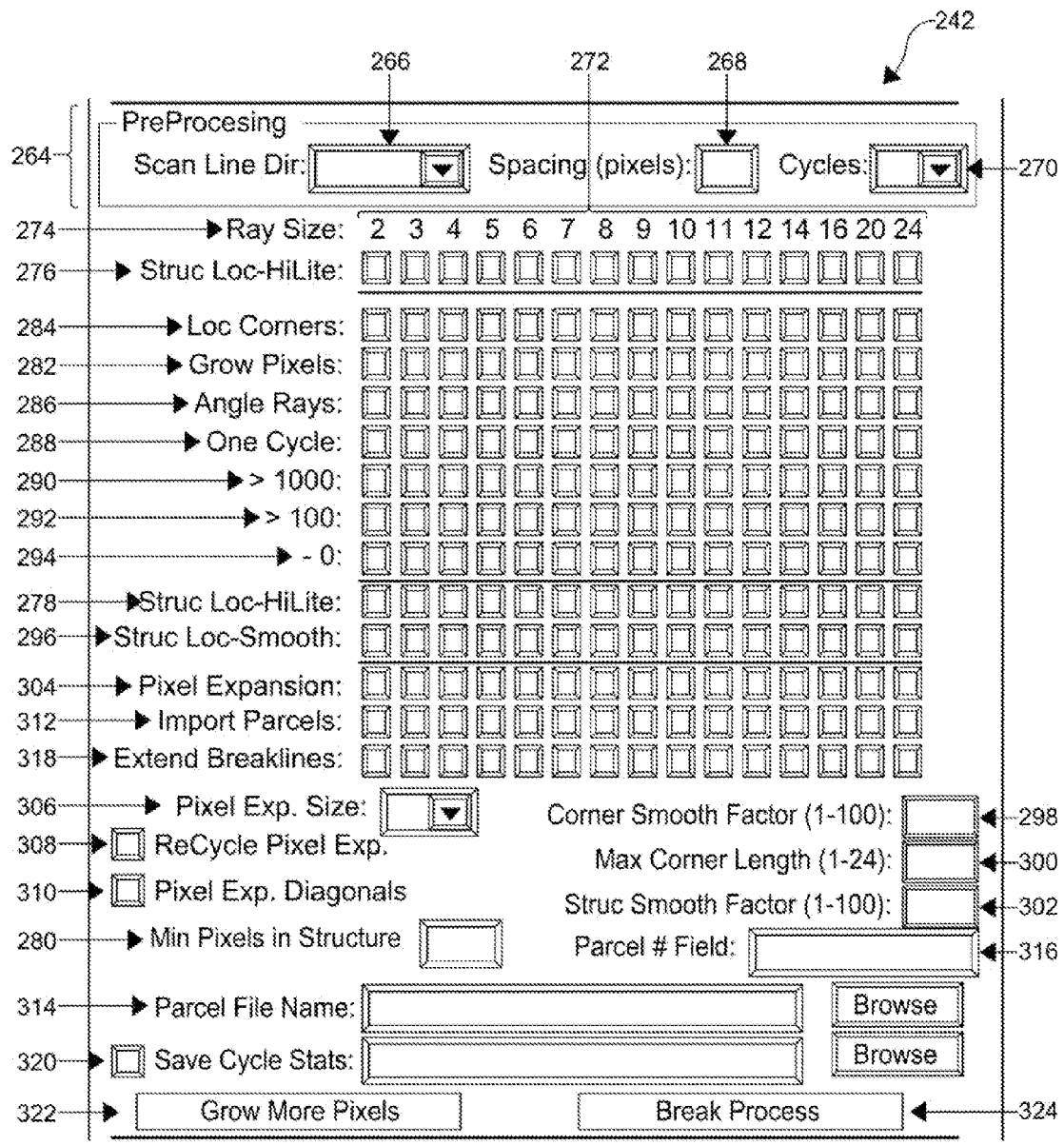
FIG. 14 is an enlarged view of the middle portion of the control panel portion of the computer screen shown in FIG. 12 corresponding to the control panel used to set the processing parameters to create the ISMM from the VBEM.

FIG. 14 represents the middle of the control panel of the example system (242 of FIG. 12). It provides a means for the user to specify the parameters steps 512-514 of FIG. 18 that are to be used for the execution of the method and processes described herein.

Figure 21:
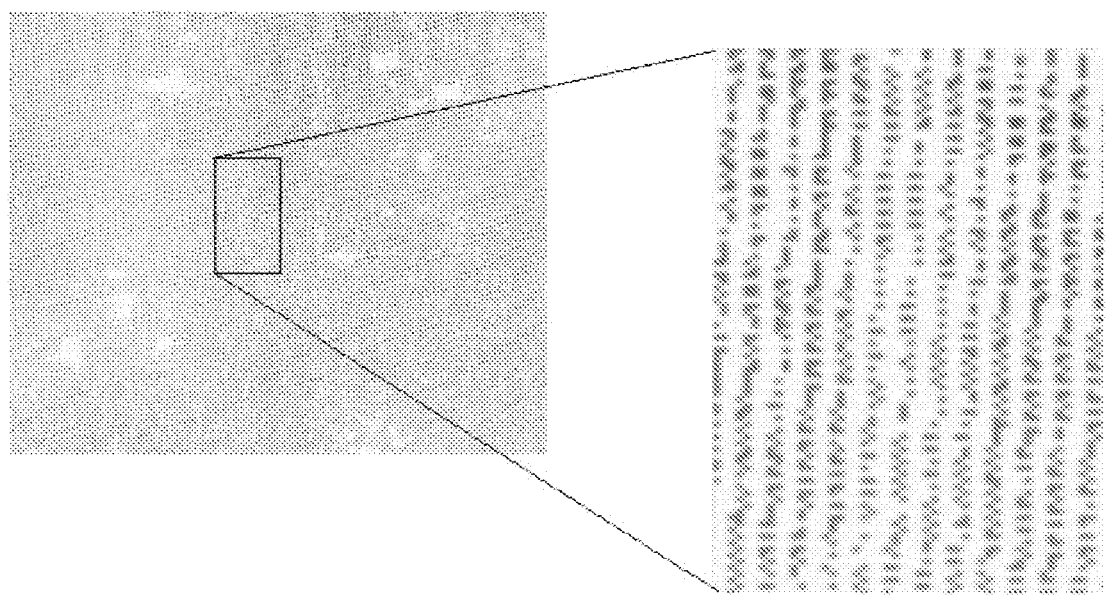
FIG. 21 is a picture of VBEM data on the right and an enlargement of a small area on the left to correspond to the direction scan-lines are flowing.

In FIG. 14 and step 512 of FIG. 18, the first parameters that can be set are for Preprocessing 264 utilizing scanlines Preprocessing is optional and does not need to be included in the method if the user chooses. These parameters control how step 520 in FIG. 18 is executed. Scanlines, FIG. 21, are visual patterns of parallel lines of data points that are sometimes visible in the input VBEM file. In FIG. 21, the scanlines flow predominately vertically. Scanlines are created as a byproduct of the digital elevation data collection method, speed of collection, and data processing methods. They can appear as straight, wavy, or combinations of straight and wavy lines of points.

For PreProcessing the user of the system best estimates if the scanlines follow a Vertical or Horizontal direction 266 and the distance between the scanlines 268 in pixels. Also the number of preprocessing cycles 270 is selected. The user can choose 1 or 2 cycles. If preprocessing parameters are selected, the process, before any other processing steps are executed, can examine the VBEM input data file for each pixel that has a color set. For each of these pixels a search is done in either the vertical or horizontal direction, depending on the scanline line direction 266 selected by the user, from each side of the colored pixel. The search is performed on adjacent pixels in the given direction for a distance of the number of pixels specified by the user as the spacing 268. The search is looking for pixels that have a color set. If a pixel with a color value is found before exceeding the search distance of pixel spacing 268, then searching for that original pixel in that direction 266 is terminated. If there are pixels with no color (e.g., or elevation data) between the first pixel and the pixel found in the direction being searched, colors (e.g., or elevation data) can be interpolated for the pixels between the two pixels with known colors (e.g., or elevation data). The new interpolated colors for the respective pixels are placed in the data for those pixels. The interpolation can be done by calculating the distance between the two known pixels, then taking the ratio of the distances each pixel with no color is between the two known colored pixels. Using this ratio, the differences of the individual color values, red, green, and blue for the two know pixels can be considered, and a new color value can be calculated for each of the unknown pixels using the ratio. This results in a smooth color change as viewed visually as the color changes progress between the two known colored pixels. This process continues until all the pixels in the input VBEM file have been examined. When this is complete, the process is automatically started again, but searching for pixels in the direction not selected by the user for the Scan Line Direction 266 is performed.

The Cycles value 270 can be set to 1 or 2. If the Cycles is set to one a search in one scan line direction 266 and then the other scan line direction is performed. If the Cycles value 270 is set to 2, then the two searches are performed each in opposite directions, then the same two searches are repeated but using all the colored pixels added during the previous two searches.

The parameters for the Processing Steps and the Order they are performed 242 and step 514 in FIG. 18 can now be defined. These parameters control how steps 524-532 in FIG. 18 are executed. There are 15 columns of boxes 272 that can be turned on and off and a Ray Size 274 above each column. The Ray Size represents the distance in pixels, a search can be performed from a pixel with a known color, for another pixel with a known color.

Each row of check boxes also has a processing term next to it. Each of these terms represents a processing parameter that can be set for each Ray Size. Some of the parameters represent unique processing steps and some represent parameters to further define a how a processing step should be performed.

When a check box in the row for Struc-Loc Hilite 276 is selected a processing step 526 in FIG. 18 can be performed that can search for pixels with no color that may be interpreted as representing man-made structure locations. These pixels can then be Hilited (or tagged), so that no more processing can be performed on those pixels. The structure search is performed by looking for groups of adjacent pixels that do not have a color value set. Once a candidate group of pixels is located an edge search is performed for the group to determine the exact extents of the group of pixels. Edge location algorithms are common and should be familiar to anyone with knowledge in the field. Once an edge is determined that makes up a closed shape, the area (in pixels) inside the edge making up the closed shape is computed. If the area is equal to or smaller than the Minimum Pixels In Structure value 280 discussed later, then the pixels in this group are hilited and cannot be processed in subsequent processing steps.

The ninth row of check boxes is also labeled with Struc-Loc Hilite 278. This allows this processing step 526 of FIG. 18 to be executed at a different time in the total set of steps to be processed.

Selecting the Struc-Loc Hilite processing step a second time on the same line of check boxes can cause the processing step 526 of FIG. 18 to remove the hilite (tags) from the pixels. This can allow those pixels to be processed again.

The Grow Pixels 282 and processing step 522 of FIG. 18 is the next step that can be performed in the process. This step searches for pixels that do not have a color value set, but are between pixels that are less than or equal to the Ray Size 274 in pixels apart. The search is performed in both the horizontal and vertical directions from all sides of a colored pixel. The uncolored pixels between the two colored pixels then have color values interpolated, and inserted into those respective pixels.

The other rows of check boxes in the section with the Grow Pixels 282 are all parameters that can be set to further define how the Grow Pixels step 522 of FIG. 18 is executed. The Loc Corners parameter 284 can be set so that when two pixels with color values set are found, the uncolored pixels between them can be checked to determine if they could be part of a corner of a structure. If they are determined to be part of a structure, then these pixels cannot have color values interpolated for them. To determine if the pixels with unknown color values are part of a structure corner, a check is performed to see how large the group of pixels with unknown colors is that is "in-sight" of the uncolored pixels being checked. This is done by locating the edge of the group of pixels with no colors. Then the distances between the pixels with no colors that are being checked and the points in "line-of-sight" of the pixels with no colors and along the edge of the group are calculated. This set of distances is then examined to determine the actual area that can "seen" from the original uncolored pixel. If this area is larger than or equal to the Minimum Pixels In Structure 280 value, described later, then these uncolored pixels are determined to be part of a structure and no color values are interpolated for them.

The Angle Rays parameter 286 can be set so that searches can be performed along the diagonals from pixels with known colors. If not set, then searches are only performed in horizontal and vertical directions.

The One Cycle 288, >1000 290, >100 292, and =0 294 parameters all define how many times the Grow Pixels processing step is performed on the entire set of data for the respective Ray Size 274. If One Cycle 288 is selected, one pass is made through the data, then the next item in the processing steps is begun. If >1000 290 or >100 292 is selected, the Grow Pixels step can process the file until an entire pass through the data results in less than 1000 changes, or 100 changes respectively. If =0 294 is selected, then the Grow Pixels step can process the file until an entire pass through the data results in no changes being made.

The Struc-Loc Smooth 296 processing step 524 of FIG. 18 works similarly to the Struc-Loc Hilite 278 step 526 of FIG. 18. However, instead of the pixels that are determined to be part of structure being hilited, the edge of the structure is smoothed. The parameters Corner Smooth Factor 298, Max Corner Length 300, and Struc Smooth Factor 302, discussed below, are necessary for the smoothing operation to be performed. The smoothing operation implemented for this method is just one of many common smoothing processes that are available to those knowledgeable in the field. This should not be taken as to limit what smoothing process can be used as part of this system. To perform the smoothing operation, the edge of the group of pixels is determined. Then the smoothing operation is performed of the pixels making up the edges of the group of pixels. The edges are then used to determine the pixels that may have been in the structure group of pixels, but are now outside of the new smoothed edge. Those pixels then have color values set. The color values set are the same values as the closest pixel with a known color.

The Pixel Expansion 304 and processing step 530 of FIG. 18 requires the Pixel Expansion Size 306 also be set. It can be set to 1 or 2. The Pixel Expansion step can examine the pixels in the data for pixels with a color value set but have no adjacent pixels within a distance of the value set for the Pixel Expansion Size 306 and have no color value set. If a pixel is found with no adjacent pixels with color values set, then all the surrounding pixels in the vertical and horizontal directions within a distance of the Pixel Expansion Size 306 are given the same color value as the original pixel that was found.

The Pixel Expansion Diagonals 310 parameter can also be set. If this is set, then pixels within the Pixel Expansion Size 306 distance in the Vertical and Horizontal directions while the Pixel Expansion step 530 of FIG. 18 is being executed can have their colors set and pixels along the diagonals from the original pixel can also have their colors values set.

The Recycle Pixel Expansion 308 parameter can cause the process to repeat the Grow Pixels step 522 of FIG. 18 in the process that have already been executed for the Ray Size 274 in which the Pixel Expansion box 304 has been selected.

The Import Parcels 312 parameter and step 528 of FIG. 18 can import lines representing parcels for the geographic area that is being processed. The Parcel File Name 314, 516 on FIG. 18) must be provided and the field in the database that contains the parcel number 316 must also be provided. When the parcel lines are imported, any pixel that does not have a color set, can be tagged as part of a parcel line. These newly tagged pixels, in further processing, can be interpreted as pixels with a color value, but the color value is unknown to prevent any color value from being used to calculate a color value for other pixels. The example system has the capability to import parcels that are in a shapefile format. This is a common file format known to anyone with knowledge in the field. This is not meant to limit from what files or other means parcel information could be imported.

The Extend Breaklines 318 parameter and step 532 of FIG. 18 can extend lines of single colored pixels until they intersect with a pixel that has a color value set. A line of single colored pixels is defined as colored pixels that are in a straight line in the horizontal or vertical direction and have no adjacent colored pixels to any of the colored pixels in the line except for other pixels in the line, and the first pixel in the line may have one adjacent colored pixel not included in the line of pixels.

The Minimum Pixels In Structure 280 value is set to define the minimum number of pixels in a group of pixels that must not have a color value set in order for those pixels in the group to be classified as part of a structure.

A Cycle Statistics file can be created during processing by defining a file name 320 for the file. Some of the statistics included in the file are, but not limited to, the file name being processed, processing steps and relevant parameter settings for that step, number of changes made in each cycle of each processing step, and the elapsed time for each cycle in each processing step. This file is an example and is not meant to limit how or by what means any information pertaining to processing can be saved.

Pressing Grow More Pixels button 322 can cause processing step 518 in general and processing steps 520-532 in particular to begin processing of the VBEM input data. For each VBEM input file 510 selected by the user of the example system, the series of processing step 518 can be executed with processing steps 520-532 being executed more than once or not at all. In one aspect, processing can cause a set of ISMM output data 534 to be produced from the VBEM input data.

In a scenario in which processing needs be stopped before it has been completed, the Break Processing button 324 can be pressed.

Figure 15:
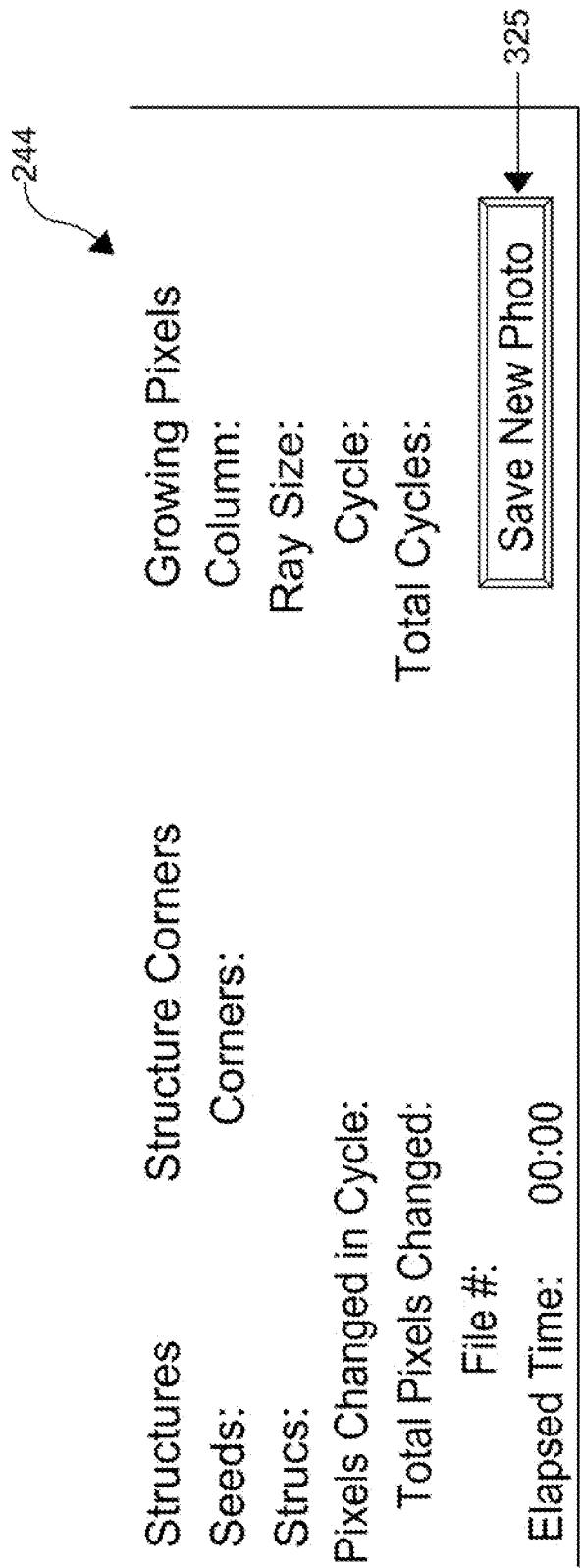
FIG. 15 is an enlarged view of the lower portion of the control panel portion of the computer screen shown in FIG. 12 corresponding to display of progress information during creation of the ISMM from the VBEM.

FIG. 15 shows the lower section of the control panel (244 on FIG. 12). This section displays progress information as the system executes processing step 518 in general and steps 520-532 in particular to create ISMM output data 534 from VBEM input data 510. Once processing of the VBEM input data FIG. 19 to ISMM output data FIG. 20 has completed, The Save New Photo 325 button can be used to save the ISMM data in a GeoTiff formatted file. Pressing this button can permit the user to select a new file name in which to save the data. If more than one VBEM input file is selected, the ISMM data 534 is saved automatically once processing is completed for each of the VBEM input files 510. The GeoTiff format was used to save the data because it matched the format of the input data. It should not be assumed to be a limiting factor in the system as there are a number of other formats the ISMM data could be saved in that are available to anybody knowledgeable in the field.

The progress information displayed in FIG. 15 is not an integral part of the system and is only available so the user can observe the progress of the system. It should not be assumed to be either necessary or unnecessary to the disclosure, but may be helpful to the user in determining changes in parameter settings that may be necessary when processing future sets of data.

In one aspect, the disclosure provides an example system for comparing Interpolated Surface Model Mask (ISMM) data, the output data from the second general inventive concept, to a set of existing data containing the edges of objects representing their shape for the purpose of determining the difference between the shape of the objects in the object data set and the shape of those same objects shown in the ISMM data. This concept in general is known in the field as "Change Detection". In the example system, in one aspect, ISMM data can be compared with existing Property Assessor's Computer Aided Mass Appraisal (CAMA) system records showing structure outlines. It should be appreciated that this example was presented here because of the availability of data; however, it should not be assumed to be a limiting factor in the system as ISMM data describing anything can be utilized to compare to the outlines of virtually any type of objects.

In the present disclosure, an Interpolated Surface Model Mask (ISMM) 534 and FIG. 20, resulting from second general inventive concept, is used as example input data. Such data is only illustrative and does not limit the various aspects of the disclosure. Bare Earth Model Data (BEM) 500 and FIG. 11, when converted to a VBEM, FIG. 19, currently does not have the quality (number of points per unit of area) necessary to be used for this purpose, thus resulting in the need to create the ISMM FIG. 20. But with rapidly occurring technical enhancements in the collection and processing of digital elevation data, it is expected in the future that BEM data converted to a VBEM (e.g., FIG. 19) without the need to create an ISMM can have the quality necessary to be used as input data.

Figure 16:
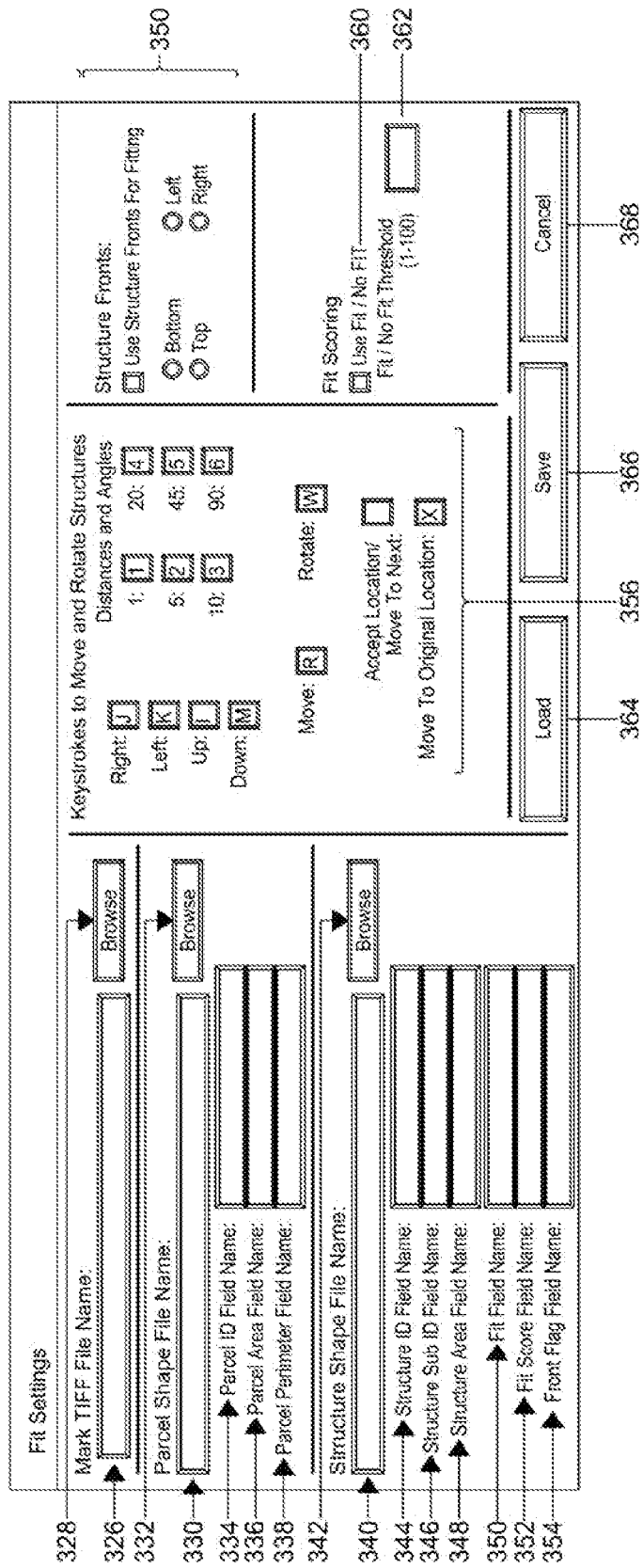
FIG. 16 is a computer screen corresponding to the parameter setting for comparing the ISMM data to the Digital Object Outlines to detect change.

Referring to processing steps 534-548 of FIG. 18 and FIG. 16 illustrated the control panel for an example system in accordance with one or more aspects of the disclosure. In one aspect, this example system demonstrates the viability of at least some aspects of the disclosure and is not meant to limit the disclosed aspects by way of the example system appearance, the way the example system operates, or the way an end-user can interact with the system.

FIG. 16, the control panel appears when the example system is started. In one aspect, the control panel can permit the user to enter one or more parameters that can be necessary for the system to operate.

In step 536 of FIG. 18, the first parameter to be entered is the Mask Tiff File Name 326. This is the name of the Interpolated Surface Model Mask (ISMM) file or files 534, from the second general inventive concept. Pressing the Browse button 328 allows the user to select from a list of files.

Still referring to step 536 of FIG. 18, the second parameter can be optional. It is a Parcel Shape File 330, step 516 of FIG. 18. This file provides the outlines of parcels boundaries. Pressing the Browse button 332 allows the user to select from a list of files. The Parcel Shape file is a file in shapefile format, a common data format to anybody knowledgeable in the industry. This file or its format should not be taken to limit the system as parcel information could be utilized in many other formats. Along with the parcel file name 330, the user must enter the field names that contain the necessary data about the parcels. These fields contain the Parcel ID 334, Parcel Area 336, and Parcel Perimeter 338 information. Parcel information can be used in the system to further enhance the ability to compare the digital structure outline information from two separate data sources. It allows for more reliably determining the front of structures and their orientation on the parcel. The front of parcels can be reliably determined by comparing the current parcel to adjacent parcels. It is typical in residential areas that the vast majority of structures have their fronts oriented toward the front of the parcel on which it resides.

In one aspect, in step 536 of FIG. 18, the shapefile (e.g., digital object outlines) 538 containing the Structure Edge information 340 must also be specified. Pressing the Browse button 342 can provide the user with a means to select a file from a list of files. The Structure Shape file is a file in shapefile format, a common data format to anybody knowledgeable in the industry. This file or its format should not be taken to limit the disclosed systems as structure edge information may be utilized in one or more other formats. Along with the Structure file name, the user must enter the field names that contain the necessary data about the structure. These fields contain the Structure ID 344, Structure Sub ID 346, and Structure Area 348.

Still referring to step 536 of FIG. 18, three other field names can be used to define where information about how well the existing structure edge information compares or "fits" to the ISMM. These fields are the Fit Field 350 defining whether the example system determined if there was a suitable fit, a Fit Score 352 that was assigned to describe how well the fit occurred, and a Front Flag field 354 that is set to represent what side of the digital structure outline was determined to be the front. This field is set to 1, 2, 3, or 4 corresponding to the right, left, top, or bottom side of the existing digital structure outline that was determined to represent the front of the structure. These fields are contained in the Structure file 340 specified.

The next fields represent keys on a keyboard 356 that can be pressed to manually translate and rotate the edges of an existing digital structure outline to fit the ISMM data more accurately. These keystrokes are optional because depending on how the example system was started, the system may automatically compare all the digital structure outlines to the ISMM data without pausing, or the system may pause after each comparison is performed and allow the user to manual adjust the digital structure outline to achieve a better fit with the ISMM Data. The fields are available to make the system easier for the user to operate and not integral to system operation or the example system and therefore should not be considered necessary for the example system to operate.

Still referring to step 536 of FIG. 18, the front of the digital structure outline, if known, can be defined using the Structure Fronts information 358 settings and knowledge set of data containing the digital structure outline information. In some sources of information the front of the structure always faces a certain direction. This can be specified by selecting the desired option 358.

The example system can determine if an existing digital structure outline 538 does or does not, fit the ISMM Data 534 and determine a score from 1 to 100 representing the quality of the fit. The lower the score the better the fit. In step 536 of FIG. 18, if the system is to determine whether a Fit occurred the Use Fit/No Fit option 360 should be turned on. If the Fit/No Fit option 360 is selected, a Score Threshold 362 can also be specified for which digital structure outlines that receive a Fit Score less than or equal to the specified threshold can be deemed to fit, while scores higher than the threshold can be deemed not to fit.

The settings defined above can be Loaded 364 from a saved file. When the user Saves 366 the settings, the processing of the data begins. If processing should not begin, the Cancel button 368 can be pressed.

FIG. 17 appears when the processing, steps 540-546 in FIG. 18, begins. It displays progress information as the processing is performed. The top two lines of information detail what operation is currently being performed 370 and on what structure 372, identified with the structure ID shown.

The next three items are the names of the input files specified on the previous parameter entry form. For the Mask Name (ISMM file) 374, Parcel file name 376, and existing Structure outline file name 378. The next two lines show the number of parcels 380 that have been processed and the number of those parcels that had a front successfully determined 382.

As processing continues, the next four lines can display the total number of structures that can be processed 384, a total of how many structure have currently had their fronts determined 386, the number of structures that the example has determined to fit with the ISMM data 388 and 534 of FIG. 18, and the number of structures that have not fit 390 the ISMM data.

The next three lines show the number of parcels that have been found that contain a single structure 392, parcels with multiple structures 394, and parcels with no structures 396. These are all numbers that change as processing progresses.

The last five lines of information are lines detailing how the current structure being processed fit with the ISMM Data 534 of FIG. 18. The Edge Match 398 shows the score that was calculated to represent the quality of the fit between the structure edge information and the ISMM Data. The score can be calculated from the values described below that are displayed in the following fields.

The # Edges Match 400 shows the number of edges from the digital structure outline data 538 that were determined to match the ISMM Data 534 of FIG. 18 out of the total number of edges. This is displayed as "XXX of YYY" where XXX is the number of edges that matched and YYY is the total number of edges. The Edge Length Match 402 is a number ranging from −100 to 100. The closer the number is to 1 the better the match on the length of the edges. A value of 1 would represent that the lengths of all the edges from the structure edge data were exactly the same length as their corresponding edges from the ISMM Data.

The Size Match 404 displays a number ranging from −100 to 100 that represents how close the area defined by the edges from the existing structure edge data are to the area defined by the ISMM Data. The closer this value is to 1 the more equal the two areas are.

The Orientation Match 406 determines a bisector along the longest dimension for each of the current digital structure outlines being compared to the ISMM Data. The angles of the two bisectors are compared and a value computed for that ranges from 1 to 100 to represent how close they are. A value of 1 represents an exact match. The further the value is away from 1, the worse the match of the angles of the bisectors.

View Scoring 407 displays a graph of the scoring distribution. It has no bearing on how the example system operates and should not be considered to be necessary or unnecessary to the embodiments of the present disclosure.

None of the above methods of determining how well a "fit" occurred between a digital structure outline 538 and the corresponding structure defined in the ISMM Data 534 and FIG. 20 should not be assumed to be a limiting factor in how this example system operates or how a fit is determined by the subject disclosure. There are many other methods that could be used in addition to or to replace the methods discussed above. There are many mathematical and statistical methods of assigning values for a "fit" that anyone knowledgeable in the field would be aware of.

In the example system, as processing progresses steps 540-546 in FIG. 18, corresponding digital structure outlines 538 and ISMM Data 534 are analyzed. The following steps are performed to analyze a single digital structure outline. The steps operate in sequence as shown in FIG. 18 with a looping mechanism provided to return to step 540 for the next digital structure outline 538. The processing step currently being executed is shown in the processing step field 370. Processing stops once all the information in the digital structure outline information 538 has been processed.

The digital structure outlines is retrieved from the existing structure data set 538. The structure ID is displayed in the Structure ID 372.

If a Parcel Shape File, 330 of FIG. 16, was specified in the parameter settings, then the parcel information with the same ID as the existing Structure ID is retrieved from the Parcel Shape File.

In step 540 of FIG. 18, the Parcel information for the current parcel is compared to the adjacent parcels in the parcel information to see which side(s) of the current parcel is not bordered by an adjacent parcel. The side(s) of the parcel that are not bordered by an adjacent parcel are considered to be the front of the parcel. It is possible for there to be more than one possible front to a parcel. This often occurs with parcels that are at the intersections of two streets and the parcel has a side that borders each street. If a front for the parcel is determined, then the Parcel Fronts value 382 is incremented by 1.

If a structure front for the digital structure outline (top, bottom, left, or right) 358 in FIG. 16 from the existing structure outline information was specified in the parameters, and a front of the parcel was determined, then, also in step 540 of FIG. 18 the digital structure outline 538 is rotated so that the front of the digital structure outline is the same angle as the front of the parcel, if a parcel front was determined.

Beginning with step 542 of FIG. 18, the ISMM Data 534 in FIG. 18 is now examined for a digital structure outline that is inside the parcel boundaries if parcel data 330 in FIG. 16 was specified in the parameters. If parcel data was not specified in the parameters, then the closest structure outline 538 in the ISMM data to the geographic location of the digital structure outline is selected. If the parcel has one structure in the ISMM data the Parcels w/1 Struc 392 is incremented by 1. If the parcel has more than one structure in the ISMM data, then the Parcels w/Mult Strucs 394 is incremented by 1.

Continuing step 542, the centroid for the digital structure outline 538 and the centroid for the structure shape from the ISMM Data 534 are computed and the digital structure outline is translated (moved) so it has a centroid located at the same coordinates as that of the structure outline from the ISMM Data.

In a scenario in which a structure front was not specified in the parameters 358 in FIG. 16 or a front of the parcel cannot be determined, a bisector along the longest length of the digital structure outline and another bisector for the structure outline from the ISMM Data can be calculated. Then the bisector for the digital structure outline can be rotated around its centroid so the angle of that bisector matches the angle of the bisector for the structure outline from the ISMM Data.

Step 542 continues with a "Fit" score being calculated and displayed in the progress display 398. The Fit score can be saved to the existing Structure Information along with the location of the new centroid coordinates and the angle of orientation for the structure outline.

In response to the Fit being within the threshold specified in the parameter settings 362 in FIG. 16, flow can be directed to step 546 of FIG. 18.

Still performing step 542, in a scenario in which the "Fit" score is not within the parameter settings, 362 in FIG. 16, another method of "fitting" can be attempted. For such additional or alternative fit, the four corners of the digital structure outline 538 that are closest to the furthest extents of the structure outline from the ISMM data can be determined. In addition, it is determined how to translate (or move) the digital structure outline so that the four corners calculated for it are closest to the corresponding four corners calculated for the structure outline from the ISMM Data. A new Fit score can be determined. In response to the Fit score not being within the threshold, the digital structure outline can be rotated for up to 10 degrees in either direction in one degree increments. Each time the digital structure outline is rotated, a new translation (move) is calculated as described above for the digital structure outline and the digital structure outline is translated. A new Fit score is then determined. This is performed until the digital structure outline has been incrementally rotated to 10 degrees in both directions from its original orientation. The centroid location and angle of orientation for the digital structure outline are saved for the lowest corresponding Fit score. The digital structure outline then rotated and translated to have a centroid and orientation angle that matches those values saved for the lowest Fit score.

A rough fit 542 for the digital structure outline 538 and the structure outline from the ISMM Data 534 has now been achieved. If the Fit score is within the threshold, the information determined during the determination of the Fit Score is displayed 398, 400, 402, 404, 406 and fitting ends for this digital structure outline and processing proceeds to step 546. In response to the Fit score not being within the threshold, flow is directed to step 544.

Step 544 of FIG. 18 begins with translation of the digital structure outline 538 to fine tune the rough fit that just took place can now occur. To do this the centroid of the digital structure outline 538 is translated by up to 10 pixels in 1 pixel increments in 8 different directions (0, 45, 90, 135, 180, 225, 270, and 315 degrees). For each translation, a Fit score is calculated. If the score is lower than the previous fit score then translating continues in that direction. The first time the fit score is higher than the previous fit score translating is stopped in that direction. Then the fine tuning process can begin again from this new point. In certain implementations, the fine tune step can be performed for up to three times. In a scenario in which the digital structure outline is rotated during the rough fitting process, the fine tuning process may not include any rotations. In contrast, if there was not a rotation performed during the rough fitting process, then for each translation, the digital structure outline can be rotated for up to 10 degrees in each direction, in 1 degree increments. In one aspect, a Fit score is calculated after each rotation. For the lowest Fit score, the rotation and translation values are saved. When the Fine Tuning process 544 is completed, processing continues to step 546.

Step 546 in FIG. 18 translates and rotates the digital structure outline 538 to the parameters calculated that correspond to the lowest Fit score calculated. The new digital structure outline is saved to 548. The original digital structure outlines 538 are not overwritten by the structure outline information 548. Instead, the original digital structure outlines 538 can be inserted into a new file. The lowest Fit score is saved with the new digital structure outline in 548.

Figure 22:
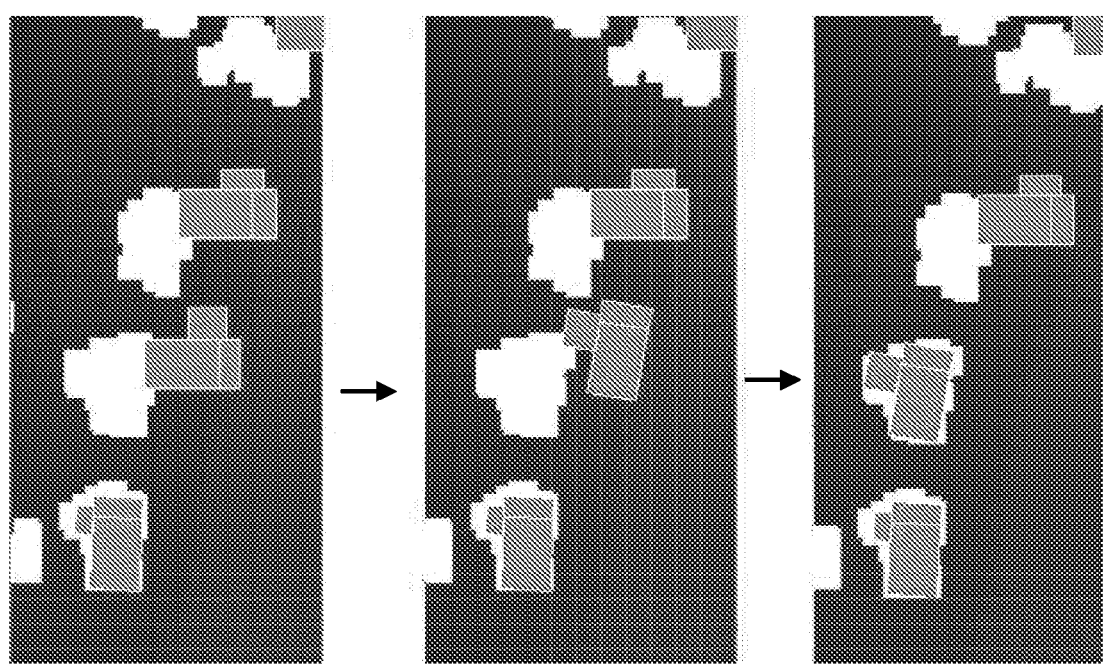
FIG. 22 is a picture showing structure edges (Digital Object Outlines) being fit to blank areas in the ISMM data according to one or more aspects of the disclosure. The lower structure outline has been fit. The second lowest structure shows the progression of fitting in the three pictures from left to right. The remaining structures have not been fit.

FIG. 22 illustrates an example fitting process in progress in accordance with one or more aspects of the disclosure. The lowest structure in the figure has been fit and appears in the same position in all three pictures from left to right. The second structure from the bottom displays the process of fitting. In the leftmost picture is the original orientation of the digital structure outline 538 in FIG. 18. The ISMM data is in the background with areas of blank pixels representing structure outlines. In the middle picture of FIG. 22, the digital structure outline has been rotated and translated slightly. In the right-most picture a best fit has been determined and the digital structure outline has been translated and rotated to fit inside the area of blank pixels. It should be appreciated that the remaining structures have not been fit.

With a properly defined Fit threshold, 362 in FIG. 16, it can be assumed that a structure has changed between the collection times of the two data sets being compared if the Fit score is above the threshold. By far the largest factor influencing the defining of a suitable fit score threshold is the quality of the two sets of input data. If the quality of one or both data sets is poor, a higher threshold may be needed to prevent an abundance of false positives as to where change has occurred. A false positive is a comparison of data that appears to show a change has occurred, but in reality there is no change.

All the values displayed in FIG. 17 of the example system are values representing progress or status as the processing continues. The values displayed here are simply examples and are not meant to limit in any way what could be displayed or how it could be displayed, or the need for their display.

Figure 23B:
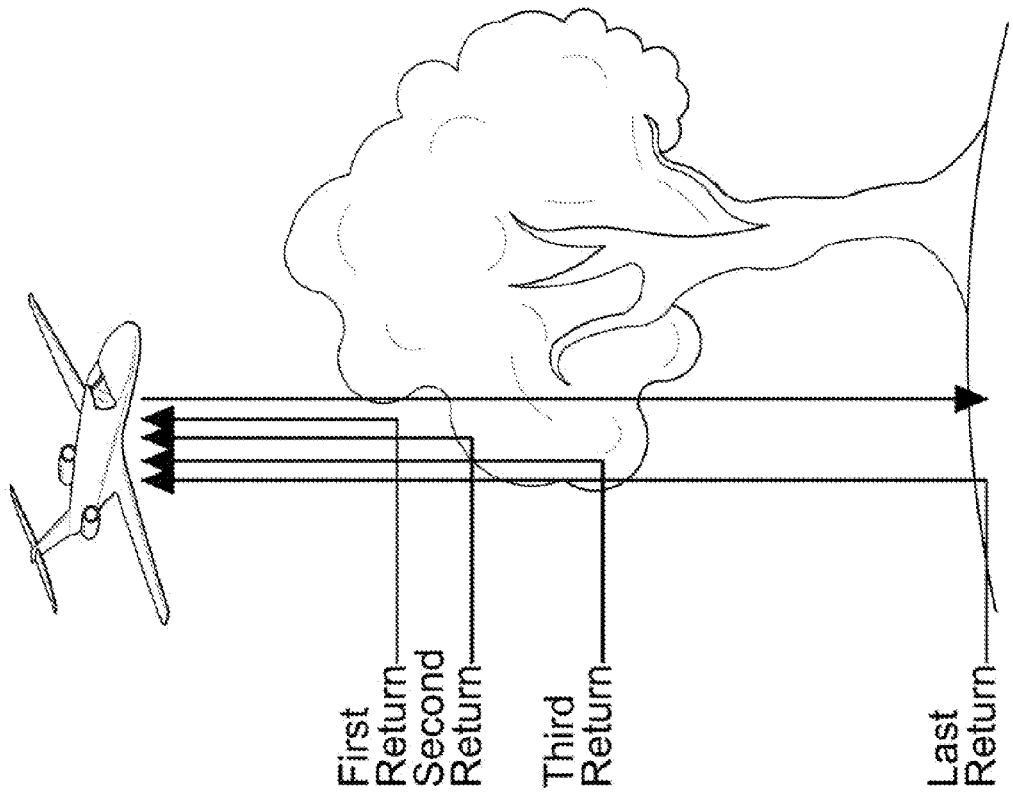
FIG. 23B is another diagram illustrating the collection of elevation data based on LiDAR measurements.
Figure 23A:
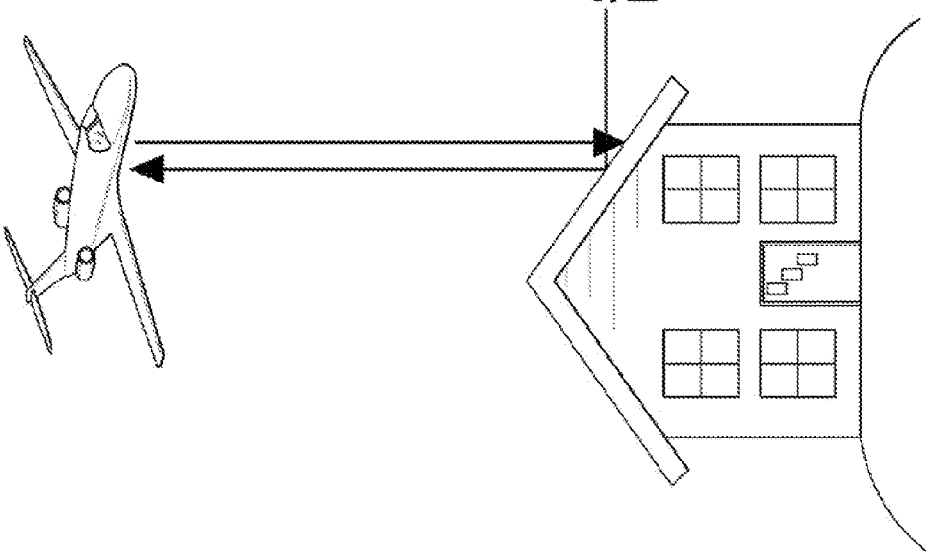
FIG. 23A is diagram illustrating the collection of elevation data based on LiDAR measurements.
Figure 23C:
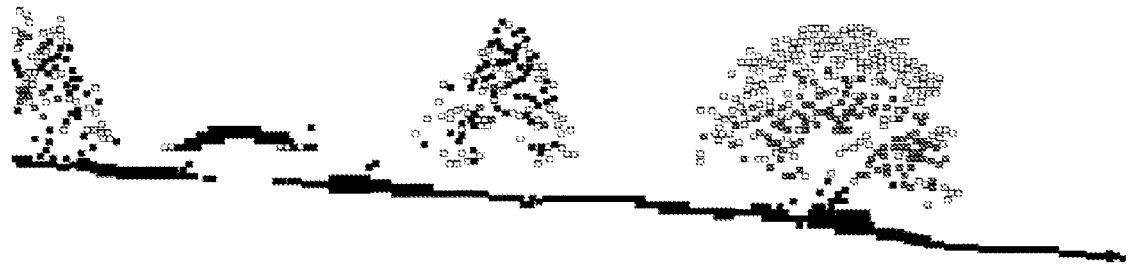
FIG. 23C is a side-view of an example map based on LiDAR elevation data of three trees and a house formatted as a three-dimensional point cloud according to one or more aspects of the disclosure.
Figure 23D:
FIG. 23D is a top-down view of an example map based on LiDAR elevation data of a region of land formatted as a three-dimensional point cloud according to one or more aspects of the disclosure.

In one aspect, elevation data can be geovisualized. As described herein, these data can be created from three currently available technologies, including light detection and ranging (LiDAR), interferometric synthetic aperture radar (IfSAR), and structure-from-motion (SfM) photomodeling. FIG. 23A illustrates obtaining elevation data through LiDAR measurements. For example, LiDAR can collect elevation data based on Laser signals returning to a LiDAR measurement device from different heights. For example, a signal returning from the roof of a house can provide elevation information for the roof. This elevation information can distinguish a structure, such as a house or other building, from surrounding ground. As further illustrated in FIG. 23B, multiple laser returns can occur at different heights. For example, multiple returns can occur at tree branches at various heights of a tree. The various returns can identify different elevation levels for the branches of the trees. Additionally, a return can occur at the ground, such that the tree (e.g., or a structure) can be distinguished from the ground. In one aspect, the geovisualization may be as a three-dimensional point cloud. As illustrated in FIG. 23C, LiDAR point cloud can be rendered in cross section, showing, for example three trees and a house. In addition, FIG. 23D presents a top-down view of an example map based on LiDAR elevation data of a region of land formatted as a three-dimensional point cloud according to one or more aspects of the disclosure. It should be appreciated that other rendering formats may be utilized, as described herein.

Figure 24:
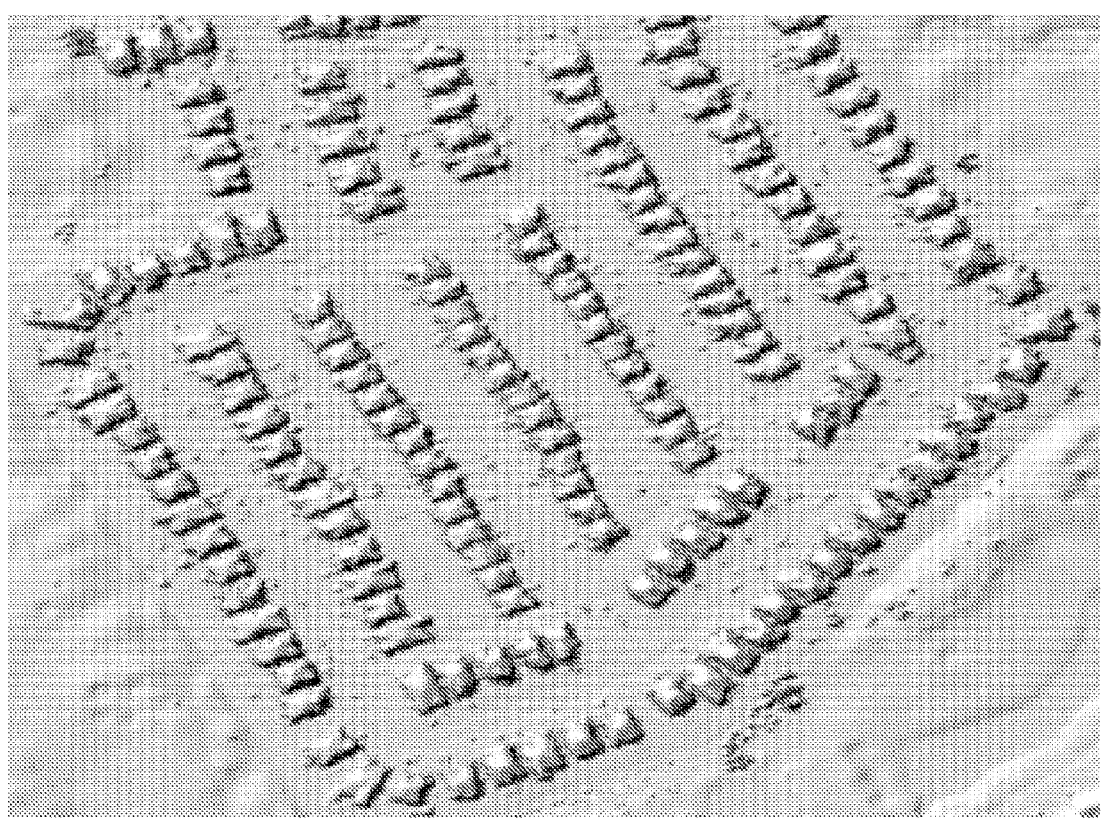
FIG. 24 is a top-down view of an example map of elevation data of another region of land formatted as a digital surface model with shaded relief according to one or more aspects of the disclosure.
Figure 25:
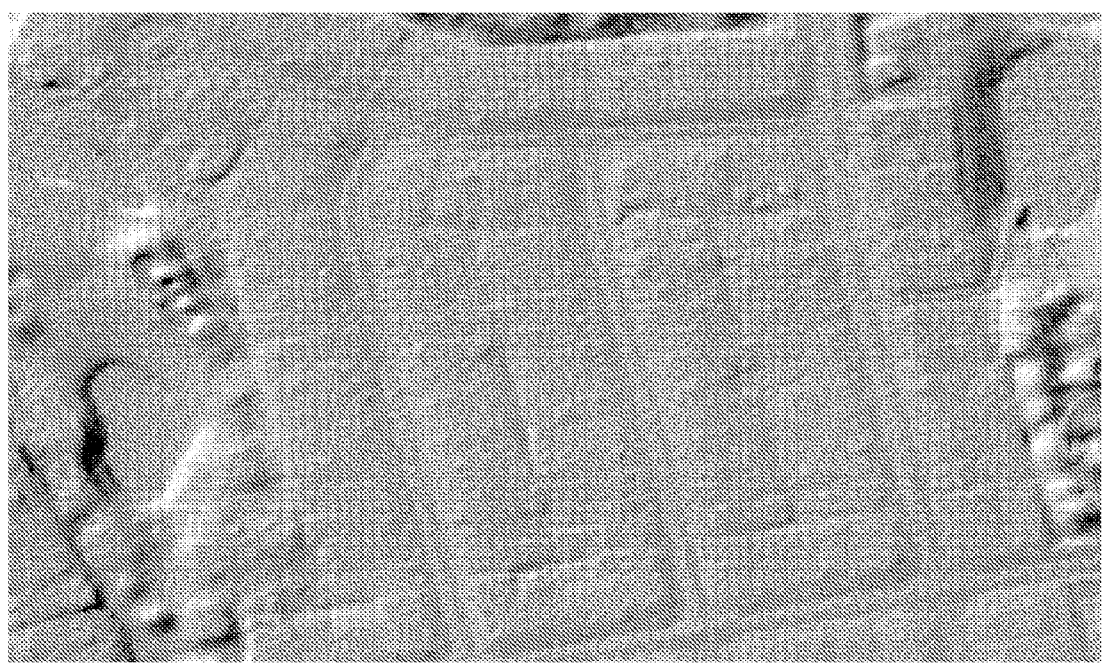
FIG. 25 is a top-down view of an example map of elevation data of another region of land formatted as a digital elevation model with shaded relief according to one or more aspects of the disclosure.
Figure 26:
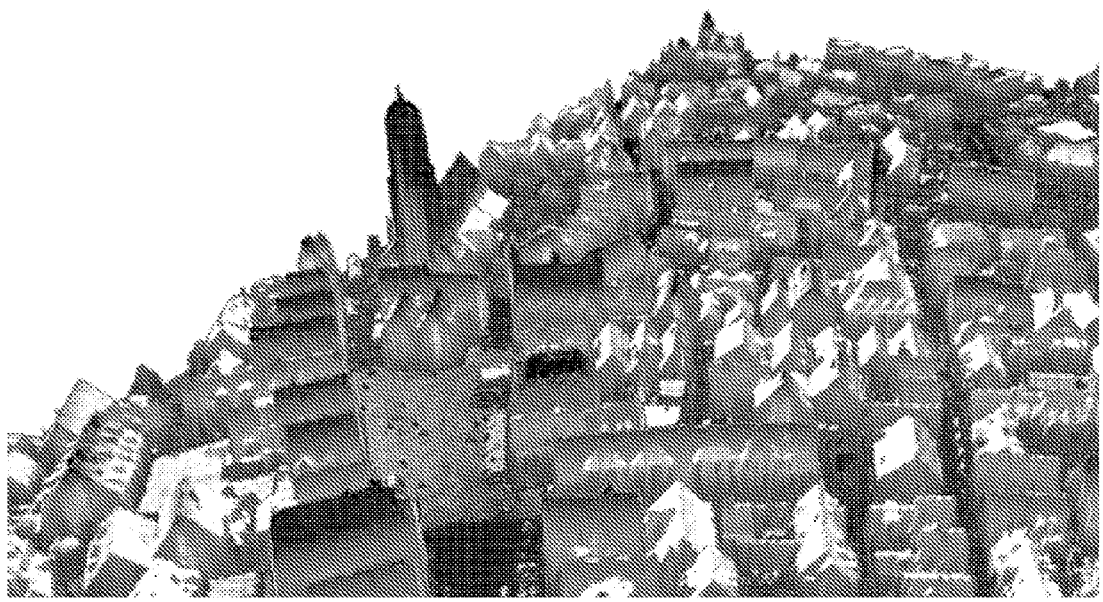
FIG. 26 is a perspective view of an example map of elevation data of another region of land formatted as a triangulated irregular network according to one or more aspects of the disclosure.

As illustrated in FIG. 24, elevation data can be conveyed in accordance with a digital surface model. For example, FIG. 24 illustrates a top-down view of an example map of elevation data of another region of land formatted as a digital surface model with shaded relief according to one or more aspects of the disclosure. In another aspect, as illustrated in FIG. 25, the elevation data can be rendered in accordance with a digital elevation model. For example, FIG. 25 is a top-down view of an example map of elevation data of another region of land formatted as a digital elevation model with shaded relief according to one or more aspects of the disclosure. In yet another aspect, elevation data can be rendered as a triangulated irregular network. For example, FIG. 26 is a perspective view of an example map of elevation data of another region of land formatted as a triangulated irregular network according to one or more aspects of the disclosure.

Figure 27:
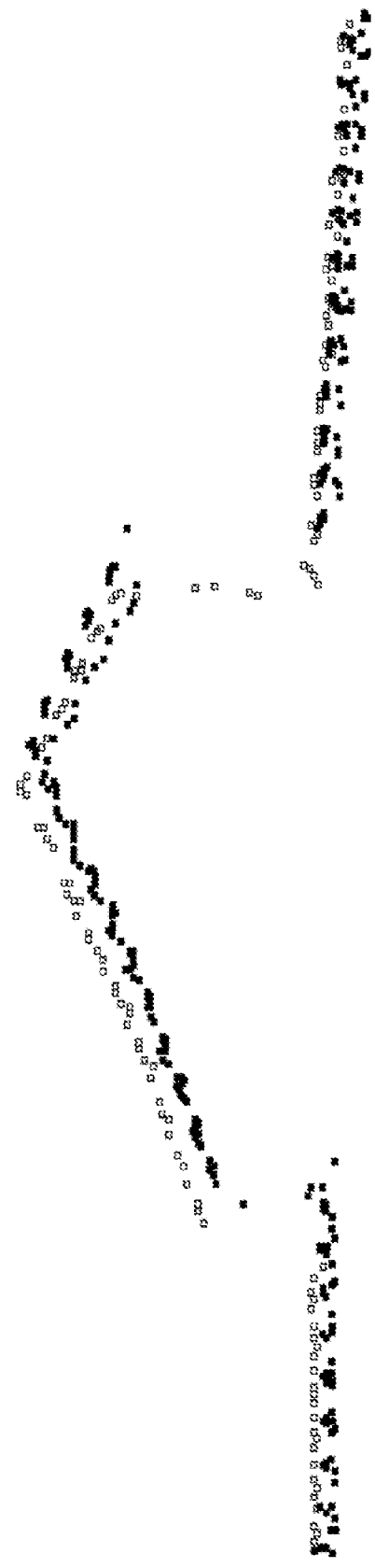
FIG. 27 is a side-view of an example map of elevation data of a structure oriented for measuring formatted as a three-dimensional point cloud according to one or more aspects of the disclosure.

In one aspect, elevation data can be measured providing actual or approximate values of dimension(s) of a specific structure. For example, FIG. 27 is a side-view of an example map of elevation data of a structure oriented for measuring formatted as a three-dimensional point cloud according to one or more aspects of the disclosure. These measurements can comprise the base (foundation) of the structure, the area of the structure, the height of the structure, and the volume of the structure. Appurtenances of the structure can also be measured, such as attached deck, stairs, air conditioning units, awnings, etc. Detached property improvements can also be measured, such as garages, shops, garden sheds, gazebos, boat docks, swimming pools, and other out buildings.

Figure 28:
FIG. 28 is a top-down view of an example enhanced map with current elevation representations overlain by map parcel outlines and former elevation representations according to one or more aspects of the disclosure.

In one aspect, tax data in the form of parcel maps and structure dimensions can be overlain on the elevation data. In one aspect, parcel maps can be overlaid on elevation data representations in order to define land survey measurements and dimensions of structures from assessment database. For example, FIG. 28 is a top-down view of an example enhanced map with current elevation representations overlain by map parcel outlines and former elevation representations according to one or more aspects of the disclosure.

Figure 29A:
FIG. 29A is a top-down view of an example aerial photograph map overlain by map parcel outlines and former elevation representations illustrating an discrepancy between a former elevation representation and the structure according to one or more aspects of the disclosure.
Figure 29B:
FIG. 29B is a top-down view of another example aerial photograph map overlain by map parcel outlines and former elevation representations illustrating another discrepancy between a former elevation representation and a structure according to one or more aspects of the disclosure.

In one aspect, the dimensions of the land and structure survey can be compared to the elevation data to validate the accuracy of the tax records. The validation process can be performed manually, see, e.g., FIGS. 29A-29B or automatically, see, e.g., FIG. 22. In one aspect, FIG. 29A is a top-down view of an example aerial photograph map overlain by map parcel outlines and former elevation representations illustrating a discrepancy between a former elevation representation and the structure according to one or more aspects of the disclosure. In another aspect, FIG. 29B is a top-down view of another example aerial photograph map overlain by map parcel outlines and former elevation representations illustrating another discrepancy between a former elevation representation and a structure according to one or more aspects of the disclosure. It should be appreciated that manual inspection can include the process colloquially called "stare and compare", wherein individual structure dimensions from the tax rolls are compared to the elevation data and visually analyzed. The automated method involves comparing the structural footprint dimensions to the bare earth elevation data representing the footprint of the structure and the linear and aerial measurements of both the tax data and elevation compared for discrepancies.

Figure 30:
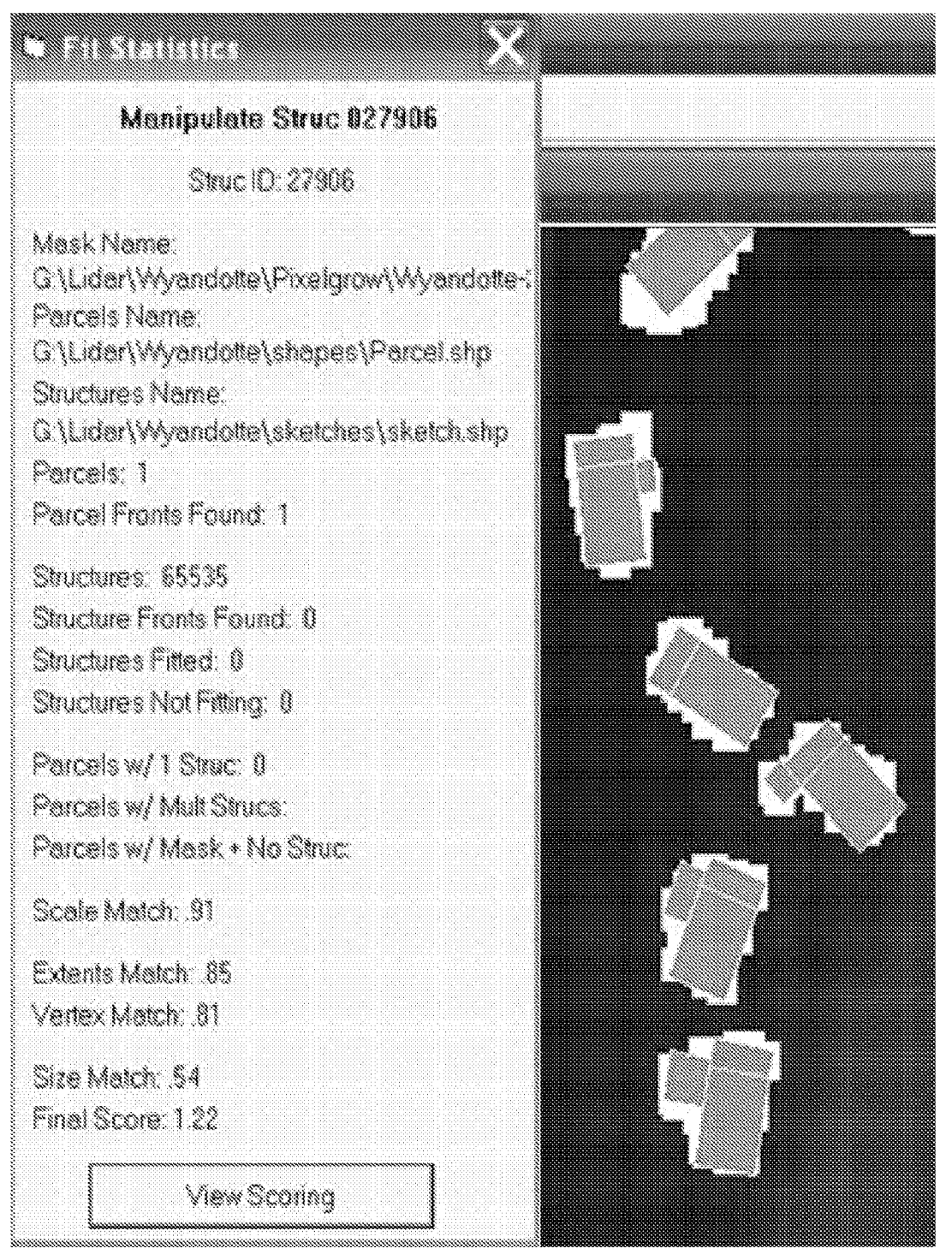

In scenarios in which tax records do not agree with information extracted from the elevation data, an appropriate tax record can be marked (e.g., or tagged or selected) for a more detailed review. In one aspect, the tax record can be tagged in the field by a property appraiser. In another aspect, one or more parameters associated with such discrepancy analysis may vary with the quality and/or density (e.g., areal density or volume density) of the elevation data. Coarse elevation data—e.g., a small number of measurements per area unit or volume unit—or elevation data of poor quality may have a greater tolerance during the comparison, yielding fewer discrepancy events. Dense elevation data—e.g., a small number of measurements per area unit or volume unit—and/or high quality elevation data can result in stricter tolerances, thus yielding a higher rate of discrepancy events. As described herein, FIG. 30 is an example dialog box above an enhanced map where a former elevation representation is fitted to a current elevation representation according to one or more aspects of the disclosure.

Figure 31:
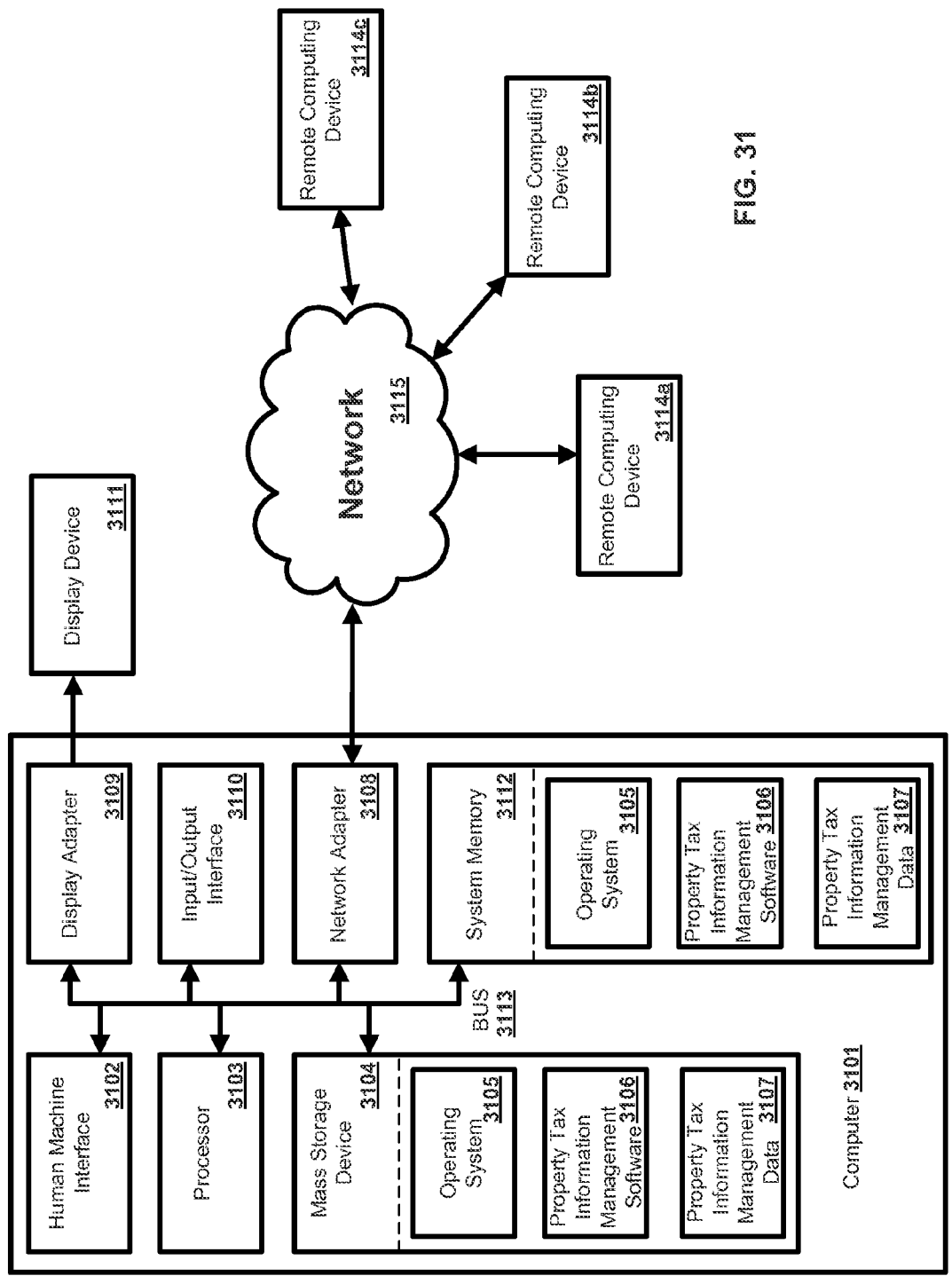
FIG. 31 is a block diagram of an example operating environment that embodies or comprises one or more of the disclosed systems.

In one aspect, the disclosed methods and systems can be implemented on a computer 3101 as illustrated in FIG. 31 and described below. Similarly, the methods and systems disclosed can utilize one or more computers to perform one or more functions in one or more locations. FIG. 31 is a block diagram of an example operating environment that embodies or comprises one or more of the disclosed systems. In addition, the example operating environment can implement (e.g., perform or execute) the disclosed methods. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 3101. The components of the computer 3101 can comprise, but are not limited to, one or more processors or processing units 3103, a system memory 3112, and a system bus 3113 that couples various system components including the processor 3103 to the system memory 3112. In the case of multiple processing units 3103, the system can utilize parallel computing.

The system bus 3113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 3113, and all buses specified in this description can also be implemented over a wired or wireless network connection and each of the subsystems, including the processor 3103, a mass storage device 3104, an operating system 3105, property tax information management software 3106, property tax information management data 3107, a network adapter 3108, system memory 3112, an Input/Output Interface 3110, a display adapter 3109, a display device 3111, and a human machine interface 3102, can be contained within one or more remote computing devices 3114a,b,c at physically separate locations, connected through buses of this form, in effect implementing a fully distributed system.

The computer 3101 typically comprises a variety of computer readable media. Exemplary readable media can be any available media that is accessible by the computer 3101 and comprises, for example and not meant to be limiting, both volatile and non-volatile media, removable and non-removable media. The system memory 3112 comprises computer readable media in the form of volatile memory, such as random access memory (RAM), and/or non-volatile memory, such as read only memory (ROM). The system memory 3112 typically contains data such as tax information management data 3107 and/or program modules such as operating system 3105 and tax information management software 3106 that are immediately accessible to and/or are presently operated on by the processing unit 3103.

In another aspect, the computer 3101 can also comprise other removable/non-removable, volatile/non-volatile computer storage media. By way of example, FIG. 31 illustrates a mass storage device 3104 which can provide non-volatile storage of computer code, computer readable instructions, data structures, program modules, and other data for the computer 3101. For example and not meant to be limiting, a mass storage device 3104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 3104, including by way of example, an operating system 3105 and property tax information management software 3106. Each of the operating system 3105 and property tax information management software 3106 (or some combination thereof) can comprise elements of the programming and the property tax information management software 3106. Property tax information management data 3107 can also be stored on the mass storage device 3104. Property tax information management data 3107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 3101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 3103 via a human machine interface 3102 that is coupled to the system bus 3113, but can be connected by other interface and bus structures, such as a parallel port, game port, an IEEE 1394 Port (also known as a Firewire port), a serial port, or a universal serial bus (USB).

In yet another aspect, a display device 3111 can also be connected to the system bus 3113 via an interface, such as a display adapter 3109. It is contemplated that the computer 3101 can have more than one display adapter 3109 and the computer 3101 can have more than one display device 3111. For example, a display device can be a monitor, an LCD (Liquid Crystal Display), or a projector. In addition to the display device 3111, other output peripheral devices can comprise components such as speakers (not shown) and a printer (not shown) which can be connected to the computer 3101 via Input/Output Interface 3110. Any step and/or result of the methods can be output in any form to an output device. Such output can be any form of visual representation, including, but not limited to, textual, graphical, animation, audio, tactile, and the like. The display 3111 and computer 3101 can be part of one device, or separate devices.

The computer 3101 can operate in a networked environment using logical connections to one or more remote computing devices 3114a,b,c. By way of example, a remote computing device can be a personal computer, portable computer, smartphone, a server, a router, a network computer, a peer device or other common network node, and so on. Logical connections between the computer 3101 and a remote computing device 3114a,b,c can be made via a network 3115, such as a local area network (LAN) and/or a general wide area network (WAN). Such network connections can be through a network adapter 3108. A network adapter 3108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 3105 are illustrated herein as discrete blocks, although it is recognized that such programs and components reside at various times in different storage components of the computing device 3101, and are executed by the data processor(s) of the computer. An implementation of property tax information management software 3106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In one aspect, the property tax information management software 3106 can configure the processor 3103 to perform (e.g., execute) one or more of the actions or blocks of the methods described in the subject specification and drawings, such as the methods disclosed in FIGS. 32-43. For example, the processor can be configured by the property tax information management software 3106 to perform at least the following actions: receiving elevation data associated with a region; generating a map of the region, the map is indicative of elevation data; generating an enhanced map by estimating intermediate elevation data, the intermediate elevation data providing elevation data on the enhanced map associated with data points on the original map having no assigned elevation data; identifying a portion of the elevation data associated with at least a portion of a structure on the property by determining changes in elevation data; generating a current elevation representation of the structure based on elevation data associated with at least the portion of the structure; and determining a difference between the current elevation representation of the structure and a former elevation representation of the structure at a previous time. As another example, the processor can be configured by the property tax information management software 3106 to perform the following actions: ascertaining that a physical change is present in a property; determining if the physical change is a taxable change; and managing a property tax burden for the property based on the physical change in response to the physical change being a taxable change.

In view of the various aspects of consumption (e.g., delivery and/or control) of a media asset in a one-way device described herein, example methods that can be implemented in accordance with the disclosure can be better appreciated with reference to flowcharts in FIGS. 32-43. For simplicity of explanation, the example methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can alternatively be represented as a series of interrelated states or events, such as in a state diagram.

The methods disclosed throughout the subject specification can be stored on an article of manufacture, such as a computer-readable storage medium, to facilitate transporting and transferring such methods to computing devices (e.g., desktop computers, mobile computers, mobile telephones, and the like) for execution, and thus implementation, by a processor or for storage in a memory. For example, computer-executable instructions retained in a memory can configure a processor to perform (e.g., execute) one or more blocks of the example methods described herein, such as the example methods disclosed in FIGS. 32-43 and related descriptions. In certain embodiments, the computer 3101, through the processor 3103, for example, can implement (e.g., execute) the exampled methods disclosed in FIGS. 32-43 and related descriptions.

Figure 32:
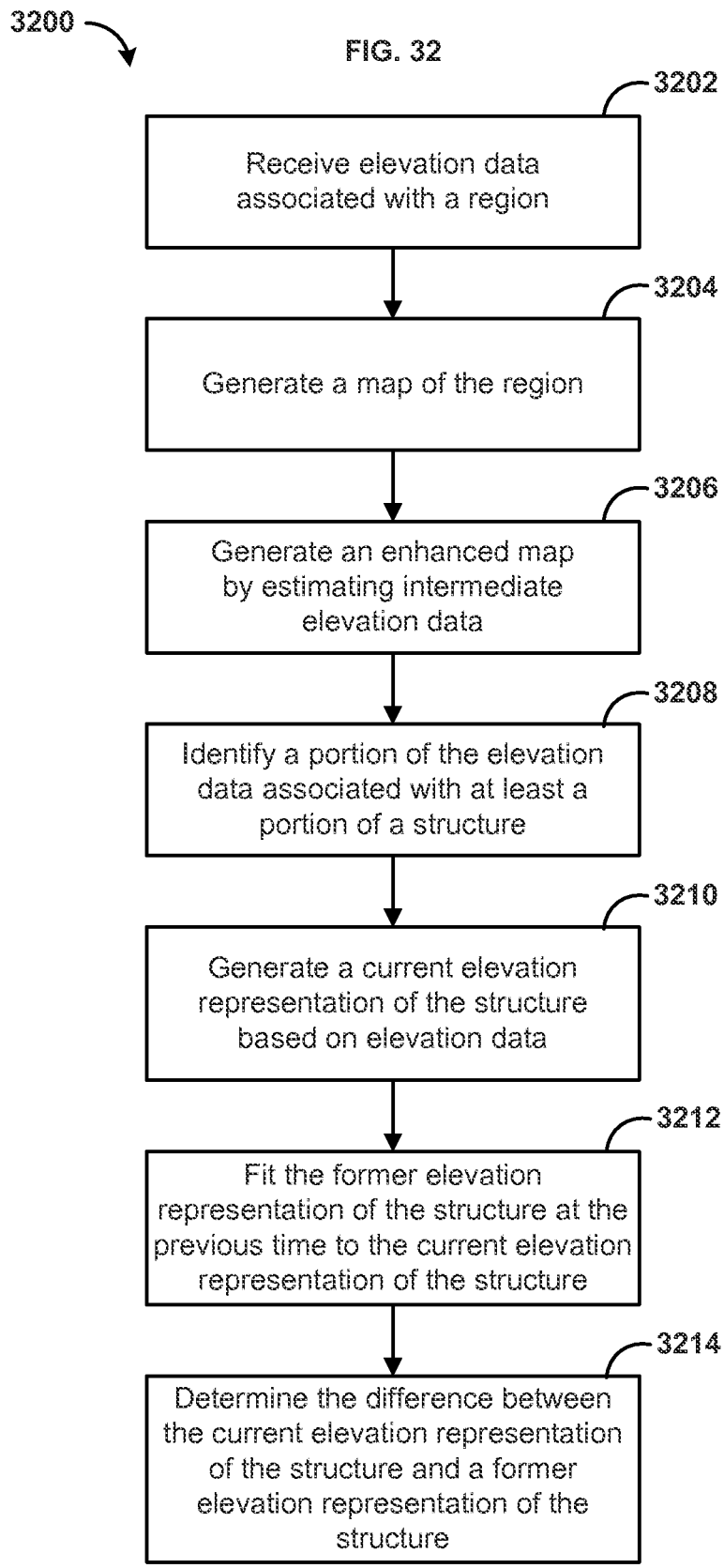
FIG. 32 is a flowchart illustrating an example method of assessing change to a property according to one or more aspects of the disclosure.

FIG. 32 is a flowchart illustrating an example method 3200 of assessing change to a property according to one or more aspects of the disclosure. In one aspect, the subject example method 3200 can be embodied in a set of one or more computer-executable instructions (e.g., property tax information management software 3106) and can be implemented in response to execution by a processor (e.g., processor 3103). At block 3202, elevation data associated with a region is received. For example, the elevation data can be formatted according to at least one of a bare earth model, a digital elevation model, a digital surface model, a wireframe model, a wiremesh model, a triangulated irregular network model, a shaded relief model, a sparse point vector model, and a dense point vector model. In one aspect, the elevation data can be generated at least in part through light detection and ranging (LiDAR) measurements, radio detection and ranging (RADAR) measurements, and/or structure-from-motion (SfM) measurements. In one aspect, the elevation data can associate a height with geographic location.

At block 3204, a map (e.g., or more generally, a spatial model) of the region is generated. In an aspect, the map can be indicative of elevation data. For example, the map can be generated based at least on a data structure suitable for rendering changes in elevation. The data structure can comprise a parameter indicative of an elevation value in a gradient of elevation values. The data structure can comprise a parameter indicative of an elevation threshold associated with the gradient of elevation values. The data structure can comprise one or more of a first parameter indicative of a scale of the map in relation to the elevation data, a second parameter indicative of an extent of the map, a third parameter indicative of a number of files containing information indicative of the map, or a fourth parameter indicative of a subset of the elevation data. In one aspect, the map can represent visual bare earth model data.

In one aspect, the map of the region can indicate the elevation data by rendering the elevation data as at least one of raster data or vector mapping data. For example, the raster data can comprise a plurality of pixels. Each (e.g., or at least some) pixel of the plurality of pixels can have a color value. A pixel can represent a location in the map. The location can be based at least on the elevation data. In another aspect, the pixel can have an elevation value. For example, the pixel can have or be associated with an elevation value but be rendered for display as a color value. Though the present methods and systems refer to color values for purposes of explanation, it is to be understood the present methods and systems also contemplate manipulation (e.g., adding, subtracting, identifying, comparing, displaying, and the like) of elevation values instead of or in addition to the color values.

In one aspect, generating the map of the region having the elevation data can comprise generating the map based at least on a data structure for rendering changes in elevation. The data structure can comprise a parameter indicative of a color value in a color gradient. In one aspect, the data structure can comprise a parameter indicative of a color threshold associated with the color gradient. The color threshold can associate an elevation with the color value in the color gradient.

At block 3206, an enhanced map can be generated by estimating intermediate elevation data. In an aspect, the intermediate elevation data can provide elevation data on the enhanced map associated with data points on the original map having no assigned elevation data. In one aspect, generating the enhanced map can comprise searching for the pixel having the void color value under the constraint of said pixel being located between two pixels of the plurality of pixels that are separated by a predetermined distance. The two pixels can have respective non-void color values. In one aspect, estimating intermediate elevation data can comprise inserting an additional color value for a pixel having a void color value. The additional color value can be calculated based at least on color values of one or more pixels adjacent the pixel having the void color value.

At block 3208, a portion of the elevation data associated with at least a portion of a structure on the property can be identified by determining changes in elevation data. In one aspect, identifying elevation data associated with at least a portion of a structure on the property by determining changes in elevation data can comprise identifying a pixel in the enhanced map associated with a portion of the structure on the property by determining that said pixel has a void color value.

At block 3210, a current elevation representation of the structure can be generated based on elevation data associated with said at least a portion of the structure. At block 3212, the former elevation representation of the structure at the previous time is fit to the current elevation representation of the structure. In one aspect, the former elevation representation of the structure at the previous time can comprise one or more pixels. In another aspect, the former elevation representation of the structure at the previous time can comprise a vector map.

At block 3214, a difference can be determined between the current elevation representation of the structure and a former elevation representation of the structure at a previous time. In one aspect, the former elevation representation can be based on a property assessor's Computer Aided Mass Appraisal (CAMA) system.

Figure 33:
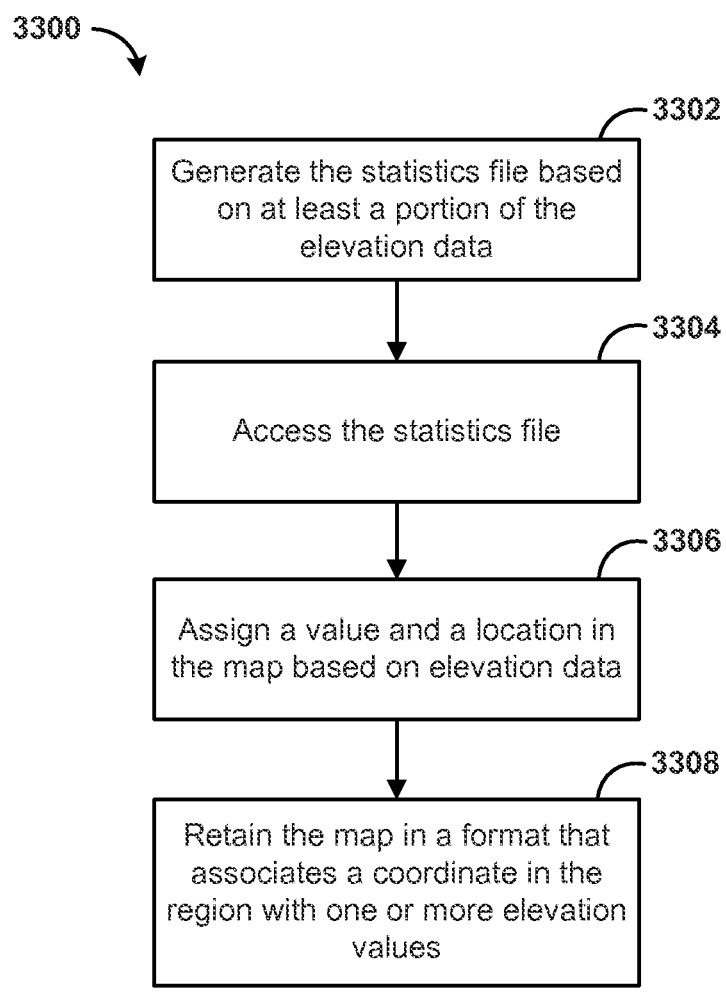
FIG. 33 is a flowchart illustrating an example method of generating a map of a region according to one or more aspects of the disclosure.

FIG. 33 is a flowchart illustrating an example method 3300 of generating a map of a region according to one or more aspects of the disclosure. In one aspect, the subject example method can be embodied in a set of one or more computer-executable instructions (e.g., property tax information management software 3106) and can be implemented in response to execution by a processor (e.g., processor 3103). In certain scenarios, the example method 3300 can implement at least a part of block 3204 described above. At block 3302, the statistics file can be generated based on at least a portion of the elevation data. At block 3304, a statistics file is accessed. In one aspect, the statistics file can comprise at least one of a lowest elevation of the region, a highest elevation of the region, relative elevation differences of the region, absolute elevation differences of the region, and a coordinate indicative of a boundary of the region. At block 3306, a value and a location can be assigned in the map based on elevation data. At block 3308, the map can be retained in a format that associates a coordinate in the region with one or more elevation values.

Figure 34:
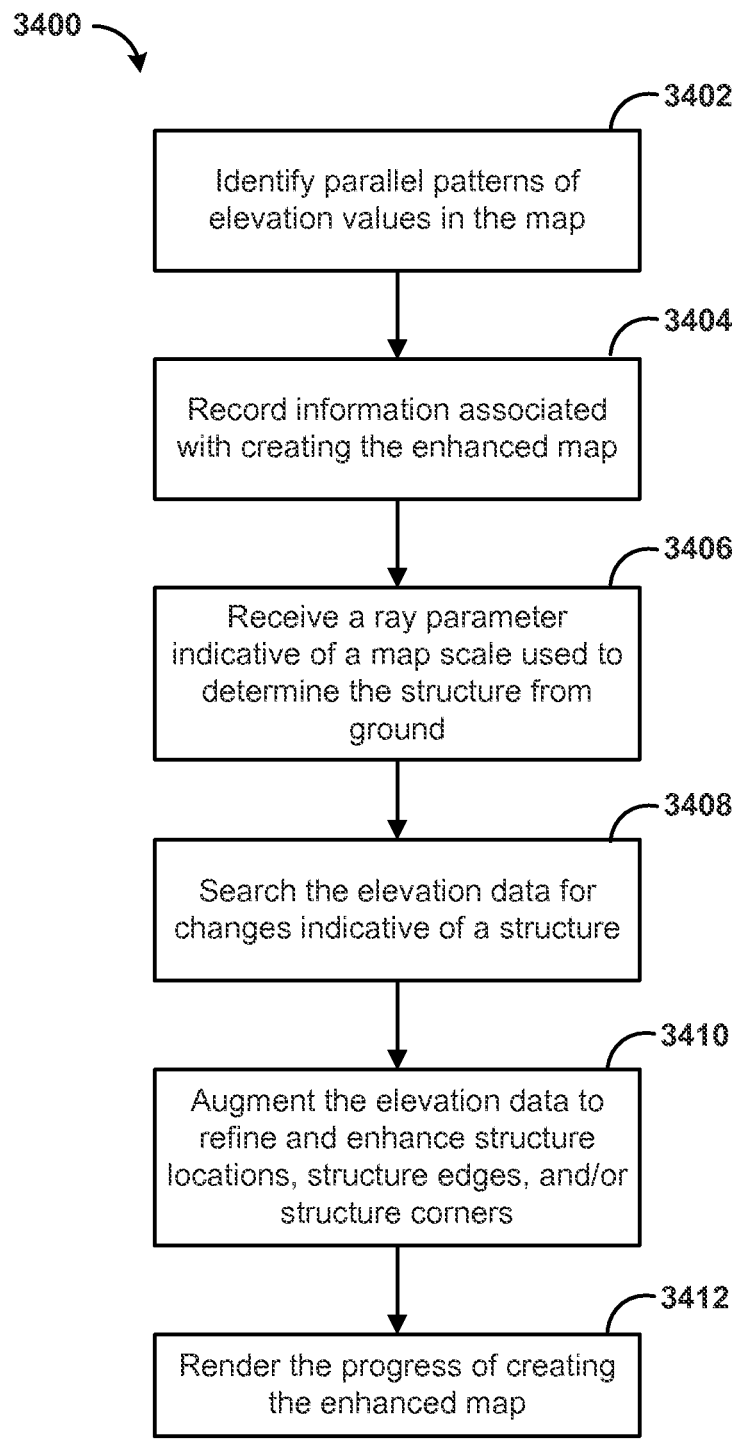
FIG. 34 is a flowchart illustrating an example method of generating an enhanced map by estimating intermediate elevation data according to one or more aspects of the disclosure.

FIG. 34 is a flowchart illustrating an example method 3400 of generating an enhanced map by estimating intermediate elevation data according to one or more aspects of the disclosure. In one aspect, the subject example method can be embodied in a set of one or more computer-executable instructions (e.g., property tax information management software 3106) and can be implemented in response to execution by a processor (e.g., processor 3103). In certain scenarios, the example method 3400 can implement at least a part of block 3206 described above. At block 3402, parallel patterns of elevation values are identified in the map. At block 3404, information associated with generating the enhanced map can be recorded. In an aspect, the information can comprise at least one of a time elapsed for generating at least a portion of the enhanced map, a count of one or more processing actions associated with generating at least the portion of the enhanced map, or a number of changes made to the elevation map in the one or more processing action. At block 3406, a ray parameter can be received indicative of a map scale used to determine the structure from ground. At block 3408, the elevation data can be searched for changes indicative of a structure. At block 3410, the elevation data can be augmented to refine and enhance structure locations, structure edges, and/or structure corners. At block 3412, the progress can be rendered of generating the enhanced map.

Figure 35:
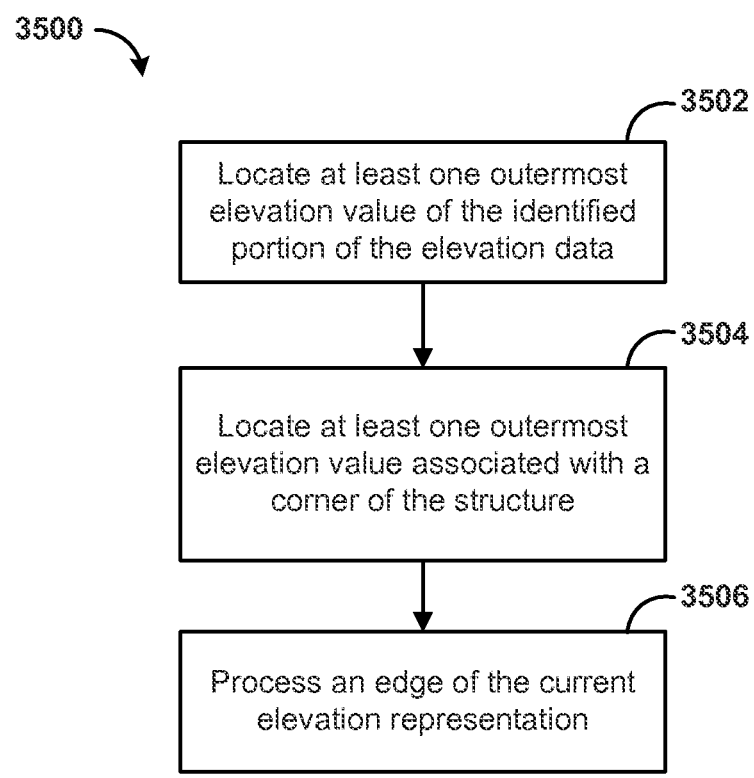
FIG. 35 is a flowchart illustrating an example method of generating a current elevation representation of a structure according to one or more aspects of the disclosure.

FIG. 35 is a flowchart illustrating an example method 3500 of generating a current elevation representation of a structure according to one or more aspects of the disclosure. In one aspect, the subject example method can be embodied in a set of one or more computer-executable instructions (e.g., property tax information management software 3106) and can be implemented in response to execution by a processor (e.g., processor 3103). In certain scenarios, the example method 3500 can implement at least a part of block 3210 described above. At block 3502, at least one outermost elevation value of the identified portion of the elevation data can be located. In an aspect, the at least one outermost elevation value can be indicative of an edge of the structure. For example, an edge search can be performed. At block 3504, at least one elevation value of the elevation data associated with a corner of the structure can be located. At block 3506, an edge of the current elevation representation of the structure can be processed.

Figure 36:
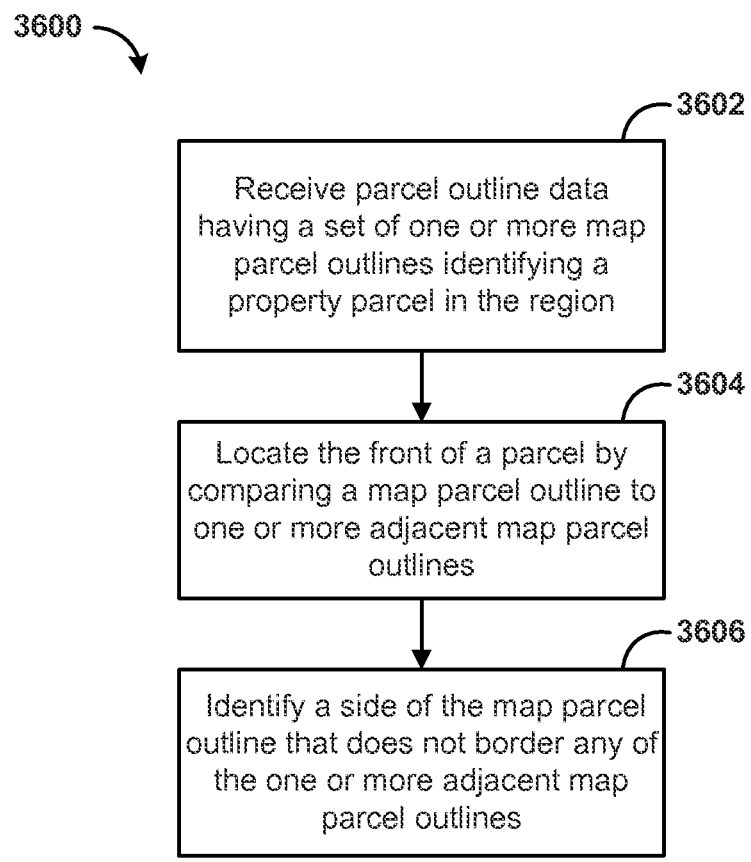
FIG. 36 is a flowchart illustrating an example method of processing parcel data according to one or more aspects described herein.

FIG. 36 is a flowchart illustrating an example method 3600 of processing parcel data according to one or more aspects described herein. In one aspect, the subject example method can be embodied in a set of one or more computer-executable instructions (e.g., property tax information management software 3106) and can be implemented in response to execution by a processor (e.g., processor 3103). In certain scenarios, the example method 3600 can implement at least a part of block 3210 or other blocks described above. At block 3602, parcel outline data can be received having a set of one or more map parcel outlines identifying a property parcel in the region. In one aspect, the map parcel outlines and enhanced map can be defined with respect to a common geographic coordinate system. At block 3604, the front of a parcel can be located by comparing a map parcel outline to one or more adjacent map parcel outlines. At block 3606, a side of the map parcel outline can be identified that does not border any of the one or more adjacent map parcel outlines.

Figure 37:
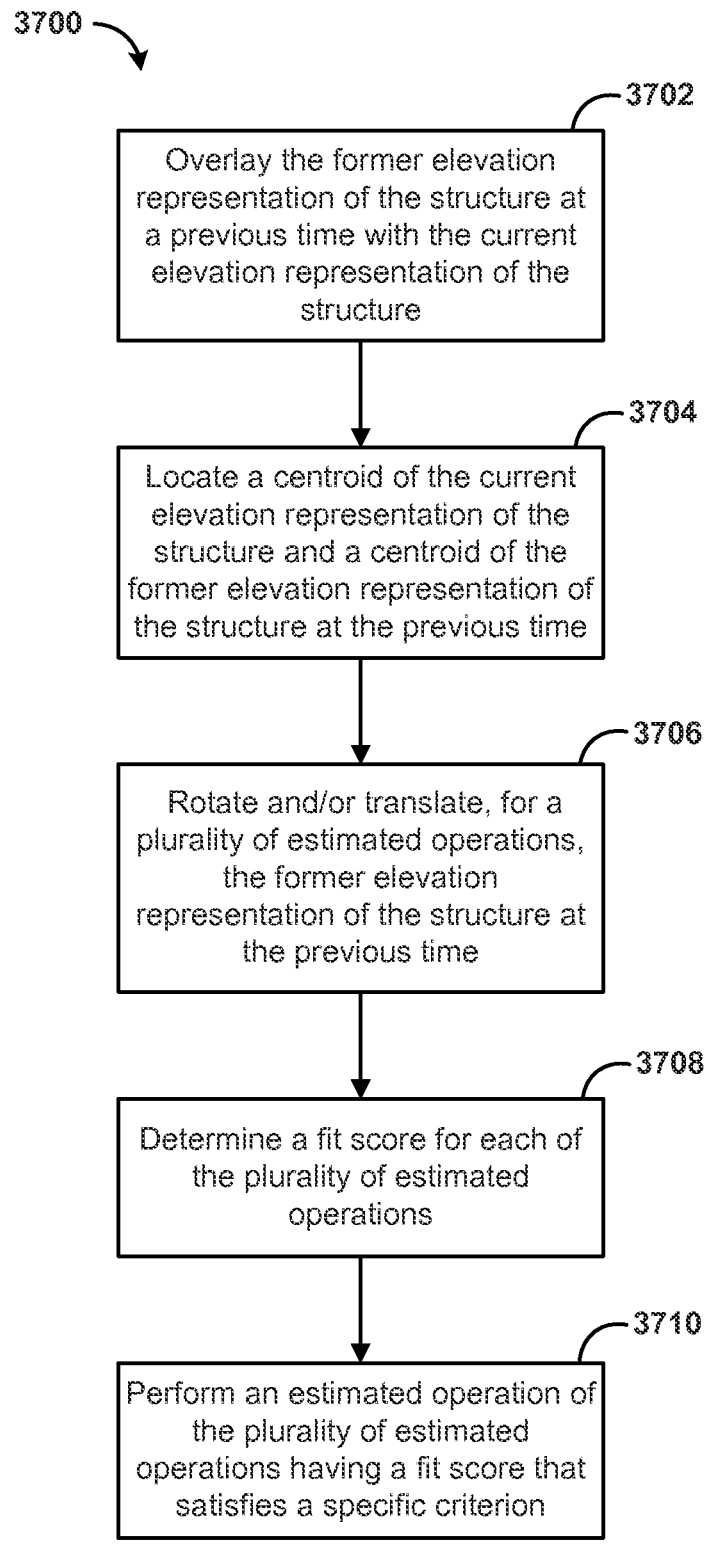
FIG. 37 is a flowchart illustrating an example method of fitting the former elevation representation of the structure at the previous time to the current elevation representation of the structure according to one or more aspects described herein.

FIG. 37 is a flowchart illustrating an example method 3700 of fitting the former elevation representation of the structure at the previous time to the current elevation representation of the structure according to one or more aspects described herein. In one aspect, the subject example method can be embodied in a set of one or more computer-executable instructions (e.g., property tax information management software 3106) and can be implemented in response to execution by a processor (e.g., processor 3103). In certain aspects, the example method 3700 can implement at least a part of block 3212 described above. At block 3702, the former elevation representation of the structure at a previous time can be overlaid with the current elevation representation of the structure. At block 3704, both a centroid of the current elevation representation of the structure and a centroid of the former elevation representation of the structure at the previous time can be located. At block 3706, the former graphical representation of the structure at the previous time can be rotated and/or translated for a plurality of estimated operations. At block 3708, a fit score can be determined for each of the plurality of estimated operations by comparing the centroid of the current elevation representation of the structure with the centroid of the former elevation representation of the structure at the previous time. At block 3710, an estimated operation of the plurality of estimated operations having a fit score that satisfies a specific criterion can be performed.

Figure 38:
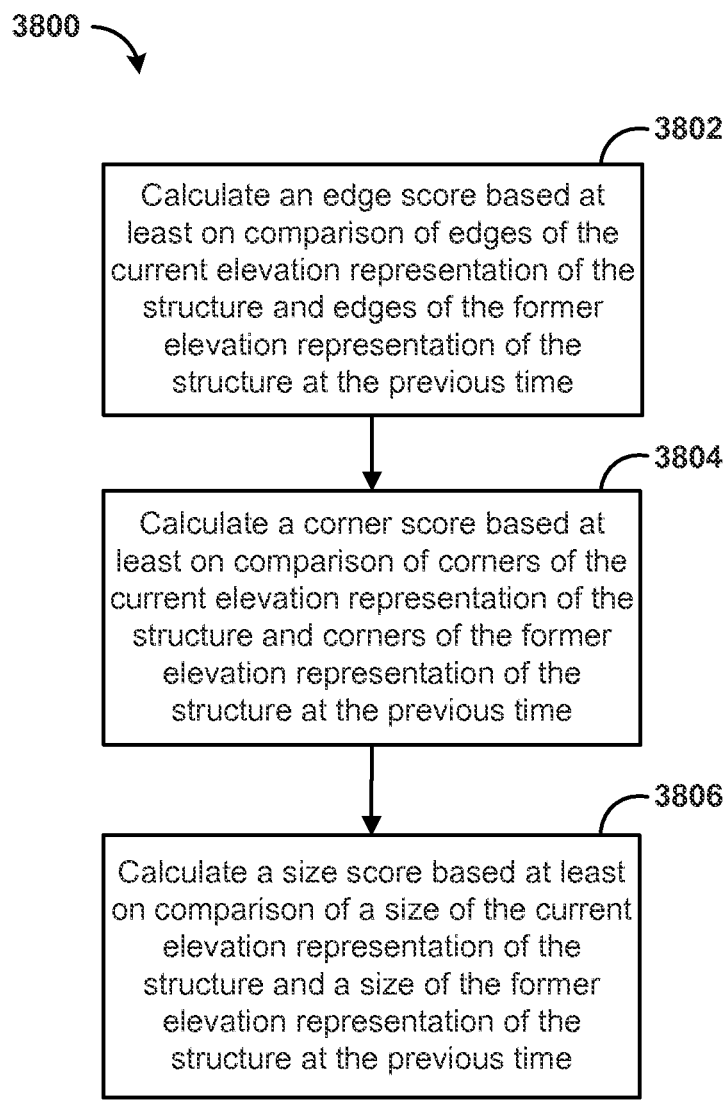
FIG. 38 is a flowchart illustrating an example method of determining a fit score according to one or more aspects of the disclosure.

FIG. 38 is a flowchart illustrating an example method 3800 of determining a fit score according to one or more aspects of the disclosure. In one aspect, the subject example method can be embodied in a set of one or more computer-executable instructions (e.g., property tax information management software 3106) and can be implemented in response to execution by a processor (e.g., processor 3103). In certain aspects, the example method 3800 can implement at least a part of block 3212 described above. At block 3802, an edge score can be calculated based at least on a comparison of edges of the current elevation representation of the structure and edges of the former elevation representation of the structure at the previous time. At block 3804, a corner score can be calculated based at least on a comparison of corners of the current elevation representation of the structure and corners of the former elevation representation of the structure at the previous time. At block 3806, a size score can be calculated based at least on a comparison of a size of the current elevation representation of the structure and a size of the former elevation representation of the structure at the previous time.

FIG. 39 is a flowchart illustrating an example method 3900 of property tax assessment according to one or more aspects of the disclosure. In one aspect, the subject example method can be embodied in a set of one or more computer-executable instructions (e.g., property tax information management software 3106) and can be implemented in response to execution by a processor (e.g., processor 3103).

At block 3902, first elevation data can be received. In one aspect, the first elevation data can be indicative of a region at a first time. In one aspect, the first elevation data can be generated at least in part through at least one of light detection and ranging (LiDAR) measurements, radio detection and ranging (RADAR) measurements, and structure-from-motion (SfM) measurements. RADAR can comprise, for example, synthetic aperture RADAR, and/or interferometric RADAR.

At block 3904, second data can be received. For example, the second data can be elevation data or other data (e.g., outline data, tax data). In one aspect, the second data can be indicative of at least a portion of the region at a second time. As another example, parcel outline data having at least one parcel outline identifying a property parcel in the region can be received as the second data.

At block 3906, the presence of a physical change in a property can be determined. In one aspect, the physical change in the region can be determined based on the first elevation data and the second data. For example, a spatial model (e.g., a map) can be generated based on the first elevation data. A portion of the spatial model can be compared to the second data. For example, the second data can be tax data. The tax data can comprise values suitable for storing physical dimensions of at least one structure on the property. In on aspect, determine the presence of the physical change in the property can comprise identifying a structure based on the first elevation data. A change in the structure (e.g., or similar improvements on a property parcel) can be evaluated.

At block 3908, it can be determined if the physical change is a taxable change. At block 3910, a property tax burden is managed for the property based on the physical change in response to the physical change being a taxable change. For example, the property tax burden can be adjusted for the property based on the physical change in response to the physical change being the taxable change. For example, a fit score associated with the physical change can be determined. Determining the fit score can comprise comparing a least one of edges of the structure, corners of the structure, size of the structure, and orientations of the structure to at least a portion of the second data. In one aspect, adjusting the property tax burden can comprise comparing the fit score to a threshold. In one aspect, the threshold can vary according to the granularity of data used to determine the fit score. In one aspect, the fit score can be assigned to the physical change. In another aspect, the fit score can be selected for validation by a tax assessor. The validation can comprise for example verification of the accuracy of the fit score in ascertaining the physical change.

As another example, an owner of the property of the taxable change can be notified (e.g., of the taxable change or a new tax amount). As another example, the physical change can be classified according to a tax bracket. In one aspect, the accuracy of tax data associated with property tax burden a can be evaluated based on the accuracy of the fit score. In another aspect, the values suitable for storing physical dimensions can be updated to reflect the physical change.

FIG. 40 is a flowchart illustrating an example method for processing digital elevation data including Bare Earth Model (BEM) data to create visually displayable BEM data (VBEM). In one aspect, the subject example method can be embodied in a set of one or more computer-executable instructions (e.g., property tax information management software 3106) and can be implemented in response to execution by a processor (e.g., processor 3103).

At block 4002, BEM data can be identified to be processed. At block 4004, statistical information can be gathered about the BEM data to be processed. For example, at least one data file of BEM data can be read. The coordinate extents in the East-West and North-South directions and the lowest and highest elevations can be determined in the BEM data for each file.

At block 4006, scale, size, and quantity parameters of output visually displayable datasets can be determined. For example, appropriate scaling for output VBEM map area can be determined. Size of output VBEM data files can be determined. Quantity of output VBEM data files can also be determined.

At block 4008, color parameters for output data to be displayed can be determined. For example, a method to calculate colors for output VBEM data can be determined. One or more color ramps can be selected as a basis for color determination.

At block 4010, a VBEM data file can be generated based on the BEM data and parameters. For example, a color for and location in the output data file can be determined for each pixel created based on the data in the BEM.

FIG. 41 is a flowchart illustrating a method 4100 of processing a set of visually displayable BEM data (VBEM) to create an Interpolated Surface Model Mask (ISMM). In one aspect, the subject example method can be embodied in a set of one or more computer-executable instructions (e.g., property tax information management software 3106) and can be implemented in response to execution by a processor (e.g., processor 3103).

At block 4102, a set of VBEM can be identified, including the set of elevation data. At block 4104, processing steps and their order of execution can be determined. For example, the direction of flow of scan lines in VBEM data can be analyzed. The average pixel spacing points along the scan lines in VBEM data can be determined. The direction of flow, pixel spacing, and cycle pre-processing parameters of the system can be defined. The processing steps to be executed and the order of their execution can be selected.

At block 4106, additional pixels to be filled in to create ISMM can be determined. For example, colors (e.g., or elevation values) can be assigned to pixels in small blank areas between non-blank pixels utilizing rays. As an illustration, a series of blank pixels, no longer than the current ray size can be located between two non-blank pixels. Colors can be interpolated to assign to blank pixels. Objects can be located utilizing mathematical methods. For example, edge detection techniques can be used to assemble groups of object edges into possible object shapes. Object outlines can be constructed. For example, line of sight detection techniques can be used to locate possible structure corners. Candidate object corners can be determined. For example, pixels can be set with values that identify those pixels as possible candidates for inclusion in objects. Parcel information can be utilized to determine pixels to assign colors. For example, parcel lines in digital parcel data that intersect with blank pixel areas in VBEM can be identified. For example, pixels that intersect with the parcel lines can be filled in with a value that signifies that the pixel is colored but color is not known. Pixels can be filled in around single pixels and lines of single pixels. For example, colors can be assigned to all pixels that have no immediately adjacent colored pixels. Additionally, colors can be assigned to pixels that surround lines of pixels that only have no immediately adjacent colored pixels.

FIG. 42 is a flowchart of an example method 4200 for identifying a set of ISMM data with blank spaces representing object locations. In one aspect, the subject example method can be embodied in a set of one or more computer-executable instructions (e.g., property tax information management software 3106) and can be implemented in response to execution by a processor (e.g., processor 3103).

At block 4202, a previously known parcel outline data set can be identified. In one aspect, both the parcel outline data set and ISMM data can have geographical coordinates in same coordinate system.

At block 4204, a previously known digital object outline data set can be identified. In one aspect, both object outline data set and ISMM can have geographical coordinates in same coordinate system.

At block 4206, parameters can be set to guide process execution. For example, parameters can be set for determining object fronts. Parameters can also be set for fit scoring.

At block 4208, parcel location can be determined in ISMM data for determining blank pixel areas for representing objects inside parcels. For example, the locations of the line making up the parcel in the ISMM data can be calculated. Blank areas of pixels in ISMM data inside parcel area can be determined.

At block 4210, the edges of the blank pixel areas can be calculated based on the ISMM data and digital object outlines. For example, edge detection can be used to determine the edges and corners of blank pixel areas in the ISMM data. Edges and corners of digital object outlines can be determined.

At block 4212, the set of previously known object outline data can be optimally fitted with the ISMM data. For example, mathematical fitting algorithms can be used to calculate the best orientation and location to fit the corresponding edges and corners of the digital object outline within the edges and corners of the corresponding blank pixel area of the ISMM data.

At block, 4214, a score representing the quality of the fit can be determined. For example, an Edge score can be calculated based on the quality of the fit between the edges of the digital object outline and the edges of the blank pixel area in the ISMM data. A Corner score can be calculated based on the quality of the fit between the corners of the digital object outline and the corner of the blank pixel area in the ISMM data. A Size score can be calculated based on the quality of the fit between the size of the digital object outline and the size of the blank pixel area in the ISMM data. An Orientation score can be calculated based on the quality of the fit between the orientation of the digital object outline and the orientation of the blank pixel area in the ISMM data. The fit score can be based on the one or more of the Edge score, Corner score, Size score, and orientation score.

FIG. 43 is a flowchart illustrating an example method for assessing changes to a region. In one aspect, the subject example method can be embodied in a set of one or more computer-executable instructions (e.g., property tax information management software 3106) and can be implemented in response to execution by a processor (e.g., processor 3103).

At step 4302, elevation data indicative of a region can be received. For example, data can be received according to at least one of a bare earth model, a digital elevation model, a digital surface model, a wireframe model, a wiremesh model, a triangulated irregular network model, a shaded relief model, a sparse point vector model, and a dense point vector model.

At step 4304, a spatial model of the region can be generated based on the elevation data. In one aspect, the spatial model can comprise a map, or other multi-dimensional representation. In one aspect, the spatial model of the region can indicate the elevation data by rendering the elevation data as at least one of raster data and vector mapping data. For example the raster data can comprise a plurality of pixels. Each pixel of the plurality of pixels can have an elevation value (e.g., including the elevation value "void") and represent a location in the spatial model.

In one aspect, intermediate elevation data can be estimated for locations in the region having no assigned elevation data. For example, an additional elevation value for a pixel having a void elevation value can be inserted into the raster data. The additional elevation value can be calculated based at least one elevation value of one or more pixels adjacent the pixel having the void elevation value. In another aspect, elevation data can be augmented to enhance at least one of location of the first representation of the portion of the region, edges of the first representation of the portion of the region, and corners of the first representation of the portion of the region.

At step 4306, a first representation of a portion of the region can be identified based on the spatial model. For example, the spatial model can comprise the portion of the region. In one aspect, the portion of the region can comprise a property parcel, one or more structures (building, house, shed, pool, garage), improvements to structures, and the like. The first representation of the portion of the region can be indicative of the portion of the region at a first time. For example, at least one outermost elevation value of an identified portion of the elevation data can be located. The at least one outermost elevation value can be indicative of an edge of the portion of the region. In one aspect, locating the at least one outermost elevation value of identified portion of the elevation data can comprise performing an edge search for the portion of the region.

At step 4308, a difference between the first representation of the portion of the region and a second representation of the portion of the region can be determined. The second representation of the portion of the region can be indicative of the portion of the region at a second time. In one aspect, parcel outline data having at least one parcel outline identifying a property parcel in the region can be received. The second representation of the portion of the region can be based on the parcel outline data.

In one aspect, the second representation of the portion of the region can be fitted to the first representation of the portion of the region. For example, fitting can comprise determining a centroid of the first representation of the portion of the region and a centroid of the second representation of the portion of the region. Fitting can also comprise, at least one of rotating and translating, for a plurality of estimated operations, the second representation of the portion of the region. Fitting can also comprise determining a fit score for each of the plurality of estimated operations by comparing the centroid of the first representation of the portion of the region with the centroid of the second representation of the portion of the region.

Various advantages of the subject disclosure emerge from the various aspects of the disclosure that are described in the subject specification and drawings. Historically, the process of surveying real property to discover changes in value has typically involved direct, field measurements of the fixed assets or a visual inspection of the property from photographs and other imagery. These techniques are expensive and time consuming. In other words, assessing property changes has been performed manually, by direct human observation, on a record-by-record basis. In contrast, the system and methods described herein provide a much more efficient, automated approach to assessing changes in property value. Advantageously, the system and methods obtain data for a large geographic region at the same time through detection technologies.

Another advantage of the disclosure is the ability to use data processing techniques to quickly locate information about structures from the elevation data and compare that information to previous information about the structures. Instead of subjective human assessments of change, the methods and system provide objective, algorithm based assessments of changes in the property.

Yet another example advantage of the disclosed methods and systems is the ability to provide a user with one or more parameters for customizing the processing of the elevation data. The user can reprocess the data with new parameters to get more accurate results.

It should be appreciated that in certain implementations, the disclosed methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of assessing changes to a region, the method comprising:
   receiving elevation data indicative of a region;
   generating a spatial model of the region based on the elevation data;
   determining, based on changes in the elevation data represented in the spatial model, a first representation of a structure in the region, wherein the first representation is indicative of the structure at a first time;
   receiving, from a tax assessment database, tax related data associated with a property parcel and comprising dimensions of the structure, wherein the dimensions are determined for assessing a tax on the property parcel at a time prior to the first time;
   generating, based on the tax related data, a second representation of the structure in a spatial coordinate system compatible with the spatial model of the region;
   determining, by a computing device, a difference between the first representation of the structure and the second representation of the structure; and
   providing, based on determining the difference between the first representation of the structure and the second representation of the structure, an update to the tax related data.

2. The method of claim 1, wherein generating the spatial model of the region comprises estimating intermediate elevation data for locations in the region having no assigned elevation data.

3. The method of claim 2, wherein the spatial model of the region indicates the elevation data by rendering the elevation data as at least one of raster data and vector mapping data.

4. The method of claim 3, wherein the raster data comprises a plurality of pixels, and wherein each pixel of the plurality of pixels has an elevation value and represents a location in the spatial model.

5. The method of claim 4, wherein estimating intermediate elevation data comprises inserting into the raster data an additional elevation value for a pixel having a void elevation value, and wherein the additional elevation value is calculated based at least on elevation values of one or more pixels adjacent the pixel having the void elevation value.

6. The method of claim 2, wherein determining, based on changes in the elevation data represented in the spatial model, the first representation of the structure in the region comprises augmenting the elevation data to enhance at least one of location of the first representation of the structure in the region, edges of the first representation of the structure in the region, or corners of the first representation of the structure in the region.

7. The method of claim 1, wherein receiving the elevation data indicative of the region comprises receiving data according to at least one of a bare earth model, a digital elevation model, a digital surface model, a wireframe model, a wiremesh model, a triangulated irregular network model, a shaded relief model, a sparse point vector model, or a dense point vector model.

8. The method of claim 1, wherein determining, based on changes in the elevation data represented in the spatial model, the first representation of the structure in the region comprises locating at least one outermost elevation value of the structure, and wherein the at least one outermost elevation value is indicative of an edge of the structure, and wherein locating the at least one outermost elevation value of the structure comprises performing an edge search for structure.

9. The method of claim 1, further comprising fitting the second representation of the structure to the first representation of the structure.

10. The method of claim 9, wherein fitting the second representation of the structure to the first representation of the structure comprises:
    determining a centroid of the first representation of the structure and a centroid of the second representation of the structure;
    at least one of rotating or translating, for a plurality of estimated operations, the second representation of the structure; and
    determining a fit score for each of the plurality of estimated operations by comparing the centroid of the first representation of the structure with the centroid of the second representation of the structure.

11. A method for tax assessment, comprising:
    receiving first elevation data, wherein the first elevation data is indicative of a region at a first time;
    generating a first representation of the first elevation data, wherein the first representation comprises boundaries of a structure in the region;
    receiving second data comprising tax related data for assessing a tax, wherein the second data comprises dimensions of the structure in the region at a time prior to the first time;
    generating, based on the second data, a second representation of the second data in a spatial coordinate system compatible with the first representation of the first elevation data;
    determining, by a computing device, a physical change in the region based on a comparison of the first representation of the first elevation data to the second representation of the second data;
    determining if the physical change is a taxable change; and
    managing a tax burden for the region based on the physical change in response to the physical change being a taxable change.

12. The method of claim 11, wherein the managing the tax burden comprises adjusting the tax burden for the region based on the physical change in response to the physical change being the taxable change.

13. The method of claim 12, further comprising determining a fit score associated with the physical change, wherein determining if the physical change is a taxable change comprises comparing the fit score to a threshold.

14. The method of claim 13, wherein determining the fit score comprises comparing a least one of edges of the structure, corners of the structure, size of the structure, or orientations of the structure to at least a portion of the second representation of the second data.

15. The method of claim 11, wherein the first elevation data is generated based on, at least in part, at least one of light detection and ranging (LiDAR) measurements, radio detection and ranging (RADAR) measurements, or structure-from-motion (SfM) measurements, and wherein the first elevation data comprises at least one of three-dimensional imagery or imagery encoded with elevation data.

16. The method of claim 11, wherein generating the first representation of the first elevation data comprises generating a spatial model based on the first elevation data, and wherein determining a physical change in the region based on a comparison of the first representation of the first elevation data to the second representation of the second data comprises comparing a portion of the spatial model to the second data.

17. A device for assessing changes to a region, the device comprising:
a memory having encoded thereon computer-executable instructions and data; and
a processor functionally coupled to the memory and configured, by the computer-executable instructions, to perform at least the following actions,
receiving elevation data indicative of a region;
generating a spatial model of the region based on the elevation data;
determining, based on changes in the elevation data represented in the spatial model, a first representation of a structure in the region, wherein the first representation is indicative of the structure at a first time;
receiving, from a tax assessment database, tax related data associated with a property parcel and comprising dimensions of the structure, wherein the dimensions are determined for assessing a tax on the property parcel at a time prior to the first time;
generating, based on the tax related data, a second representation of the structure in a spatial coordinate system compatible with the spatial model of the region;
determining, by a computing device, a difference between the first representation of the structure and the second representation of the structure; and
providing, based on determining the difference between the first representation of the structure and the second representation of the structure, an update to the tax related data.

18. The device of claim 17, wherein the processor is further configured, by the computer executable instructions, to adjust a tax burden associated with the portion of the region based on the difference between the first representation of the structure and the second representation of the structure.

19. The method of claim 1, further comprising overlaying the second representation of the structure and the first representation of the structure.

20. The method of claim 1, wherein determining, based on the changes in the elevation data represented in the spatial model, the first representation of the structure in the region comprises generating a mask representing the structure in the spatial model.

* * * * *